United States Patent
Purdy et al.

(10) Patent No.: US 12,214,654 B2
(45) Date of Patent: Feb. 4, 2025

(54) EXHAUST ASSEMBLY FOR A UTILITY VEHICLE

(71) Applicant: Polaris Industries Inc., Medina, MN (US)

(72) Inventors: Michael A. Purdy, Chisago City, MN (US); Ryan D. Carlson, Blaine, MN (US); Ralph W. Lauzze, III, Hugo, MN (US); Ryan M. Lacanne, Eagan, MN (US); Jake A. Stafford, New Brighton, MN (US); Stephen Martin, Stillwater, MN (US)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 17/735,519

(22) Filed: May 3, 2022

(65) Prior Publication Data
US 2022/0355659 A1 Nov. 10, 2022

Related U.S. Application Data

(60) Provisional application No. 63/184,496, filed on May 5, 2021.

(51) Int. Cl.
*F01N 13/00* (2010.01)
*B60K 13/04* (2006.01)

(52) U.S. Cl.
CPC .......... *B60K 13/04* (2013.01); *F01N 13/0093* (2014.06); *B60Y 2200/20* (2013.01)

(58) Field of Classification Search
CPC . B60K 13/04; B60K 5/02; B60K 5/04; B60K 17/04; B60K 2005/003;
(Continued)

(56) References Cited

U.S. PATENT DOCUMENTS

| 1,989,585 A | 1/1935 | Bigelow |
| 2,623,612 A | 12/1952 | Scheiterlein |

(Continued)

FOREIGN PATENT DOCUMENTS

| CA | 2794236 A1 * | 4/2014 | ............. B60K 13/04 |
| CN | 1268997 | 10/2000 | |

(Continued)

OTHER PUBLICATIONS

"Engine firing change '13 850", PolarisATVForums.com internet forum discussion thread dated Nov. 21, 2012.
(Continued)

*Primary Examiner* — Matthew T Largi
(74) *Attorney, Agent, or Firm* — Faegre Drinker Biddle & Reath LLP

(57) ABSTRACT

A utility vehicle includes an exhaust assembly fluidly coupled to an engine. Depending on various parameters, such as the size and/or performance of the vehicle, the exhaust assembly is required to meet certain emissions regulations. Such emissions regulations may be met by increasing the temperature within the exhaust assembly, however, at particularly high temperatures, a catalyst of the exhaust assembly may be damaged. Therefore, the exhaust assembly includes various options for cooling portions thereof to remove heat from the assembly.

20 Claims, 39 Drawing Sheets

(58) Field of Classification Search
CPC ............... F01N 13/0093; F01N 13/008; F01N 13/1816; F01N 2230/04; F01N 2240/02; F01N 2260/022; F01N 2260/024; F01N 2260/20; F01N 2340/04; F01N 2590/08; F01N 3/055; F01N 13/009; F01N 3/043; B60Y 2200/20; B60Y 2200/124; B60Y 2400/72; F01P 1/06; F01P 3/12; F01P 3/20; F01P 2060/16

See application file for complete search history.

(56) References Cited

U.S. PATENT DOCUMENTS

| | | | |
|---|---|---|---|
| 2,795,962 A | 6/1957 | Edmond | |
| 2,839,038 A | 6/1958 | Middlebrooks, Jr. | |
| 3,523,592 A | 8/1970 | Fenton | |
| 3,597,987 A | 8/1971 | Kiekhaefer | |
| 3,605,511 A | 9/1971 | Deschene | |
| 3,694,661 A | 9/1972 | Minowa | |
| 3,727,478 A | 4/1973 | Deschene et al. | |
| 3,733,918 A | 5/1973 | Domaas | |
| 3,759,111 A | 9/1973 | Hoff et al. | |
| 3,777,584 A | 12/1973 | Domaas | |
| RE27,858 E | 1/1974 | Laughlin | |
| 3,794,142 A | 2/1974 | Perreault | |
| 3,841,841 A * | 10/1974 | Torosian | F01N 3/2053 422/177 |
| 3,861,229 A | 1/1975 | Domaas | |
| 3,868,862 A | 3/1975 | Bessette | |
| 3,916,707 A | 11/1975 | Wells | |
| 3,939,720 A | 2/1976 | Aaen et al. | |
| 3,951,224 A | 4/1976 | Beaudoin et al. | |
| 3,958,461 A | 5/1976 | Aaen et al. | |
| 3,961,539 A | 6/1976 | Tremblay et al. | |
| 3,962,927 A | 6/1976 | Beaudoin et al. | |
| 3,968,702 A | 7/1976 | Beaudoin et al. | |
| 3,971,263 A | 7/1976 | Beaudoin et al. | |
| 4,010,725 A | 3/1977 | White | |
| 4,022,272 A | 5/1977 | Miller | |
| 4,061,187 A | 12/1977 | Rajasekaran et al. | |
| 4,150,655 A | 4/1979 | Forlai et al. | |
| 4,236,492 A | 12/1980 | Tholen | |
| 4,284,408 A | 8/1981 | Boer et al. | |
| 4,294,073 A | 10/1981 | Neff | |
| 4,313,728 A | 2/1982 | Prasad | |
| 4,337,406 A | 6/1982 | Binder | |
| 4,404,936 A | 9/1983 | Tatebe et al. | |
| 4,434,934 A | 3/1984 | Moser et al. | |
| 4,455,971 A * | 6/1984 | Kirchweger | B60R 13/0884 181/204 |
| 4,464,144 A | 8/1984 | Kobayashi | |
| 4,470,389 A | 9/1984 | Mitadera et al. | |
| 4,474,162 A | 10/1984 | Mason | |
| 4,483,686 A | 11/1984 | Kobayashi et al. | |
| 4,575,363 A | 3/1986 | Burgess et al. | |
| 4,598,687 A | 7/1986 | Hayashi | |
| 4,638,172 A | 1/1987 | Williams | |
| 4,685,430 A | 8/1987 | Ap | |
| 4,688,529 A | 8/1987 | Mitadera et al. | |
| 4,733,639 A | 3/1988 | Kohyama et al. | |
| 4,779,905 A | 10/1988 | Ito et al. | |
| 4,826,467 A | 5/1989 | Reese et al. | |
| 4,848,294 A | 7/1989 | Yamamoto | |
| 4,890,586 A | 1/1990 | Fujii et al. | |
| 4,898,261 A | 2/1990 | Winberg et al. | |
| 4,907,552 A | 3/1990 | Martin | |
| 4,973,082 A | 11/1990 | Kincheloe | |
| 5,018,490 A | 5/1991 | Kroener | |
| 5,029,668 A * | 7/1991 | Murakawa | F01N 13/08 181/282 |
| 5,086,858 A | 2/1992 | Mizuta et al. | |
| 5,174,622 A | 12/1992 | Gutta | |
| 5,209,703 A | 5/1993 | Mastine et al. | |
| 5,212,431 A | 5/1993 | Origuchi et al. | |
| 5,251,588 A | 10/1993 | Tsujii et al. | |
| 5,251,713 A | 10/1993 | Enokimoto | |
| 5,255,733 A | 10/1993 | King | |
| 5,264,764 A | 11/1993 | Kuang | |
| 5,326,330 A | 7/1994 | Bostelmann | |
| 5,358,450 A | 10/1994 | Robert | |
| 5,359,247 A | 10/1994 | Baldwin et al. | |
| 5,382,833 A | 1/1995 | Wirges | |
| 5,407,130 A | 4/1995 | Uyeki et al. | |
| 5,408,965 A | 4/1995 | Fulton et al. | |
| 5,513,893 A * | 5/1996 | Nakata | B62D 35/02 296/180.1 |
| 5,528,148 A | 6/1996 | Rogers | |
| 5,529,544 A | 6/1996 | Berto | |
| 5,546,901 A | 8/1996 | Acker et al. | |
| 5,549,153 A | 8/1996 | Baruschke et al. | |
| 5,550,445 A | 8/1996 | Nii | |
| 5,558,057 A | 9/1996 | Everts | |
| 5,562,555 A | 10/1996 | Peterson | |
| 5,597,060 A | 1/1997 | Huddleston et al. | |
| 5,614,809 A | 3/1997 | Kiuchi et al. | |
| 5,621,304 A | 4/1997 | Kiuchi et al. | |
| 5,647,534 A | 7/1997 | Kelz et al. | |
| 5,647,810 A | 7/1997 | Huddleston | |
| 5,692,983 A | 12/1997 | Bostelmann | |
| 5,738,062 A | 4/1998 | Everts et al. | |
| 5,788,597 A | 8/1998 | Boll et al. | |
| 5,795,255 A | 8/1998 | Hooper | |
| 5,797,816 A | 8/1998 | Bostelmann | |
| 5,813,491 A * | 9/1998 | Sato | B62D 25/2072 180/69.1 |
| 5,839,397 A * | 11/1998 | Funabashi | E02F 9/0866 415/206 |
| 5,842,534 A | 12/1998 | Frank | |
| 5,860,403 A | 1/1999 | Hirano et al. | |
| 5,867,009 A | 2/1999 | Kiuchi et al. | |
| 5,883,496 A | 3/1999 | Esaki et al. | |
| 5,947,075 A | 9/1999 | Ryu et al. | |
| 5,950,590 A | 9/1999 | Everts et al. | |
| 5,960,764 A | 10/1999 | Araki | |
| 5,971,290 A | 10/1999 | Echigoya et al. | |
| 5,976,044 A | 11/1999 | Kuyama | |
| 6,047,678 A | 4/2000 | Kurihara et al. | |
| 6,062,024 A | 5/2000 | Zander et al. | |
| 6,114,784 A | 9/2000 | Nakano | |
| 6,119,636 A | 9/2000 | Fan | |
| 6,149,540 A | 11/2000 | Johnson et al. | |
| 6,152,098 A | 11/2000 | Becker et al. | |
| 6,184,603 B1 | 2/2001 | Hamai et al. | |
| 6,196,168 B1 | 3/2001 | Eckerskorn et al. | |
| 6,198,183 B1 | 3/2001 | Baeumel et al. | |
| 6,213,079 B1 | 4/2001 | Watanabe | |
| 6,213,081 B1 | 4/2001 | Ryu et al. | |
| 6,216,660 B1 | 4/2001 | Ryu et al. | |
| 6,217,758 B1 | 4/2001 | Lee | |
| 6,227,160 B1 | 5/2001 | Kurihara et al. | |
| 6,309,317 B1 | 10/2001 | Joss | |
| 6,311,676 B1 | 11/2001 | Oberg et al. | |
| 6,314,931 B1 | 11/2001 | Yasuda et al. | |
| 6,328,004 B1 | 12/2001 | Rynhart | |
| 6,333,620 B1 | 12/2001 | Schmitz et al. | |
| 6,338,688 B1 | 1/2002 | Minami et al. | |
| 6,353,786 B1 | 3/2002 | Yamada et al. | |
| 6,359,344 B1 | 3/2002 | Klein et al. | |
| 6,362,602 B1 | 3/2002 | Kozarekar | |
| 6,394,061 B2 | 5/2002 | Ryu et al. | |
| 6,397,795 B2 | 6/2002 | Hare | |
| 6,504,259 B1 | 1/2003 | Kuroda et al. | |
| 6,510,829 B2 | 1/2003 | Ito et al. | |
| 6,520,133 B1 | 2/2003 | Wenger et al. | |
| 6,520,878 B1 | 2/2003 | Leclair et al. | |
| 6,528,918 B2 | 3/2003 | Paulus-Neues et al. | |
| 6,557,515 B2 | 5/2003 | Furuya et al. | |
| 6,561,315 B2 | 5/2003 | Furuya et al. | |
| 6,591,896 B1 | 7/2003 | Hansen | |
| 6,622,804 B2 | 9/2003 | Schmitz et al. | |
| 6,640,766 B2 | 11/2003 | Furuya et al. | |
| 6,659,566 B2 | 12/2003 | Bombardier | |
| 6,661,108 B1 | 12/2003 | Yamada et al. | |
| 6,675,562 B2 | 1/2004 | Lawrence | |

(56) References Cited

U.S. PATENT DOCUMENTS

| | | |
|---|---|---|
| 6,702,052 B1 | 3/2004 | Wakashiro et al. |
| 6,761,748 B2 | 7/2004 | Schenk et al. |
| 6,769,391 B1 | 8/2004 | Lee et al. |
| 6,777,846 B2 | 8/2004 | Feldner et al. |
| 6,786,187 B2 | 9/2004 | Nagai et al. |
| 6,809,429 B1 | 10/2004 | Frank |
| 6,810,667 B2 | 11/2004 | Jung et al. |
| 6,810,977 B2 | 11/2004 | Suzuki |
| 6,820,583 B2 | 11/2004 | Maier |
| 6,822,353 B2 | 11/2004 | Koga et al. |
| 6,825,573 B2 | 11/2004 | Suzuki et al. |
| 6,909,200 B2 | 6/2005 | Bouchon |
| 6,915,770 B2 | 7/2005 | Lu |
| 6,921,077 B1 | 7/2005 | Pupo |
| 6,935,297 B2 | 8/2005 | Honda et al. |
| 6,966,395 B2 | 11/2005 | Schuehmacher et al. |
| 7,004,134 B2 | 2/2006 | Higuchi |
| 7,017,542 B2 | 3/2006 | Wilton et al. |
| 7,051,824 B1 | 5/2006 | Jones et al. |
| 7,073,482 B2 | 7/2006 | Kirchberger |
| 7,089,737 B2 | 8/2006 | Claus |
| 7,100,562 B2 | 9/2006 | Terada et al. |
| 7,104,242 B2 | 9/2006 | Nishi et al. |
| 7,114,585 B2 | 10/2006 | Man et al. |
| 7,152,706 B2 | 12/2006 | Pichler et al. |
| 7,165,522 B2 | 1/2007 | Malek et al. |
| 7,204,219 B2 | 4/2007 | Sakurai |
| 7,208,847 B2 | 4/2007 | Taniguchi |
| 7,224,132 B2 | 5/2007 | Cho et al. |
| 7,243,564 B2 | 7/2007 | Chonan et al. |
| 7,243,632 B2 | 7/2007 | Hu |
| 7,287,508 B2 | 10/2007 | Kurihara |
| 7,325,526 B2 | 2/2008 | Kawamoto |
| 7,380,805 B1 | 6/2008 | Turner |
| 7,395,804 B2 | 7/2008 | Takemoto et al. |
| 7,412,310 B2 | 8/2008 | Brigham et al. |
| 7,427,248 B2 | 9/2008 | Chonan |
| 7,431,024 B2 | 10/2008 | Buchwitz et al. |
| 7,449,793 B2 | 11/2008 | Cho et al. |
| 7,451,808 B2 | 11/2008 | Busse et al. |
| 7,455,134 B2 | 11/2008 | Severinsky et al. |
| 7,530,420 B2 | 5/2009 | Davis et al. |
| 7,537,070 B2 | 5/2009 | Maslov et al. |
| 7,559,308 B2 | 7/2009 | Matsuda et al. |
| 7,621,262 B2 | 11/2009 | Zubeck |
| 7,740,092 B2 | 6/2010 | Bender |
| 7,769,505 B2 | 8/2010 | Rask et al. |
| 7,882,912 B2 | 2/2011 | Nozaki et al. |
| 7,884,574 B2 | 2/2011 | Fukumura et al. |
| 8,011,342 B2 | 9/2011 | Bluhm |
| 8,047,451 B2 | 11/2011 | McNaughton |
| 8,050,851 B2 | 11/2011 | Aoki et al. |
| 8,051,842 B2 | 11/2011 | Hagelstein et al. |
| 8,074,753 B2 | 12/2011 | Tahara et al. |
| 8,104,524 B2 | 1/2012 | Manesh et al. |
| 8,157,039 B2 | 4/2012 | Melvin et al. |
| 8,176,957 B2 | 5/2012 | Manesh et al. |
| 8,186,333 B2 | 5/2012 | Sakuyama |
| 8,215,427 B2 | 7/2012 | Rouaud et al. |
| 8,269,457 B2 | 9/2012 | Wenger et al. |
| 8,272,685 B2 | 9/2012 | Lucas et al. |
| 8,281,891 B2 | 10/2012 | Sugiura |
| 8,323,147 B2 | 12/2012 | Wenger et al. |
| 8,328,235 B2 | 12/2012 | Schneider et al. |
| 8,353,265 B2 | 1/2013 | Pursifull |
| 8,356,472 B2 | 1/2013 | Hiranuma et al. |
| 8,386,109 B2 | 2/2013 | Nicholls |
| 8,387,594 B2 | 3/2013 | Wenger et al. |
| 8,439,019 B1 | 5/2013 | Carlson et al. |
| 8,479,854 B1 | 7/2013 | Gagnon |
| 8,496,079 B2 | 7/2013 | Wenger et al. |
| 8,555,851 B2 | 10/2013 | Wenger et al. |
| 8,561,403 B2 | 10/2013 | Vandyne et al. |
| 8,567,541 B2 | 10/2013 | Wenger et al. |
| 8,573,348 B2 | 11/2013 | Cantemir et al. |
| 8,590,651 B2 | 11/2013 | Shigematsu et al. |
| 8,668,623 B2 | 3/2014 | Vuksa et al. |
| 8,671,919 B2 | 3/2014 | Nakasugi et al. |
| 8,689,925 B2 * | 4/2014 | Ajisaka .................. B60K 13/04 |
| | | 180/68.2 |
| 8,783,396 B2 | 7/2014 | Bowman |
| 8,827,856 B1 | 9/2014 | Younggren et al. |
| 8,834,307 B2 | 9/2014 | Itoo et al. |
| 8,864,174 B2 | 10/2014 | Minami et al. |
| 8,869,525 B2 | 10/2014 | Lingenauber et al. |
| 8,899,620 B1 | 12/2014 | Bhardwaj et al. |
| 8,919,469 B2 * | 12/2014 | Shatters .................. B60K 11/00 |
| | | 180/68.1 |
| 8,985,271 B1 * | 3/2015 | Yoshida .................. F01N 1/089 |
| | | 181/269 |
| 9,016,760 B2 | 4/2015 | Kuroda et al. |
| 9,133,730 B2 | 9/2015 | Joergl et al. |
| 9,186,952 B2 | 11/2015 | Yleva |
| 9,187,083 B2 | 11/2015 | Wenger et al. |
| 9,194,282 B2 | 11/2015 | Serres et al. |
| 9,228,644 B2 | 1/2016 | Tsukamoto et al. |
| 9,327,587 B2 | 5/2016 | Spindler et al. |
| 9,328,652 B2 | 5/2016 | Bruss et al. |
| D758,281 S | 6/2016 | Galloway |
| 9,382,832 B2 | 7/2016 | Bowers |
| 9,499,044 B2 | 11/2016 | Osaki |
| 9,500,264 B2 | 11/2016 | Aitcin et al. |
| 9,566,858 B2 | 2/2017 | Hicke et al. |
| 9,644,717 B2 | 5/2017 | Aitcin |
| 9,718,351 B2 | 8/2017 | Ripley et al. |
| 9,752,489 B2 | 9/2017 | Chu |
| 9,802,605 B2 | 10/2017 | Wenger et al. |
| 9,895,946 B2 | 2/2018 | Schlangen et al. |
| 10,066,729 B2 | 9/2018 | Aitcin et al. |
| 10,207,555 B2 | 2/2019 | Mailhot et al. |
| 10,294,877 B2 * | 5/2019 | Arima .................. F02D 41/1441 |
| 10,300,786 B2 | 5/2019 | Nugteren et al. |
| 10,697,532 B2 | 6/2020 | Schleif et al. |
| 10,767,745 B2 | 9/2020 | Zauner et al. |
| 10,800,250 B2 | 10/2020 | Nugteren et al. |
| 10,967,694 B2 | 4/2021 | Brady et al. |
| 11,173,808 B2 | 11/2021 | Swain et al. |
| 11,285,807 B2 | 3/2022 | Galsworthy et al. |
| 11,306,809 B2 | 4/2022 | Aitcin |
| 11,624,427 B2 | 4/2023 | Itoo et al. |
| 11,680,635 B2 | 6/2023 | Olason |
| 2001/0020554 A1 | 9/2001 | Yanase et al. |
| 2001/0043808 A1 | 11/2001 | Matsunaga et al. |
| 2002/0032088 A1 | 3/2002 | Korenjak et al. |
| 2002/0033295 A1 | 3/2002 | Korenjak et al. |
| 2002/0042313 A1 | 4/2002 | Aitcin |
| 2002/0119846 A1 | 8/2002 | Kitai et al. |
| 2002/0121795 A1 | 9/2002 | Murray |
| 2002/0123400 A1 | 9/2002 | Younggren et al. |
| 2002/0179354 A1 | 12/2002 | White |
| 2003/0034187 A1 | 2/2003 | Hisada et al. |
| 2003/0066696 A1 | 4/2003 | Nakamura |
| 2003/0070849 A1 | 4/2003 | Whittaker |
| 2003/0104900 A1 | 6/2003 | Takahashi et al. |
| 2003/0153426 A1 | 8/2003 | Brown |
| 2004/0018903 A1 | 1/2004 | Takagi |
| 2004/0031451 A1 | 2/2004 | Atschreiter et al. |
| 2004/0063535 A1 | 4/2004 | Ibaraki |
| 2004/0083730 A1 | 5/2004 | Wizgall et al. |
| 2004/0130224 A1 | 7/2004 | Mogi et al. |
| 2004/0168455 A1 | 9/2004 | Nakamura |
| 2004/0177827 A1 | 9/2004 | Hoyte et al. |
| 2004/0188159 A1 | 9/2004 | Yatagai et al. |
| 2004/0195797 A1 | 10/2004 | Nash et al. |
| 2004/0214668 A1 | 10/2004 | Takano |
| 2004/0224806 A1 | 11/2004 | Chonan |
| 2004/0226761 A1 | 11/2004 | Takenaka et al. |
| 2005/0014582 A1 | 1/2005 | Whiting et al. |
| 2005/0052080 A1 | 3/2005 | Maslov et al. |
| 2005/0055140 A1 | 3/2005 | Brigham et al. |
| 2005/0103558 A1 | 5/2005 | Davis et al. |
| 2005/0173180 A1 | 8/2005 | Hypes et al. |
| 2005/0205319 A1 | 9/2005 | Yatagai et al. |

(56) References Cited

U.S. PATENT DOCUMENTS

| | | | |
|---|---|---|---|
| 2006/0075746 A1* | 4/2006 | Kim | F01P 1/06 60/320 |
| 2006/0112695 A1 | 6/2006 | Neubauer et al. | |
| 2006/0130888 A1 | 6/2006 | Yamaguchi et al. | |
| 2006/0131102 A1* | 6/2006 | Rauch | F01N 1/02 181/275 |
| 2006/0270503 A1 | 11/2006 | Suzuki et al. | |
| 2007/0080006 A1 | 4/2007 | Yamaguchi | |
| 2007/0144800 A1 | 6/2007 | Stone | |
| 2007/0251744 A1 | 11/2007 | Matsuzawa | |
| 2008/0022981 A1 | 1/2008 | Keyaki et al. | |
| 2008/0023240 A1 | 1/2008 | Sunsdahl et al. | |
| 2008/0083392 A1 | 4/2008 | Kurihara et al. | |
| 2008/0125256 A1 | 5/2008 | Murayama et al. | |
| 2008/0157592 A1 | 7/2008 | Bax et al. | |
| 2008/0178830 A1 | 7/2008 | Sposato | |
| 2008/0202483 A1 | 8/2008 | Procknow | |
| 2008/0257625 A1 | 10/2008 | Stranges | |
| 2008/0271937 A1 | 11/2008 | King et al. | |
| 2008/0284124 A1 | 11/2008 | Brady et al. | |
| 2008/0296076 A1 | 12/2008 | Murayama et al. | |
| 2008/0299448 A1 | 12/2008 | Buck et al. | |
| 2008/0308337 A1 | 12/2008 | Ishida | |
| 2009/0014246 A1 | 1/2009 | Lin | |
| 2009/0015023 A1 | 1/2009 | Fleckner | |
| 2009/0064642 A1 | 3/2009 | Sato et al. | |
| 2009/0091137 A1 | 4/2009 | Nishida et al. | |
| 2009/0177345 A1 | 7/2009 | Severinsky et al. | |
| 2009/0179509 A1 | 7/2009 | Gerundt et al. | |
| 2009/0227404 A1 | 9/2009 | Beyer | |
| 2009/0286643 A1 | 11/2009 | Brown | |
| 2009/0301830 A1 | 12/2009 | Kinsman et al. | |
| 2009/0302590 A1 | 12/2009 | Van et al. | |
| 2009/0314462 A1 | 12/2009 | Yahia et al. | |
| 2010/0019722 A1 | 1/2010 | Sanchez | |
| 2010/0019729 A1 | 1/2010 | Kaita et al. | |
| 2010/0078240 A1 | 4/2010 | Miura | |
| 2010/0120565 A1 | 5/2010 | Kochidomari et al. | |
| 2010/0121512 A1 | 5/2010 | Takahashi et al. | |
| 2010/0155013 A1* | 6/2010 | Braun | F04D 17/025 165/41 |
| 2010/0162989 A1 | 7/2010 | Aamand et al. | |
| 2010/0163324 A1 | 7/2010 | Jyoutaki et al. | |
| 2010/0181134 A1 | 7/2010 | Sugiura | |
| 2010/0187032 A1* | 7/2010 | Yamamura | B60K 11/00 180/68.2 |
| 2010/0211242 A1 | 8/2010 | Kelty et al. | |
| 2010/0311529 A1 | 12/2010 | Ochab et al. | |
| 2011/0092325 A1 | 4/2011 | Vuksa et al. | |
| 2011/0094225 A1 | 4/2011 | Kistner et al. | |
| 2011/0133438 A1 | 6/2011 | Haines et al. | |
| 2011/0147106 A1 | 6/2011 | Wenger et al. | |
| 2011/0155082 A1 | 6/2011 | Takano | |
| 2011/0168126 A1 | 7/2011 | Fujikawa | |
| 2011/0240393 A1 | 10/2011 | Hurd et al. | |
| 2012/0031685 A1 | 2/2012 | Safranski et al. | |
| 2012/0031694 A1 | 2/2012 | Deckard et al. | |
| 2012/0055728 A1 | 3/2012 | Bessho et al. | |
| 2012/0055729 A1 | 3/2012 | Bessho et al. | |
| 2012/0125022 A1 | 5/2012 | Maybury et al. | |
| 2012/0214626 A1 | 8/2012 | Cook | |
| 2012/0217078 A1 | 8/2012 | Kinsman et al. | |
| 2012/0217116 A1 | 8/2012 | Nishimoto | |
| 2012/0283930 A1 | 11/2012 | Venton-Walters et al. | |
| 2012/0297765 A1 | 11/2012 | Vigild et al. | |
| 2013/0062909 A1 | 3/2013 | Harris et al. | |
| 2013/0075183 A1 | 3/2013 | Kochidomari et al. | |
| 2013/0157794 A1 | 6/2013 | Stegelmann et al. | |
| 2014/0004984 A1 | 1/2014 | Aitcin | |
| 2014/0103627 A1 | 4/2014 | Deckard et al. | |
| 2014/0113766 A1 | 4/2014 | Yagyu et al. | |
| 2014/0124279 A1* | 5/2014 | Schlangen | B62D 7/16 180/311 |
| 2014/0230797 A1 | 8/2014 | Meshenky et al. | |
| 2014/0235382 A1 | 8/2014 | Tsukamoto et al. | |
| 2014/0288763 A1 | 9/2014 | Bennett et al. | |
| 2014/0311143 A1 | 10/2014 | Speidel et al. | |
| 2014/0349792 A1 | 11/2014 | Aitcin | |
| 2015/0071759 A1 | 3/2015 | Bidner et al. | |
| 2015/0267792 A1 | 9/2015 | Hochmayr et al. | |
| 2015/0275742 A1 | 10/2015 | Chekaiban et al. | |
| 2015/0377341 A1 | 12/2015 | Renner et al. | |
| 2016/0061088 A1* | 3/2016 | Minnichsoffer | F16H 57/035 60/320 |
| 2016/0084146 A1* | 3/2016 | Almkvist | F01P 7/165 123/41.09 |
| 2016/0160989 A1 | 6/2016 | Millard et al. | |
| 2017/0166255 A1 | 6/2017 | Peterson et al. | |
| 2017/0248087 A1 | 8/2017 | Reisenberger et al. | |
| 2018/0073476 A1* | 3/2018 | Roten | F02M 35/0209 |
| 2019/0248227 A1 | 8/2019 | Nugteren et al. | |
| 2020/0217236 A1* | 7/2020 | Hudgens | F01N 13/1855 |
| 2021/0061088 A1 | 3/2021 | Wenger et al. | |
| 2021/0213822 A1 | 7/2021 | Ripley et al. | |
| 2022/0042434 A1* | 2/2022 | Tajima | F16H 9/18 |
| 2022/0105795 A1 | 4/2022 | Nelson et al. | |
| 2022/0120340 A1 | 4/2022 | Nichols et al. | |

FOREIGN PATENT DOCUMENTS

| | | |
|---|---|---|
| CN | 1284603 A | 2/2001 |
| CN | 1792661 A | 6/2006 |
| CN | 1982110 A | 6/2007 |
| CN | 101424200 A | 5/2009 |
| CN | 101445044 A | 6/2009 |
| CN | 101701547 A | 5/2010 |
| CN | 101708694 A | 5/2010 |
| CN | 102121415 A | 7/2011 |
| CN | 102226464 A | 10/2011 |
| CN | 103075278 A | 5/2013 |
| CN | 203702310 U | 7/2014 |
| DE | 3825349 A1 | 2/1989 |
| DE | 4427322 A1 | 2/1996 |
| DE | 4447138 | 12/1997 |
| DE | 19735021 A1 | 2/1999 |
| DE | 102005003077 A1 | 8/2006 |
| DE | 102007024126 | 12/2008 |
| DE | 102014000450 A1 | 8/2014 |
| EP | 0511654 A2 | 11/1992 |
| EP | 0856427 A1 | 8/1998 |
| EP | 0898352 A1 | 2/1999 |
| EP | 1077149 A2 | 2/2001 |
| EP | 0928885 B1 * | 4/2003 |
| EP | 1382475 A1 | 1/2004 |
| EP | 1433645 A2 | 6/2004 |
| EP | 2033878 A1 | 3/2009 |
| EP | 2145808 A1 | 1/2010 |
| FR | 2941424 A1 | 7/2010 |
| GB | 2349483 A | 11/2000 |
| GB | 2431704 A | 5/2007 |
| GB | 2454349 A | 5/2009 |
| GB | 2505767 A | 3/2014 |
| JP | 58-126434 | 7/1983 |
| JP | 59-039933 | 3/1984 |
| JP | 60-209616 A | 10/1985 |
| JP | 61-135910 | 6/1986 |
| JP | 62-007925 A | 1/1987 |
| JP | 10-280968 A | 10/1998 |
| JP | 2005-130629 A | 5/2005 |
| JP | 2005-299469 A | 10/2005 |
| JP | 2007-064080 A | 3/2007 |
| JP | 2007-278228 A | 10/2007 |
| JP | 2009-173147 A | 8/2009 |
| JP | 2009-220765 A | 10/2009 |
| JP | 2009-281330 A | 12/2009 |
| JP | 2010-064744 A | 3/2010 |
| KR | 10-2008-0028174 A | 3/2008 |
| WO | 98/04431 A1 | 2/1998 |
| WO | 00/15455 A2 | 3/2000 |
| WO | 2004/085194 A1 | 10/2004 |
| WO | 2009/059407 A1 | 5/2009 |
| WO | 2010/081979 A1 | 7/2010 |

(56) References Cited

FOREIGN PATENT DOCUMENTS

| WO | 2012/018896 A2 | 2/2012 |
|---|---|---|
| WO | 2014/047488 A1 | 3/2014 |
| WO | 2014/059258 A1 | 4/2014 |

OTHER PUBLICATIONS

"Honda develps a powerful, fuel-efficient 700cc engine for midsize motorcycle", Honda news release from www.world.honda.com; dated Sep. 26, 2011.
"Straight-twin engine", Wikipedia.org internet encyclopedia entry.
"Who makes the best turbo kit for the Polarsis RZR??", RZRforums.net internet forum discussion thread dated Jun. 25, 2010.
53 Series Aerocharger RZR XP 900 Turbocharger kit, retrieved from www.sidebysidesports.com/53seaerzxp9.html on Jan. 10, 2019, Internet Wayback Machine capture dated Apr. 26, 2011 (Year: 2011).
Fang et al., Research on Generator Set Control of Ranger Extender Pure Electric Vehicles, Power and Energy Conference (APPEEC), 2010 Asia-Pacific, Mar. 31, 2010.
Heitner, Range extender hybrid vehicle, Intersociety Energy Conversion Engineering Conference Proceedings, vol. 4, pp. 323-338, 1991.
International Preliminary Report on Patentability received for PCT Patent Application No. PCT/US10/49167, mailed on Oct. 18, 2012, 30 pages.
International Preliminary Report on Patentability received for PCT Patent Application No. PCT/US2015/061272, mailed on May 12, 2017, 22 pages.
International Search Report and Written Opinion received for PCT Patent Application No. PCT/US10/49167, mailed on Jul. 6, 2011, 9 pages.
International Search Report and Written Opinion received for PCT Patent Application No. PCT/US2015/061272, mailed on Aug. 12, 2016, 13 pages.
Letter Exam Report issued by the State Intellectual Property Office (SIPO), dated Mar. 18, 2015, for related Chinese Application No. 201080046628.5; 20 pages.
Office Action issued by the U.S. Patent and Trademark Office, dated Oct. 1, 2018, for U.S. Appl. No. 15/751,403; 7 pages.
Polaris RZR XP 900 Review, retrieved from www.world-of-atvs.com/polaris-rzr-xp-900.html on Jan. 10, 2019, Internet Wayback Machine capture dated Mar. 12, 2012 (Year: 2012).
Response to Office Action filed with the U.S. Patent and Trademark Office, filed Dec. 19, 2018, for U.S. Appl. No. 15/751,403; 9 pages.
Office Action issued by the Canadian Intellectual Property Office, dated May 2, 2023, for Canadian Patent Application No. 3152773, 5 pages.

\* cited by examiner

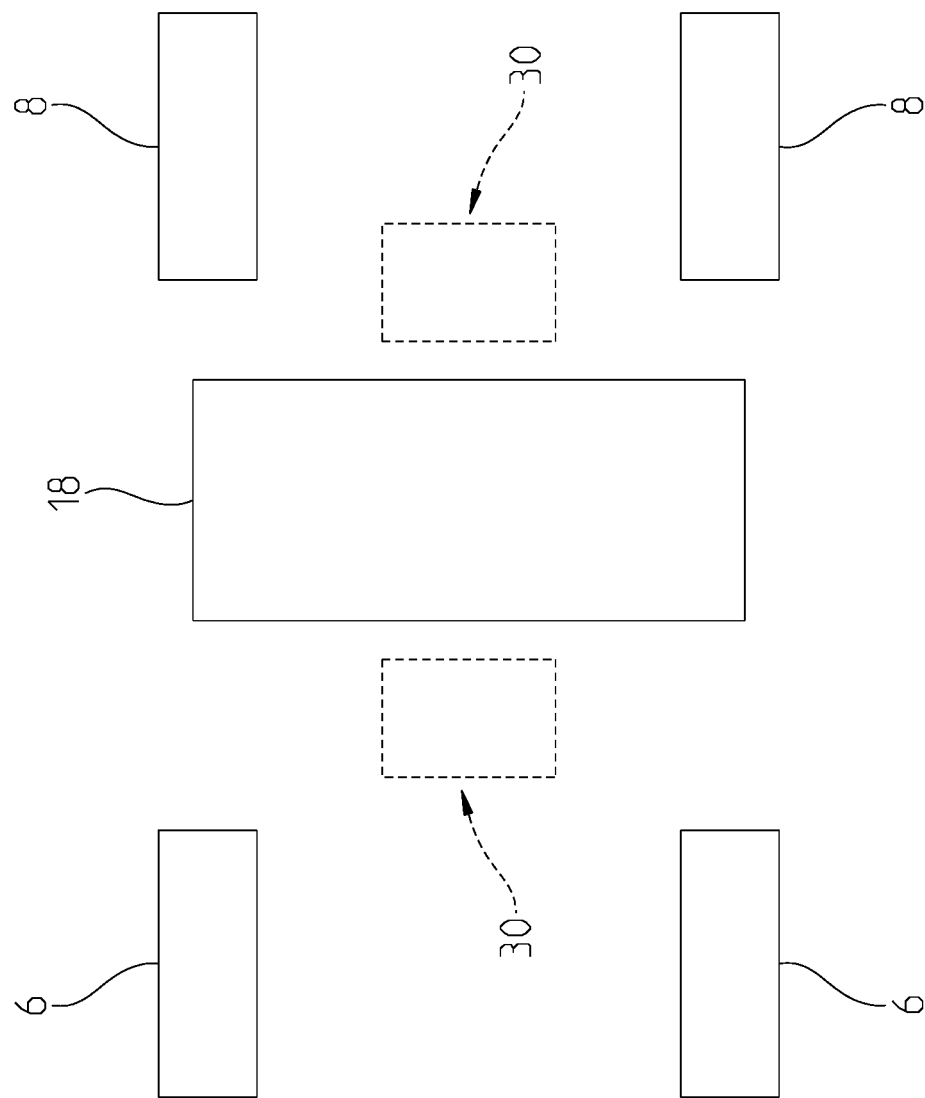

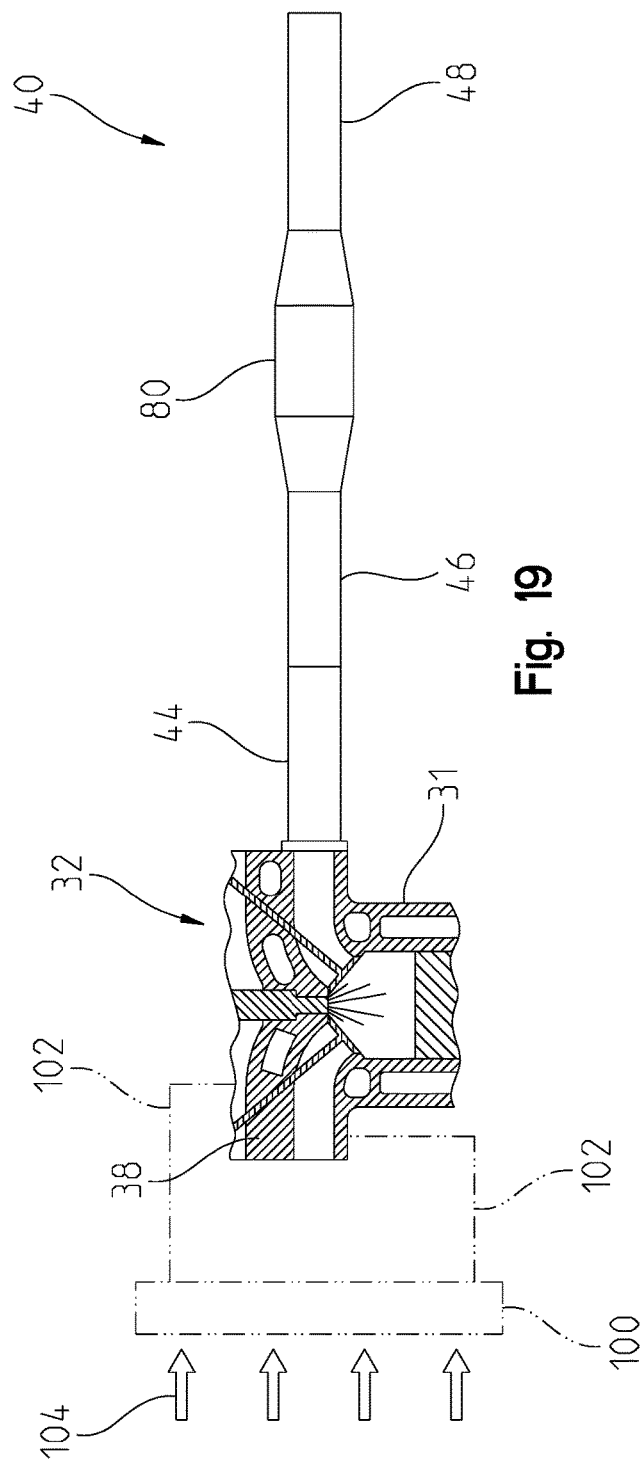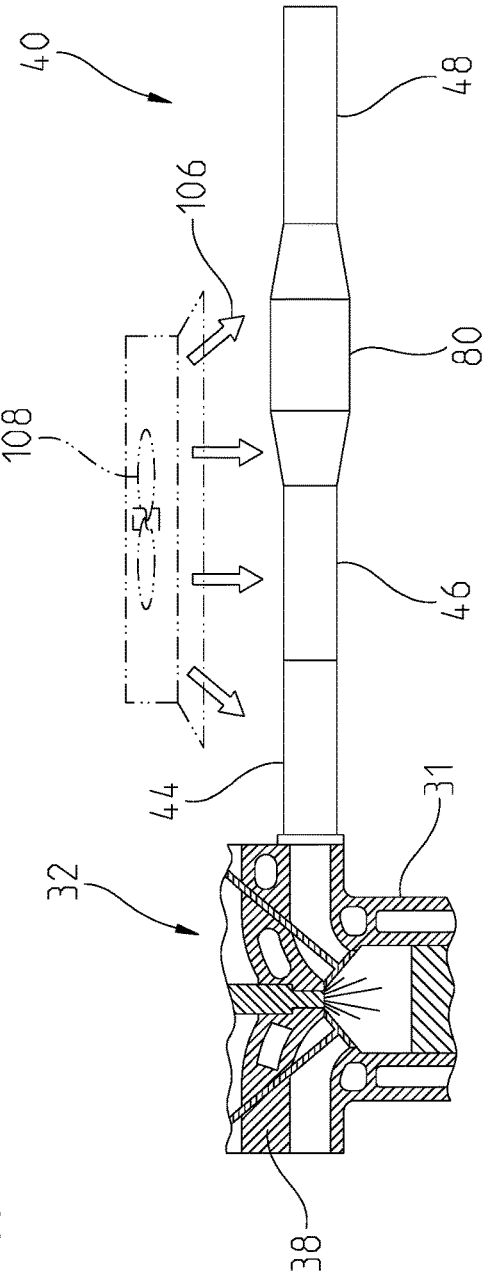

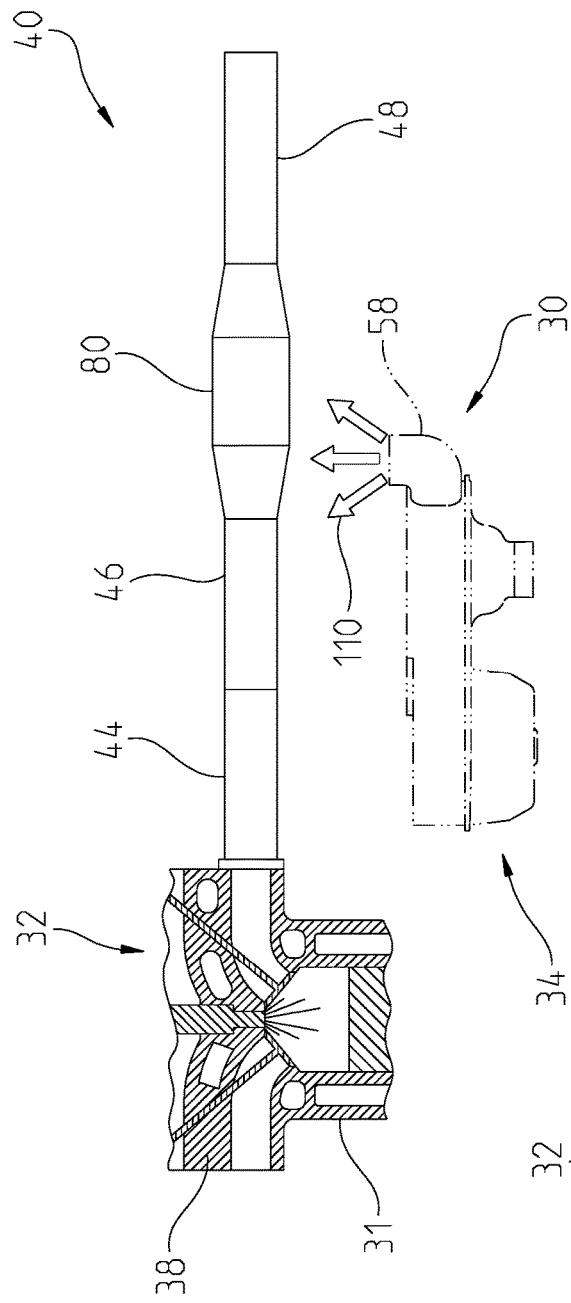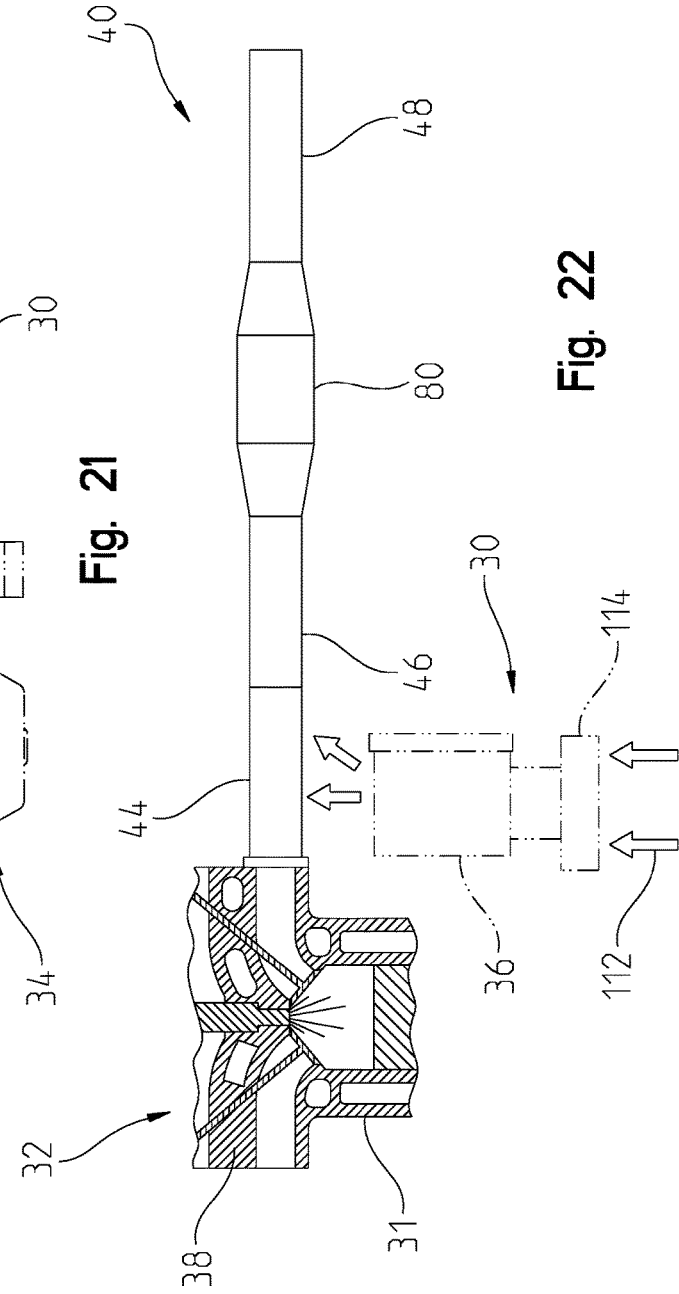

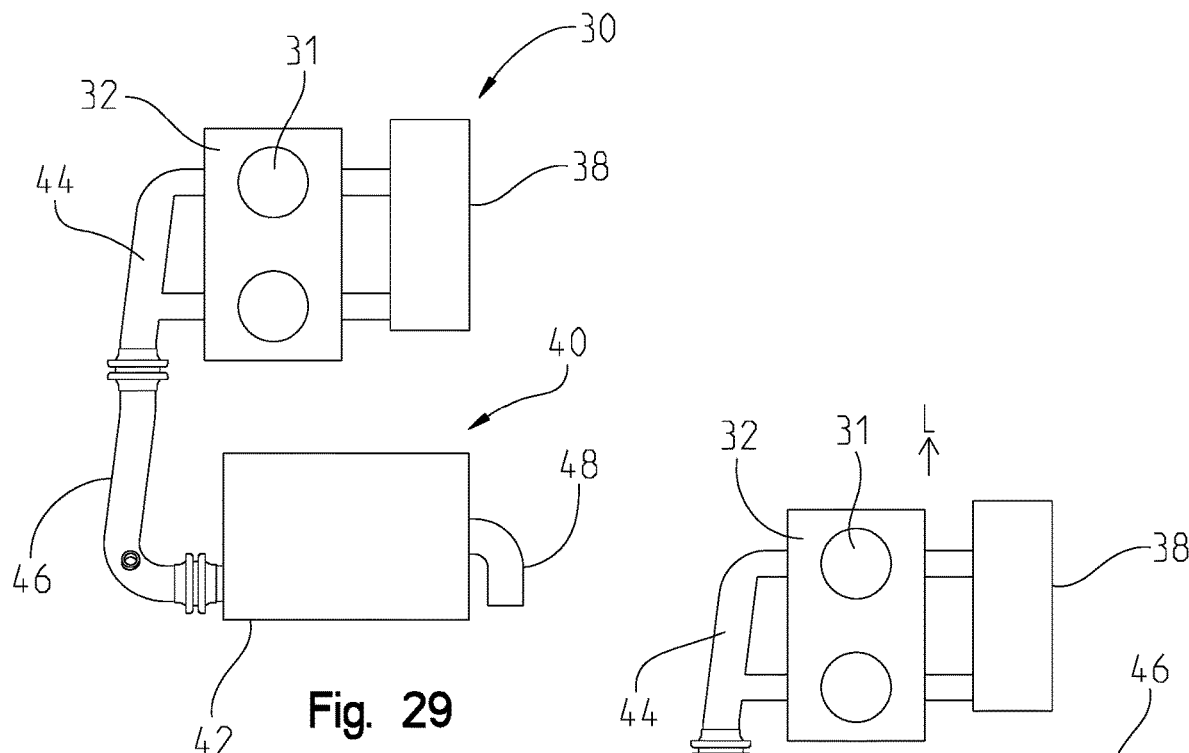
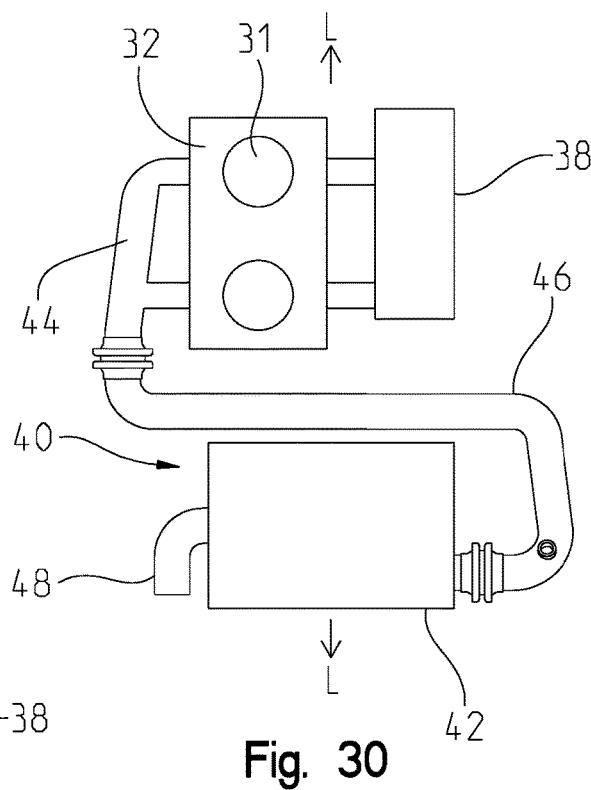
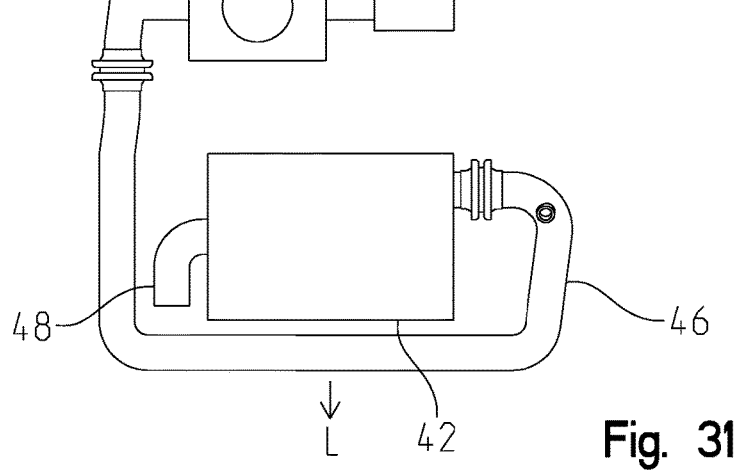
Fig. 29
Fig. 30
Fig. 31

EXHAUST ASSEMBLY FOR A UTILITY VEHICLE

CROSS-REFERENCE TO RELATED APPLICATIONS

The present application claims priority to U.S. Provisional Patent Application Ser. No. 63/184,496, filed on May 5, 2021, and entitled "EXHAUST ASSEMBLY FOR A UTILITY VEHICLE", the complete disclosure of which is expressly incorporated by reference herein.

TECHNICAL FIELD

The present invention relates generally to an exhaust assembly for a vehicle and, in particular, to an exhaust assembly for a utility or off-road vehicle configured to reduce emissions therefrom.

BACKGROUND

Off-road vehicles are typically smaller than automotive vehicles and are not classified according to automotive standards and regulations. As such, off-road vehicles may have different emissions regulations compared to automotive emissions regulations. However, if various parameters of off-road vehicles change, such as the size of the vehicle, the performance of the vehicle, etc., the vehicle may be required to meet different emissions standards. As emissions standards in the U.S., Europe, and other parts of the world change, there is a need to provide an off-road vehicle configured for increased performance and which is capable of meeting more stringent emissions regulations.

SUMMARY

In one embodiment of the present disclosure, a utility vehicle comprises a frame assembly extending along a longitudinal axis and defining an operator area, a plurality of ground-engaging members supporting the frame assembly and including front ground-engaging members and rear ground-engaging members, a powertrain assembly supported by the frame assembly and including at least an engine and a transmission operably coupled to the engine, and an exhaust assembly comprising an exhaust conduit fluidly coupled to the engine, a catalyst fluidly coupled to exhaust conduit and configured to receive exhaust gas from the exhaust conduit, and a cooling mechanism configured to provide cooling fluid to a portion of the exhaust assembly.

In a further embodiment, a method of cooling a portion of an exhaust assembly for an engine of a utility vehicle comprises providing an exhaust conduit, fluidly coupling a catalyst to the exhaust conduit, directing a fluid at a portion of the exhaust assembly, and decreasing a temperature of an exhaust gas flowing through the exhaust assembly after directing a fluid at the portion of the exhaust assembly.

In yet another embodiment, a utility vehicle comprises a frame assembly extending along a longitudinal axis and defining an operator area, a plurality of ground-engaging members supporting the frame assembly and including front ground-engaging members and rear ground-engaging members, a powertrain assembly supported by the frame assembly and including at least an engine and a transmission operably coupled to the engine, and an exhaust assembly comprising an exhaust conduit fluidly coupled to the engine, a first catalyst fluidly coupled to exhaust conduit and configured to receive exhaust gas from the exhaust conduit, and a second catalyst positioned downstream of the first catalyst along the exhaust conduit.

In a further embodiment, a utility vehicle comprises a frame assembly extending along a longitudinal axis and defining an operator area, a plurality of ground-engaging members supporting the frame assembly and including front ground-engaging members and rear ground-engaging members, a powertrain assembly supported by the frame assembly and including at least an engine and a transmission operably coupled to the engine, and an exhaust assembly comprising an exhaust conduit fluidly coupled to the engine, and a catalyst fluidly coupled to exhaust conduit and configured to receive exhaust gas from the exhaust conduit, and the exhaust conduit, the engine, and the catalyst are positioned adjacent each other along the longitudinal axis.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 8A is a top schematic view of the placement of a powertrain assembly of the utility vehicle of FIG. 1;

FIG. 19 is a schematic view of a second cooling embodiment for the exhaust assembly disclosed herein;

FIG. 20 is a schematic view of a third cooling embodiment for the exhaust assembly disclosed herein;

FIG. 21 is a schematic view of a fourth cooling embodiment for the exhaust assembly disclosed herein;

FIG. 22 is a schematic view of a fifth cooling embodiment for the exhaust assembly disclosed herein;

FIG. 29 is a schematic view of a convention exhaust conduit length which does not utilize the eleventh cooling embodiment of FIG. 28;

FIG. 30 is a schematic view of an extended length of the exhaust conduit utilizing the eleventh cooling embodiment of FIG. 28;

FIG. 31 is a further schematic view of an extended length of the exhaust conduit utilizing the eleventh cooling embodiment of FIG. 28;

Corresponding reference characters indicate corresponding parts throughout the several views. Unless stated otherwise the drawings are proportional.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle with one or more ground-engaging members, including, but not limited to, all-terrain vehicles, motorcycles, snowmobiles, scooters, three-wheeled vehicles, and golf carts.

Referring to FIGS. 1-7, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, MN 55340 or non-pneumatic tires, such as those shown in U.S. Pat. Nos. 8,176,957 and 8,104,524, the complete disclosures of which are expressly incorporated herein by reference.

Figure 1:
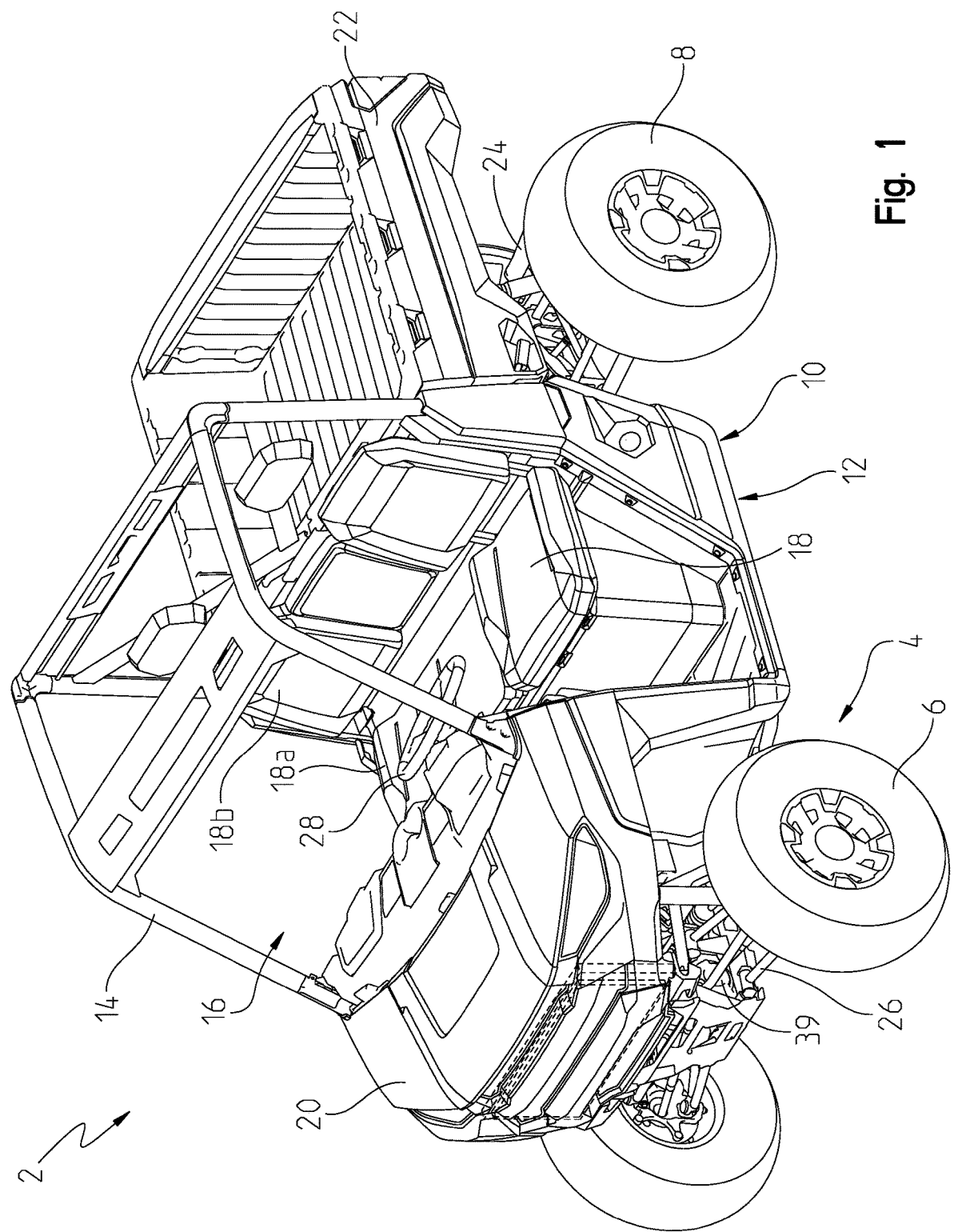
FIG. 1 is a front left perspective view of a utility vehicle of the present disclosure.
Figure 2:
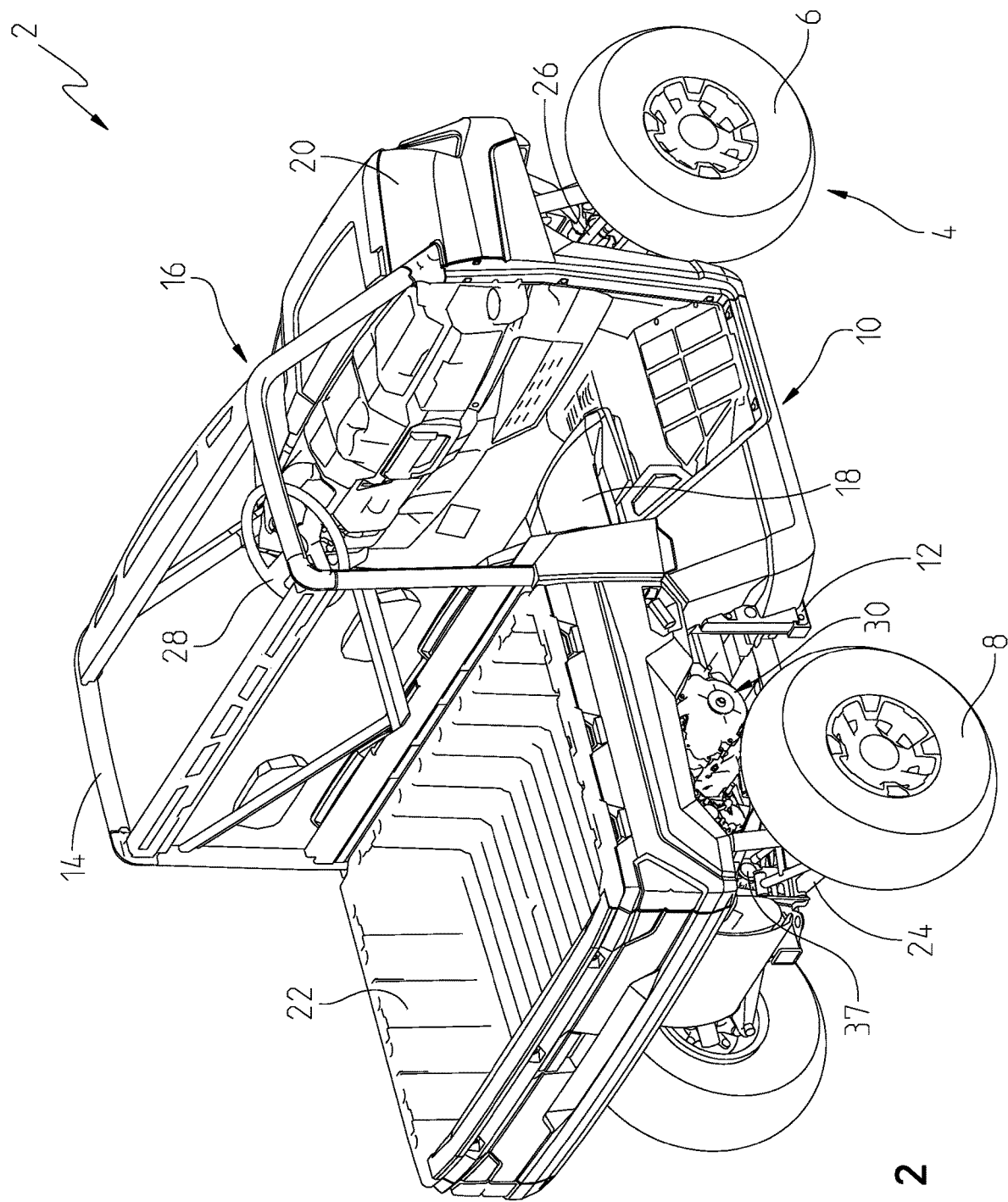
FIG. 2 is a rear right perspective view of the utility vehicle of FIG. 1.
Figure 3:
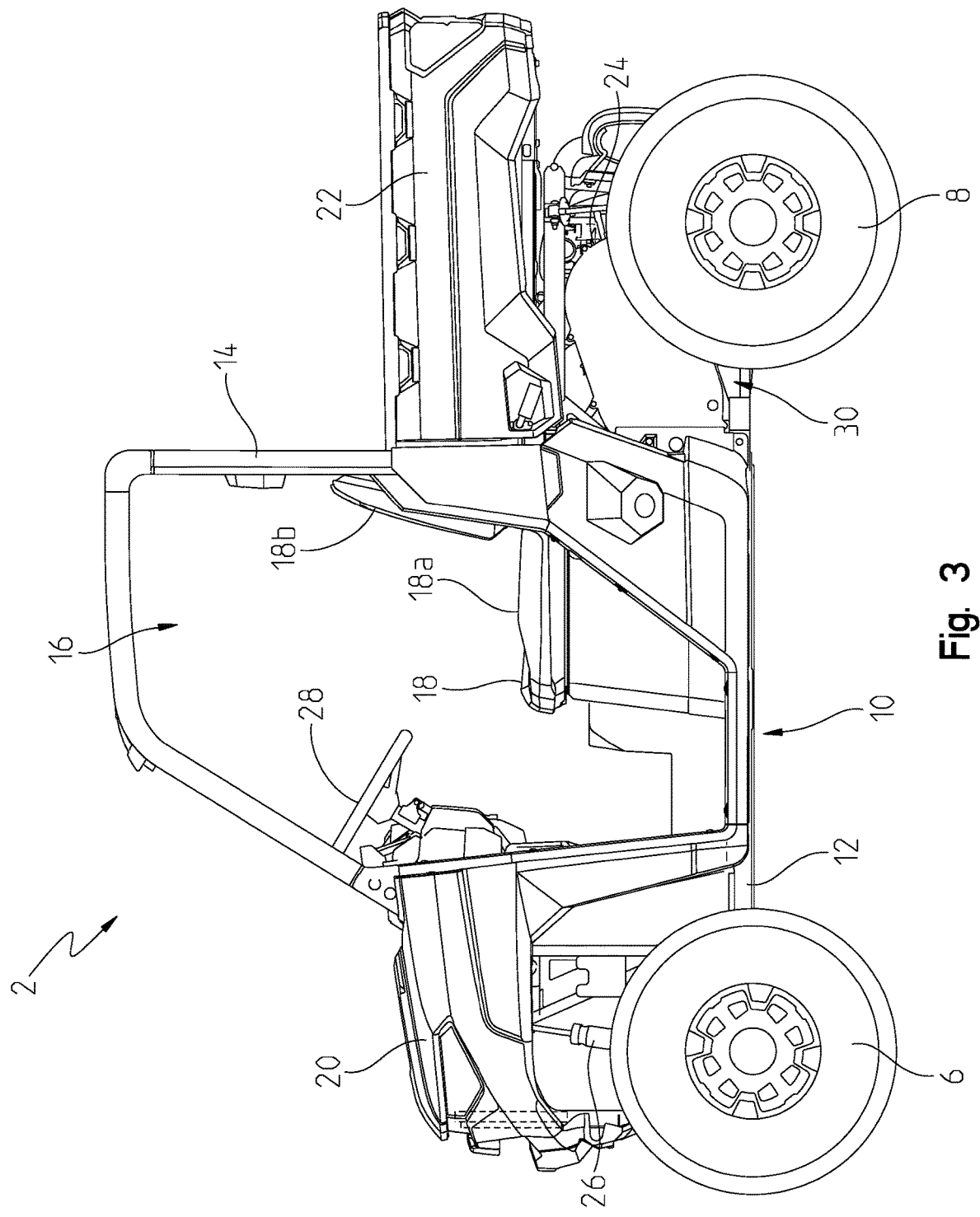
FIG. 3 is a left side view of the utility vehicle of FIG. 1.
Figure 4:
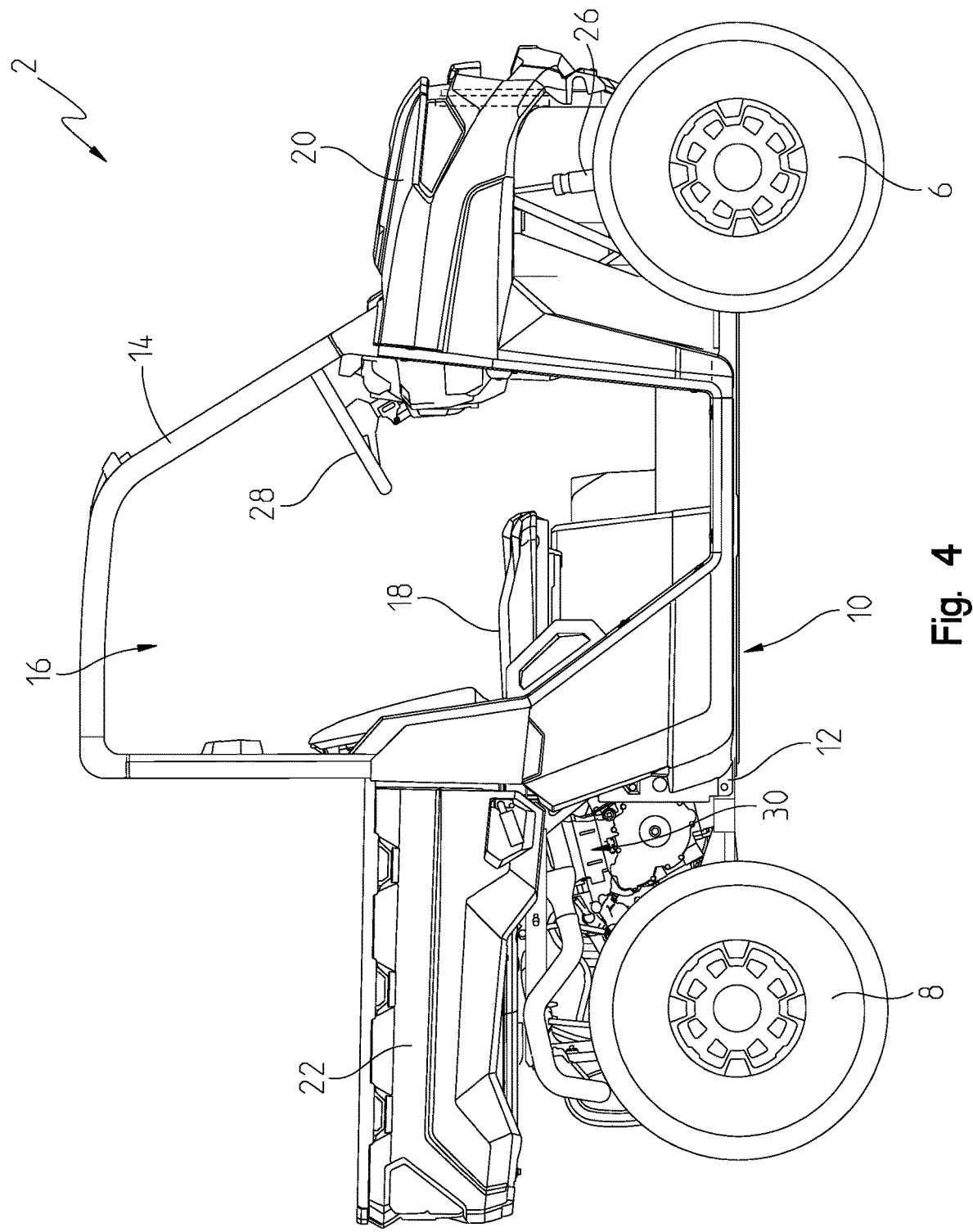
FIG. 4 is a right side view of the utility vehicle of FIG. 1.
Figure 5:
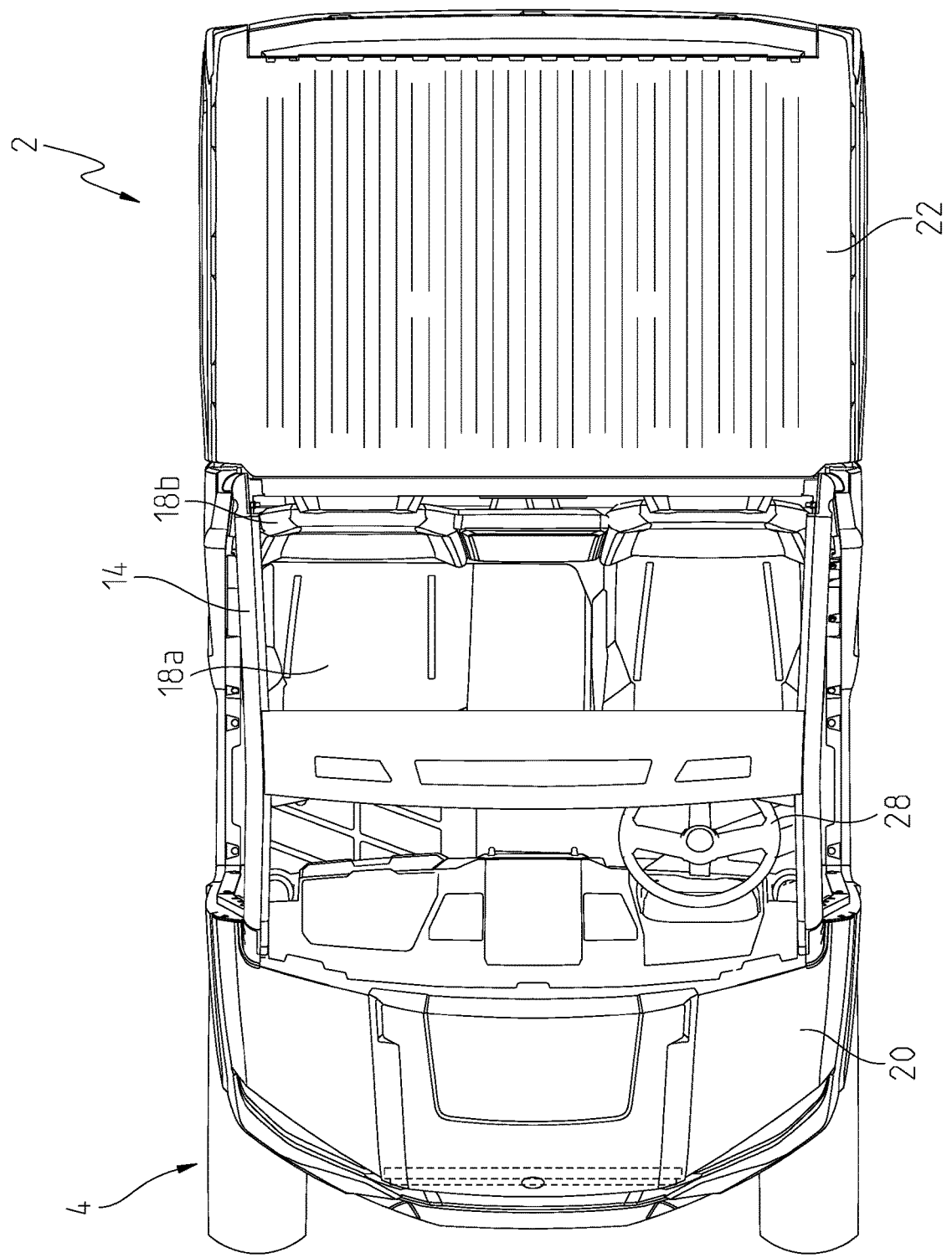
FIG. 5 is a top view of the utility vehicle of FIG. 1.
Figure 6:
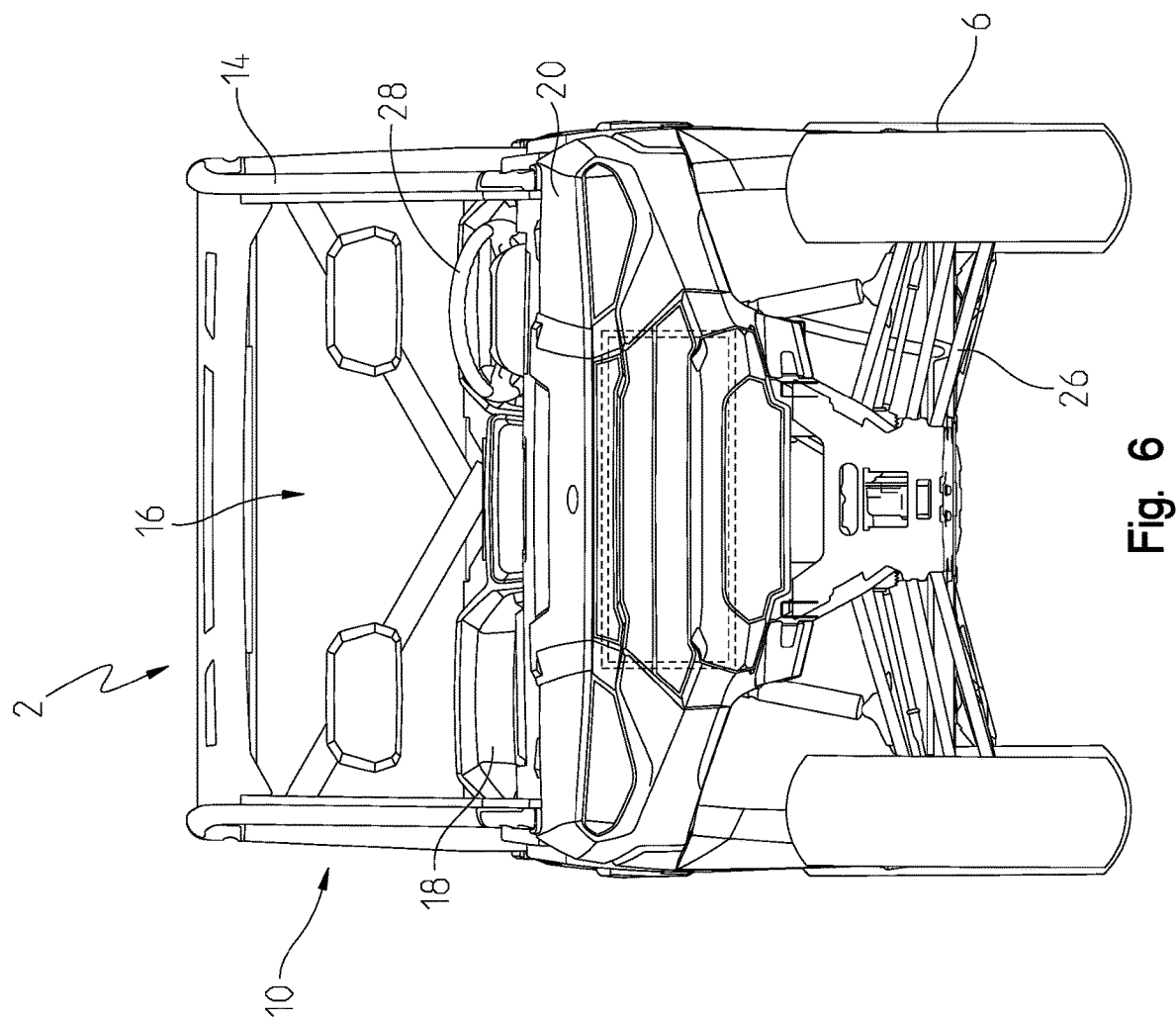
FIG. 6 is a front view of the utility vehicle of FIG. 1.
Figure 7:
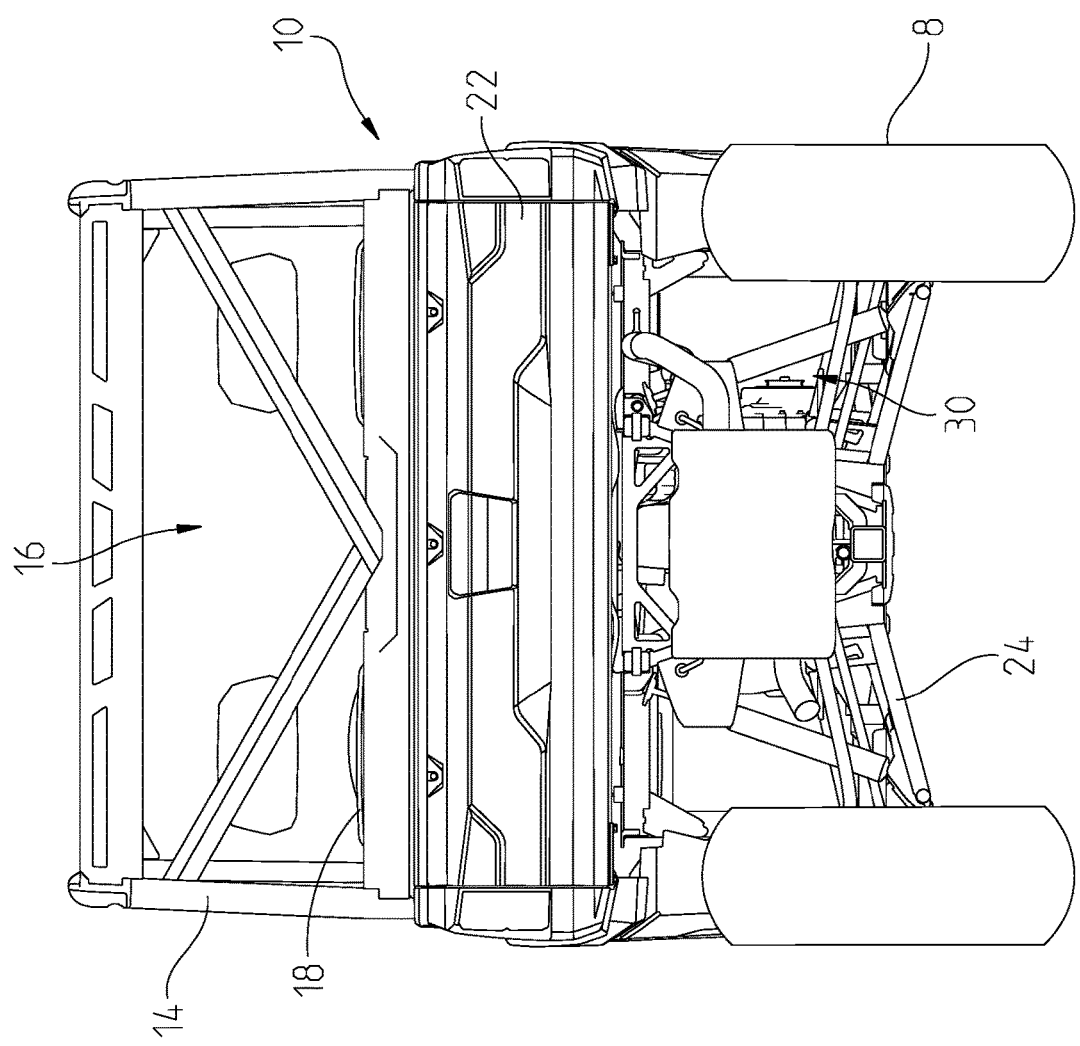
FIG. 7 is a rear review of the utility vehicle of FIG. 1.
Figure 8B:
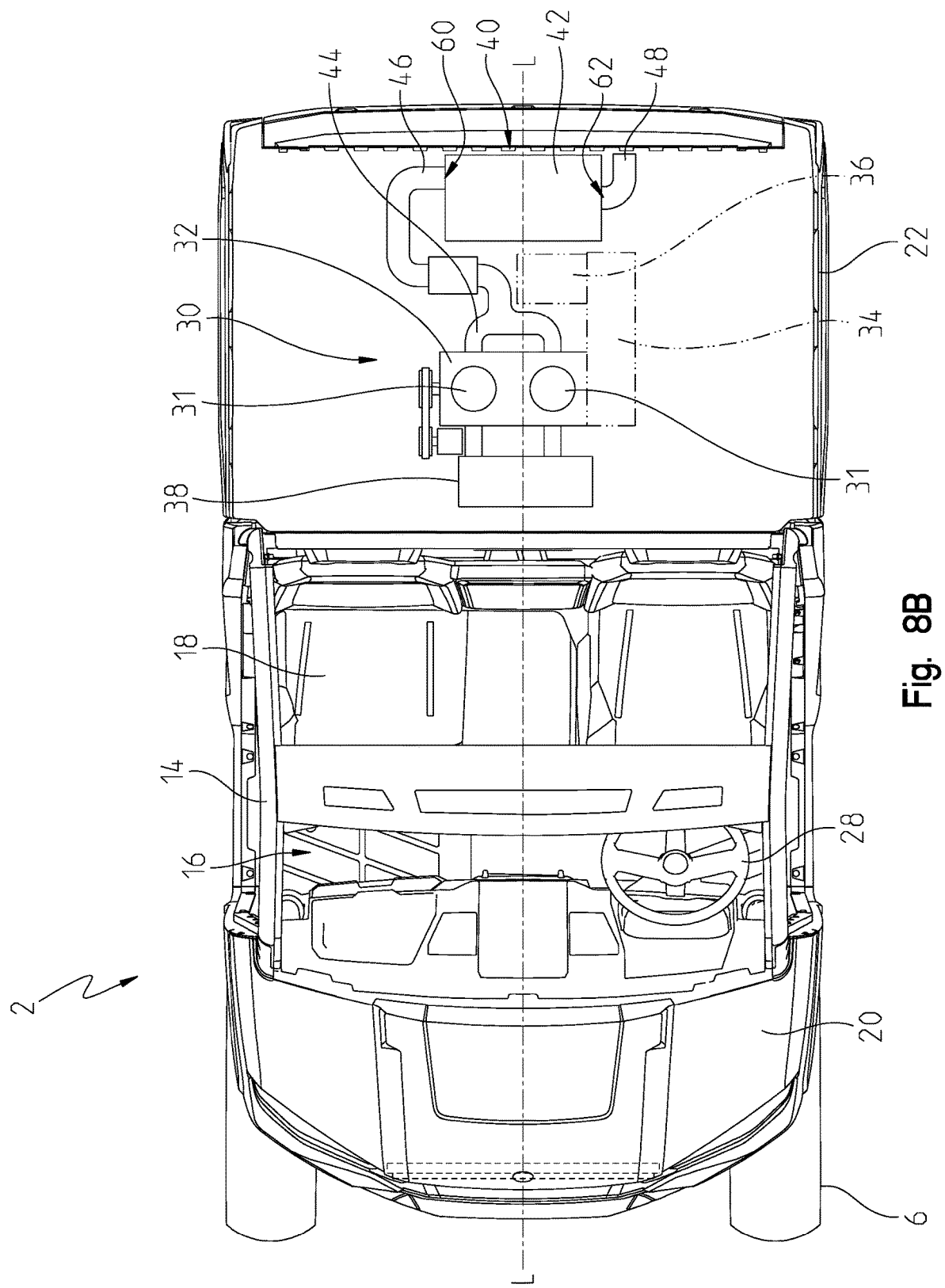
FIG. 8B is a top view of the utility vehicle of FIG. 1 and schematically illustrating a first embodiment of the powertrain assembly and an exhaust assembly.

Vehicle 2 further includes a frame assembly 10 supported by ground-engaging members 4, which extends along a longitudinal axis L of vehicle 2 (FIG. 8B). Frame assembly 10 includes a lower frame assembly 12 and an upper frame assembly 14 coupled together. Upper frame assembly 14 generally extends above lower frame assembly 12. Frame assembly 10 supports a rear cargo area 22 and a vehicle body 20, which includes a plurality of body panels, such as a hood.

Vehicle 2 also includes an open-air operator area 16 which, illustratively, includes seating 18 for one or more passengers. As such, operator area 16 is exposed to ambient air and is not fully enclosed. Alternatively, vehicle 2 may include a cab assembly (not shown), such as a roof, front windshield, rear windshield, and doors, to enclose operator area 16. Upper frame assembly 14 may be positioned generally around operator area 16 such that seating 18 is at least partially surrounded by upper frame assembly 14. Illustratively, seating 18 includes an operator seat and a passenger seat, however, seating 18 may also include rear seats for additional passengers or may include only a single seat for carrying the operator. Seating 18 may include a seat bottom 18a and a seat back 18b.

Operator area 16 further includes a plurality of operator controls 28, such as a steering wheel, by which an operator may provide inputs for operating vehicle 2. Various operator controls, including the steering assembly, may be further described in International Patent Application No. PCT/US13/64516, filed on Oct. 11, 2013, the complete disclosure of which is expressly incorporated by reference herein.

Referring still to FIGS. 1-7, vehicle 2 includes a rear suspension assembly 24 and a front suspension assembly 26, both supported by lower frame assembly 12. Additional details of suspension assemblies 24, 26 may be disclosed in U.S. Pat. No. 9,566,858, issued on Feb. 14, 2017 and U.S. patent application Ser. No. 16/226,797, filed Dec. 20, 2018, the complete disclosures of which are expressly incorporated by reference herein.

Referring to FIGS. 8A-8D, vehicle 2 further includes a powertrain assembly 30 which is supported by lower frame assembly 12 and includes at least a prime mover, illustratively an engine 32, a drivetrain which may be configured as or includes a shiftable transmission 36, a continuously variable transmission ("CVT") 34, and an air intake assembly 38. Powertrain assembly 30 may be located at different positions within vehicle 2, as shown by the various phantom depictions of powertrain 30. While vehicle 2 is illustratively shown to include the above-listed powertrain components, vehicle 2 is not limited as such and any powertrain arrangement may be included. Powertrain assembly 30 further includes final drives or differentials, for example a front drive 39 and a rear drive 37. Rear drive 37 is operably coupled to rear ground-engaging members 8 through half shafts and, similarly, front drive 39 is operably coupled to front ground-engaging members 6 through half shafts.

Engine 32 is positioned rearward of operator area 16 and generally rearward of seating 18. While the prime mover is disclosed as engine 32, the prime mover may be any type of device configured to provide power to vehicle 2, such as an electric motor, a fuel-based engine, a hybrid engine, a generator, etc. Engine 32 may be any size and include any number of cylinders 31, for example one cylinder, two cylinders, three cylinders, four cylinders, six cylinders, or eight cylinders. Air intake assembly 38 is fluidly coupled to an intake manifold of engine 32 to provide combustion air thereto.

Additionally, CVT 34 and shiftable transmission 36 are positioned at least partially rearward of operator area 16 and seating 18. CVT 34 is operably coupled to both engine 32 and shiftable transmission 36. More particularly, CVT 34 is operably coupled to engine 32 through a crankshaft (not labeled) of engine 32 and is operably coupled to shiftable transmission 36 through an input shaft (not labeled) of shiftable transmission 36. In various embodiments, CVT 34 may be positioned longitudinally forward of engine 32 or laterally outward of at least a portion of engine 32. Shiftable transmission 36 also may be positioned longitudinally forward or rearward of engine 32 or laterally outward of at least a portion of a portion of engine 32.

Figure 9:
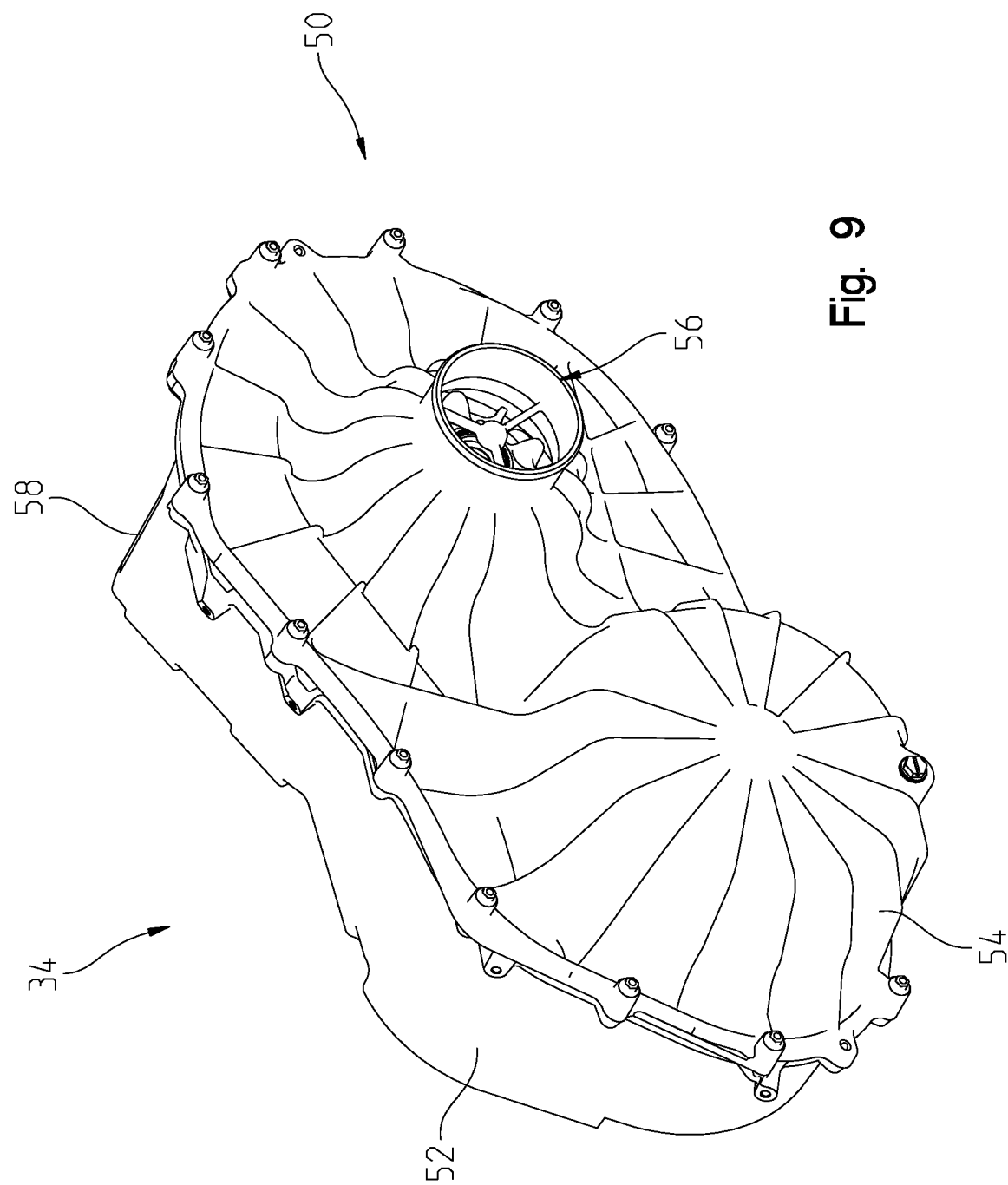
FIG. 9 is a front left perspective view of a continuously variable transmission of the powertrain assembly of FIGS. 8B and 8D.

As shown in FIG. 9, CVT 34 includes a housing 50 having an inner portion or cover 52 and an outer portion or cover 54 removably coupled together. CVT housing 50 includes a single air intake or inlet port 56 for receiving air to cool CVT 34 and a single air exhaust or outlet port 58 to exhaust warm or hot air from CVT 34. Illustratively, outer cover 54 includes air inlet port 56 and inner cover 52 includes air outlet port 58. As is known, CVT 34 includes a drive clutch or pulley, a driven clutch or pulley, and a belt extending therebetween (not shown). In one embodiment of CVT 34, the belt is a rubber belt, however, in other embodiments of CVT 34, the belt is a steel belt.

Because vehicle 2 is configured for off-road applications, powertrain assembly 30, including an exhaust assembly 40, may have reduced heat rejection potential length before a catalyst (e.g., a catalytic converter) of exhaust assembly 40 due to powertrain assembly 30 being positioned generally rearward of at least a portion of operator area 16, higher load duty cycle compared to typical on-road, passenger vehicle usage profiles, higher specific power engines (Hp/L) which may lead to increased exhaust gas temperatures, increased potential for higher vibration/mechanical shock loads due to jumps that vehicle 2 is capable of, and/or increased exposure to debris (e.g., dust, mud, grass). As such, exhaust assembly 40 may be configured as disclosed herein in view of the foregoing.

Referring again to FIGS. 8B-8D, vehicle 2 further includes exhaust assembly 40 fluidly coupled to powertrain assembly 30 and, more particularly, fluidly coupled to engine 32. Exhaust assembly 40 includes a muffler 42, an exhaust manifold 44, an exhaust conduit 46, and a tailpipe or outlet 48. Illustratively, exhaust manifold 44 is coupled to engine 32 and exhaust conduit 46 such that exhaust gases from engine 32 flow into exhaust manifold 44 and through exhaust conduit 46. Exhaust conduit 46 and outlet 48 are both coupled to muffler 42 and the exhaust gases in exhaust conduit 46 flow into muffler 42 and exit vehicle 2 at outlet 48. Muffler 42 may be considered a silencer and is configured for sound attenuation within exhaust assembly 40.

Powertrain assembly 30 and exhaust assembly 40 may have various configurations. Illustratively, in the embodiment FIG. 8B, engine 32 is positioned longitudinally rearward of air intake assembly 38 and cylinders 31 of engine 32 are positioned in a lateral arrangement generally perpendicular to longitudinal axis L. In this configuration of engine 32, CVT 34 is positioned laterally outward of engine 32 and extends generally parallel longitudinal axis L. In one embodiment, CVT 34 is generally positioned rearward of a portion of the driver seat of seating 18 and is to the left of longitudinal axis L. In other embodiments, air intake assembly 38 may be positioned at any location relative to engine 32 (e.g., above engine 32, forward of engine 32, etc.).

Referring still to FIG. 8B, exhaust manifold 44 is positioned longitudinally rearward of cylinders 31 and may be longitudinally intermediate engine 32 and muffler 42. An inlet 60 of muffler 42 may be positioned to the right of longitudinal axis L and, as such, exhaust conduit 46 curves or bends towards a right side of vehicle 2 to couple with inlet 60 of muffler 42. An outlet 62 of muffler 42 may be positioned on a left side of longitudinal axis L. Muffler 42 extends laterally between inlet 60 and outlet 62 and intersects longitudinal axis L.

Figure 8C:
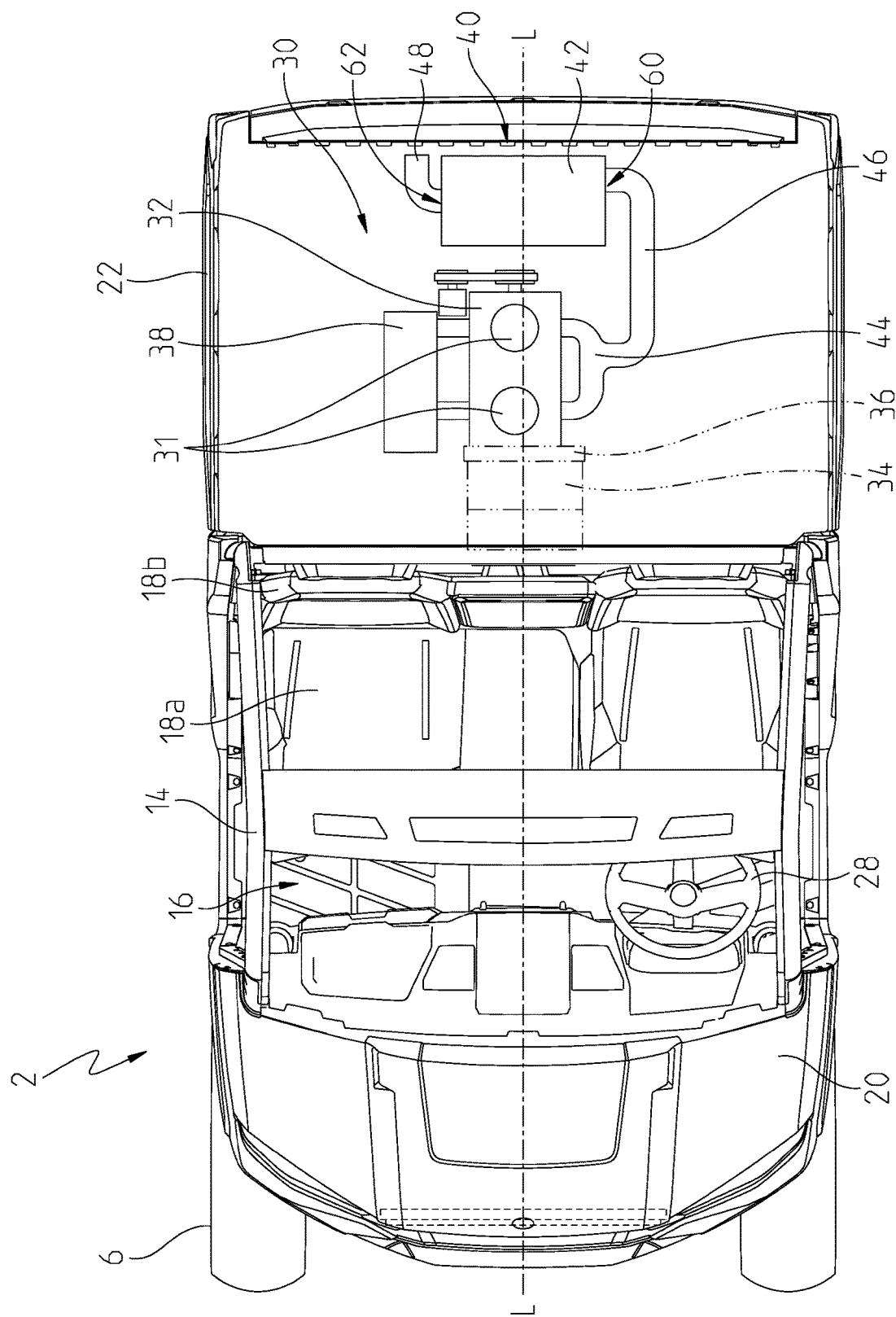
FIG. 8C is a top view of the utility vehicle of FIG. 1 and schematically illustrating a second embodiment of the powertrain assembly and the exhaust assembly.
Figure 8D:
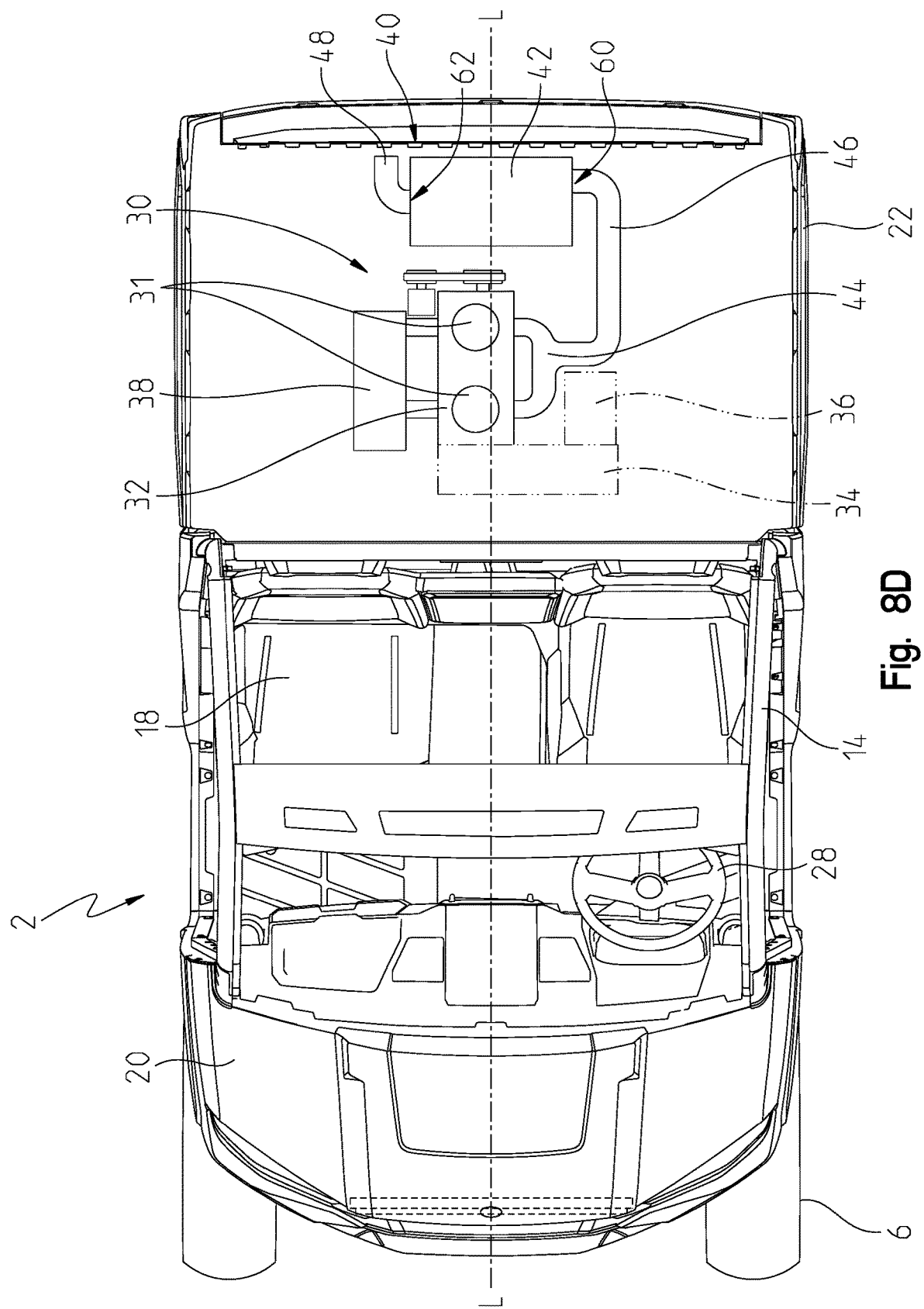
FIG. 8D is a top view of the utility vehicle of FIG. 1 and schematically illustrating a third embodiment of the powertrain assembly and the exhaust assembly.

Referring now to FIGS. 8C and 8D, the embodiments disclosed therein position engine 32 generally rearward of CVT 34 such that CVT 34 is longitudinally intermediate seating 18 and engine 32. In this configuration, cylinders 31 of engine 32 extend longitudinally and each cylinder may intersect longitudinal axis L. FIG. 8C discloses CVT 34 as a steel belt CVT while FIG. 8D discloses CVT 34 as a rubber belt CVT. Additional details of at least the steel belt CVT of FIG. 8C may be disclosed in U.S. patent application Ser. No. 17/147,937, filed on Jan. 13, 2021, the complete disclosure of which is expressly incorporated by reference herein. Illustratively, air intake assembly 38 is positioned laterally outward of engine 32 and, while shown to the right side of longitudinal axis L, air intake assembly 38 also may be positioned to the left side of longitudinal axis L. In the embodiment of FIGS. 8C and 8D, exhaust manifold 44 extends from engine 32 along a left side of longitudinal axis L and exhaust conduit 46 is generally parallel longitudinal axis L as it extends between exhaust manifold 44 and muffler 42. As such, inlet 60 of muffler 42 may be positioned on the left side of longitudinal axis L and outlet 62 of muffler 42 may be positioned on a right side of longitudinal axis L. Muffler 42 is positioned rearward of engine 32 such that engine 32 is longitudinally intermediate muffler 42 and CVT 34.

Figure 10:
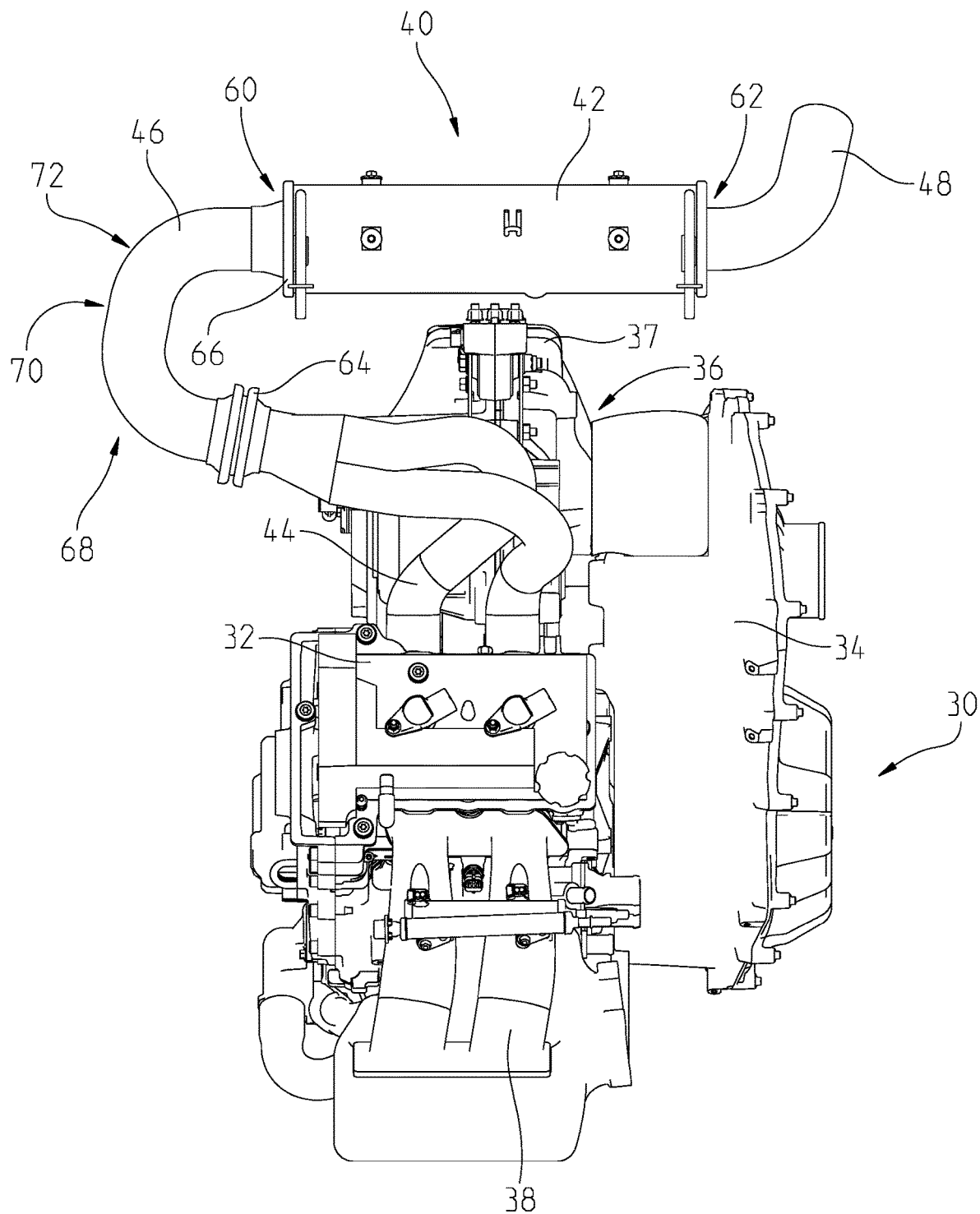
FIG. 10 is a top view of the powertrain assembly and the exhaust assembly of FIG. 8B.

Referring to FIG. 10, the embodiment of FIG. 8B is shown in further detail. Illustratively, exhaust conduit 46 may include a first coupling or joint 64 and a second coupling or joint 66. Exhaust conduit 46 includes a first bend 68, a generally linear portion 70, and a second bend 72, however, exhaust conduit 46 may include any configuration relative to longitudinal axis L, exhaust manifold 44, and muffler 42. The configuration of exhaust conduit 46 does not interfere with rear drive 37 or any other component supported on frame assembly 10. As shown in FIG. 10, exhaust manifold 44 may be positioned generally above a portion of shiftable transmission 36 and/or rear drive 37.

Figure 11:
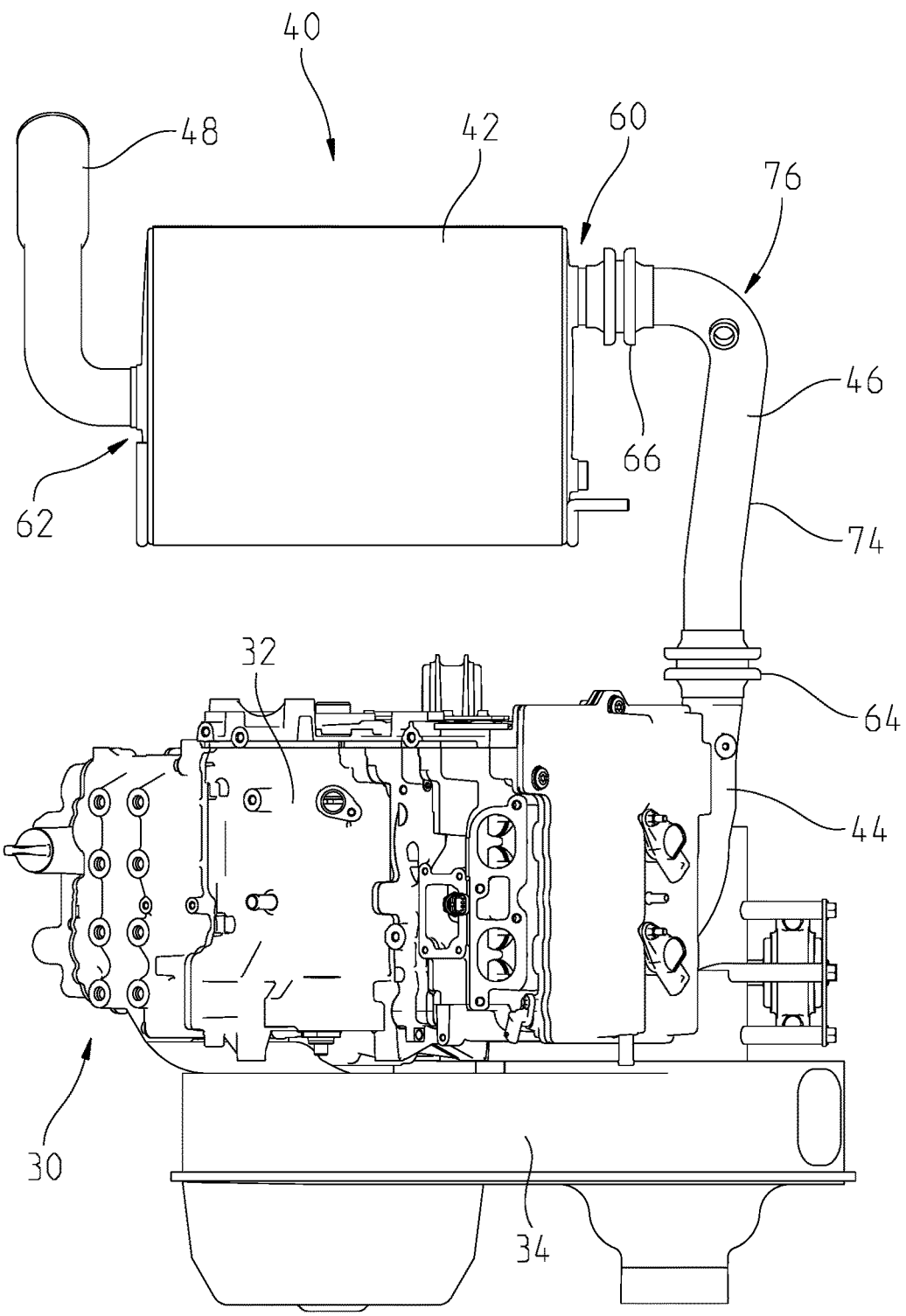
FIG. 11 is a top view of the powertrain assembly and the exhaust assembly of FIG. 8D.

Referring to FIG. 11, the embodiment of FIG. 8D is shown in further detail. Illustratively, exhaust conduit 46 is generally perpendicular to longitudinal axis L along a linear portion 74 but does include a bend portion 76 to couple with inlet 60 of muffler 42. Unlike the embodiment of FIG. 10, exhaust conduit 46 of FIG. 11 is positioned along the left side of longitudinal axis L.

Figure 12:
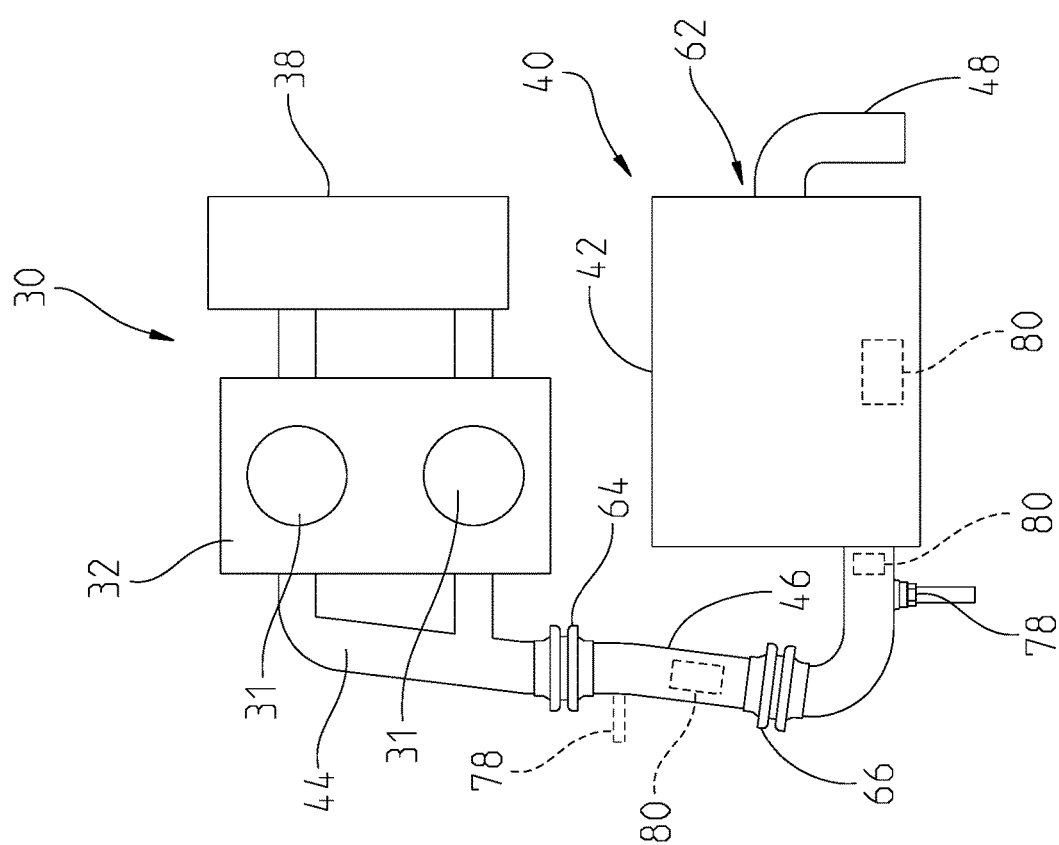
FIG. 12 is a schematic view of the exhaust assembly of the present disclosure having a first oxygen sensor.

Referring to FIG. 12, exhaust gas composition sensors are included on exhaust assembly 40 to measure oxygen and/or other gases within the exhaust gases flowing through exhaust assembly 40. Illustratively, exhaust assembly 40 includes at least one exhaust gas composition sensor 78 positioned upstream of muffler 42. As such, exhaust gas composition sensor 78 measures the oxygen concentration and/or composition within the exhaust gases before the gases flow into muffler 42. As shown in FIG. 12, exhaust gas composition sensor 78 is positioned downstream of couplings 64, 66 and no other couplings or joints are positioned between exhaust gas composition sensor 78 and at least a portion of muffler 42, such as catalyst 80. For example, sensor 78 and catalyst 80 may be placed immediately downstream of coupling 64 but upstream of coupling 66, downstream of both couplings 64, 66, within muffler 72, or downstream of muffler 42 (e.g., in outlet or tail pipe 48). In this way, sensor 78 and catalyst 80 may be placed at any location along the length or position of exhaust assembly 40.

In the embodiments disclosed further herein, a catalyst 80 may be positioned within muffler 42 to change the exhaust composition within the exhaust gases before the gases exit vehicle 2 at outlet 48. When catalyst 80 is positioned within muffler 42, there are no couplings or joints positioned between exhaust gas composition sensor 78 and catalyst 80. In this way, exhaust gas composition sensor 78 may be a pre-catalyst exhaust gas composition sensor. Because joints or couplings may periodically leak, thereby introducing fresh air into exhaust assembly 40, if a joint or coupling is positioned between exhaust gas composition sensor 78 and catalyst 80, the control system for engine 32 may be unable to correct for this added fresh air and could result decreased emissions performance by catalyst 80. Further, the introduction of fresh air may result in an inconsistent air volume of exhaust gas, which would lead to inefficiencies and inconsistencies in the performance of catalyst 80. As such, the embodiments disclosed herein do not include a joint or coupling (e.g., couplings 64, 66) between any exhaust gas composition sensors (e.g., exhaust gas composition sensor 78) and catalyst 80. It may be apparent that the illustrative embodiments do not disclose any assembled couplings or joints in between catalyst 80 and the post-catalyst exhaust gas composition sensor 78.

Figure 28:
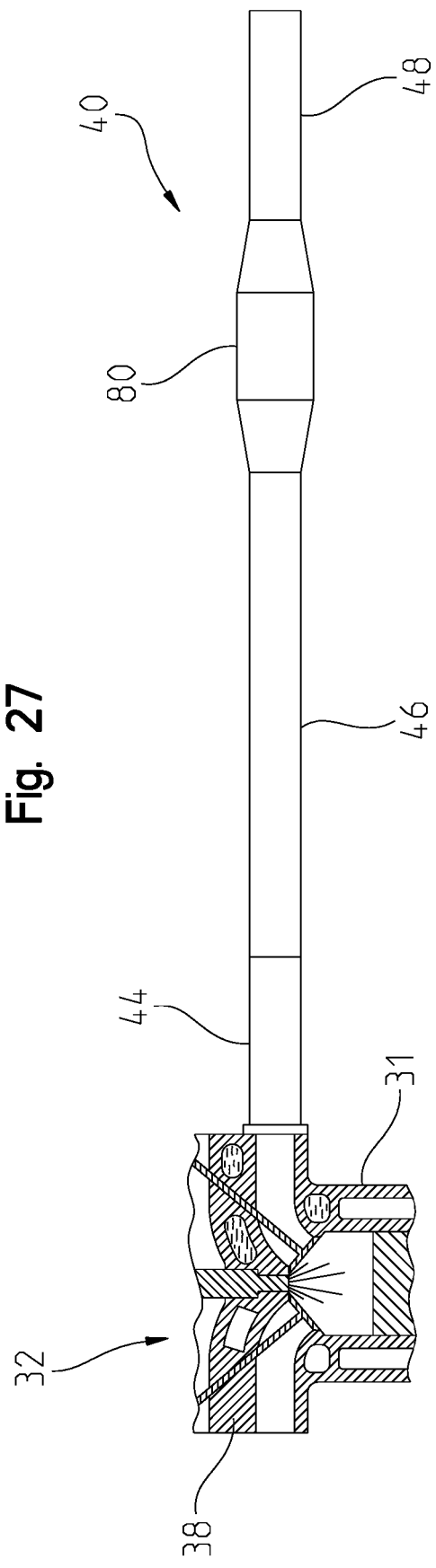
FIG. 28 is a schematic view of an eleventh cooling embodiment for the exhaust assembly disclosed herein.
Figure 32:
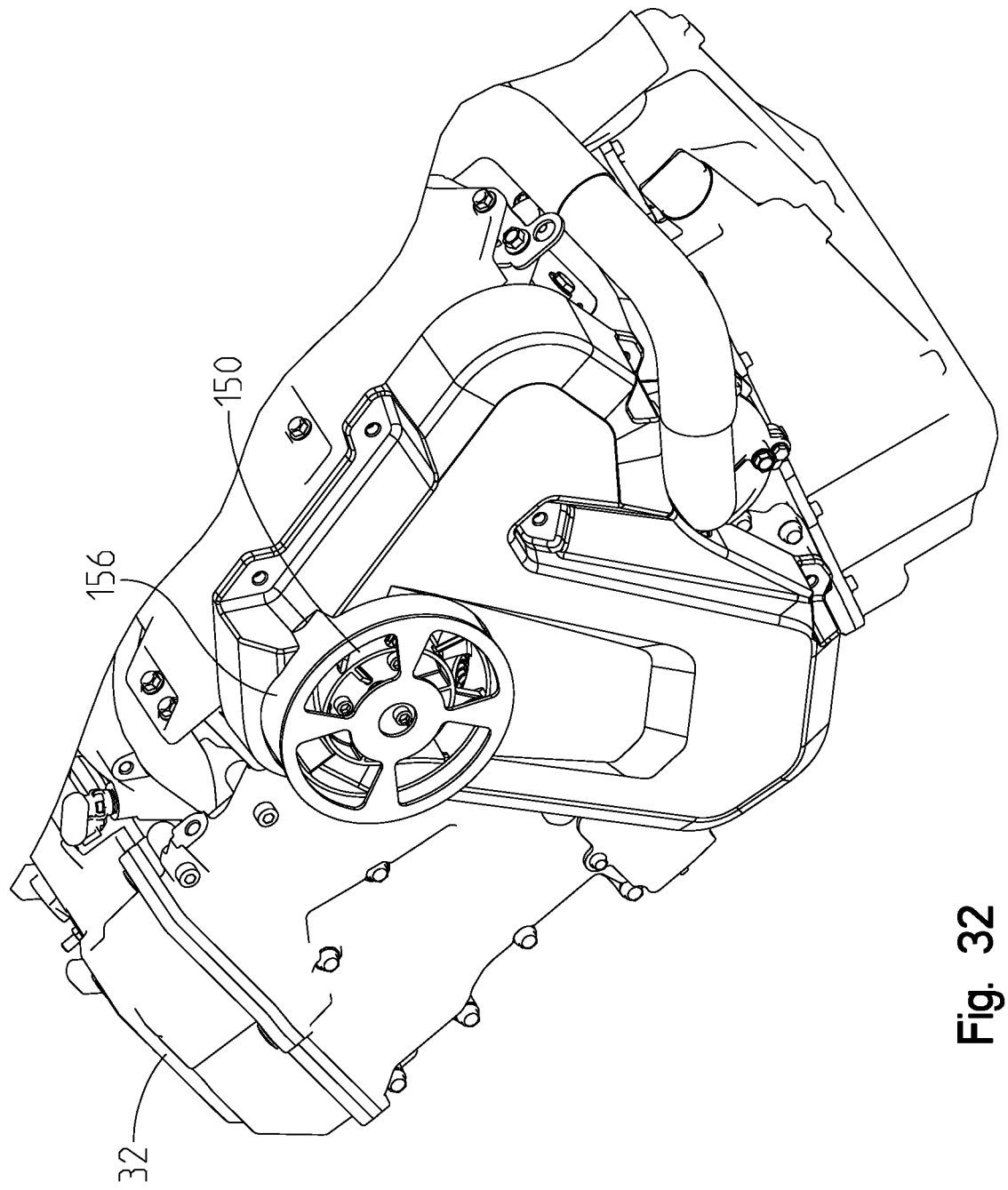
FIG. 32 is a rear perspective view of a portion of an engine and an alternator of the vehicle FIG. 1.
Figure 33:
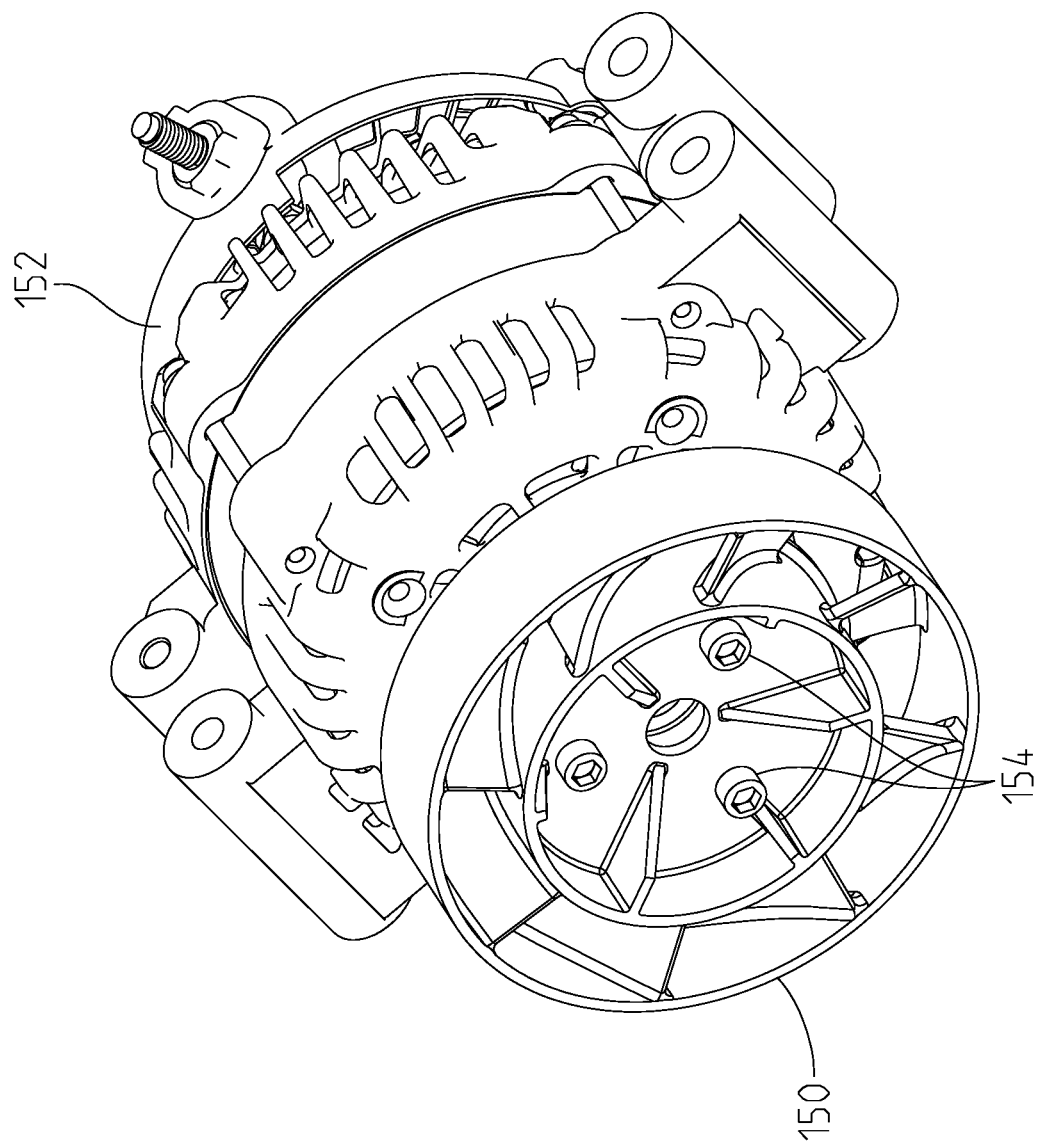
FIG. 33 is rear perspective view of the alternator of FIG. 32 and a fan.

If catalyst 80 is positioned outside of muffler 42, for example along a length of exhaust conduit 46, exhaust gas composition sensor 78 also is positioned upstream of catalyst 80 and joints or couplings (e.g., couplings 64, 66) are not positioned between exhaust conduit 46 between exhaust gas composition sensor 78 and catalyst 80. FIG. 12 illustrates various examples of where exhaust gas composition sensor 78 and catalyst 80 may be positioned upstream of muffler 42. To accommodate this configuration of catalyst 80 along a length of exhaust conduit 46, the length of exhaust conduit 46 may be extended. In various embodiments, the length of exhaust conduit 46 may be extended linearly between exhaust manifold 44 and outlet 48 (e.g., see FIG. 28), however, in other embodiments (e.g., see FIGS. 30 and 31), the length of exhaust conduit 46 may be increased by wrapping exhaust conduit 46 around portions of engine 32, exhaust manifold 44, and/or muffler 42.

It may be appreciated, based on the disclosure herein, that flow geometry (e.g., bends) allow exhaust gas to be evenly distributed across the face of catalyst 80 to maintain performance of catalyst 80. Additionally, the further catalyst 80 is moved into muffler 42, the less sound attenuating volume remains in muffler 42 because the sound attenuation does not occur until after the exhaust gas has exited catalyst 80 due to the flow straightening/matrix (e.g., honeycomb) configuration of catalyst 80. Further, at low engine speeds/load, there may be a reverse flow of ambient air that flows up outlet 48 and into muffler 42, thereby potentially affecting operation of catalyst 80 and, as such, the position of catalyst 80 relative to outlet 48 may be optimized.

Figure 13:
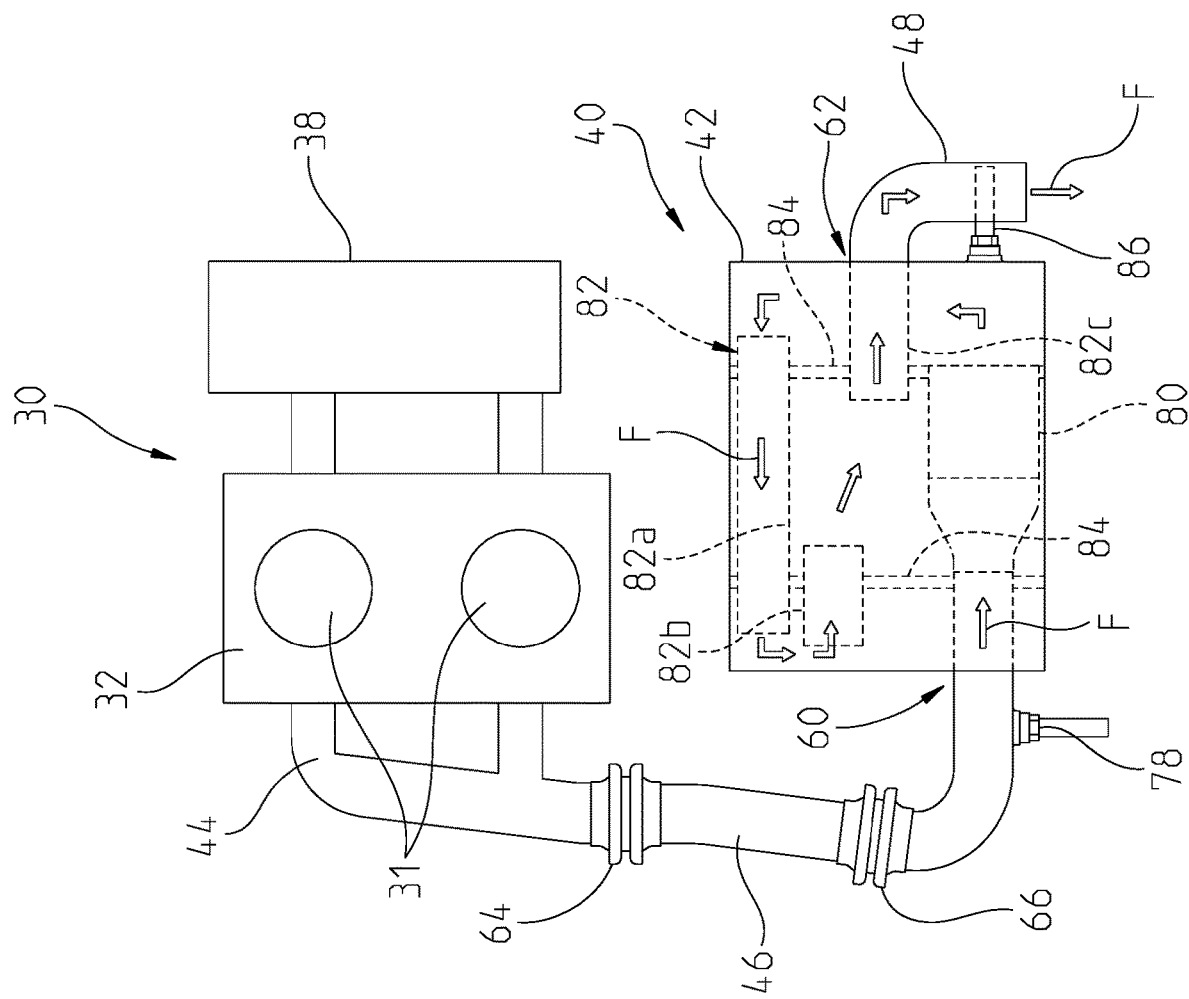
FIG. 13 is a schematic view of the exhaust assembly of the present disclosure having a second oxygen sensor.
Figure 14:
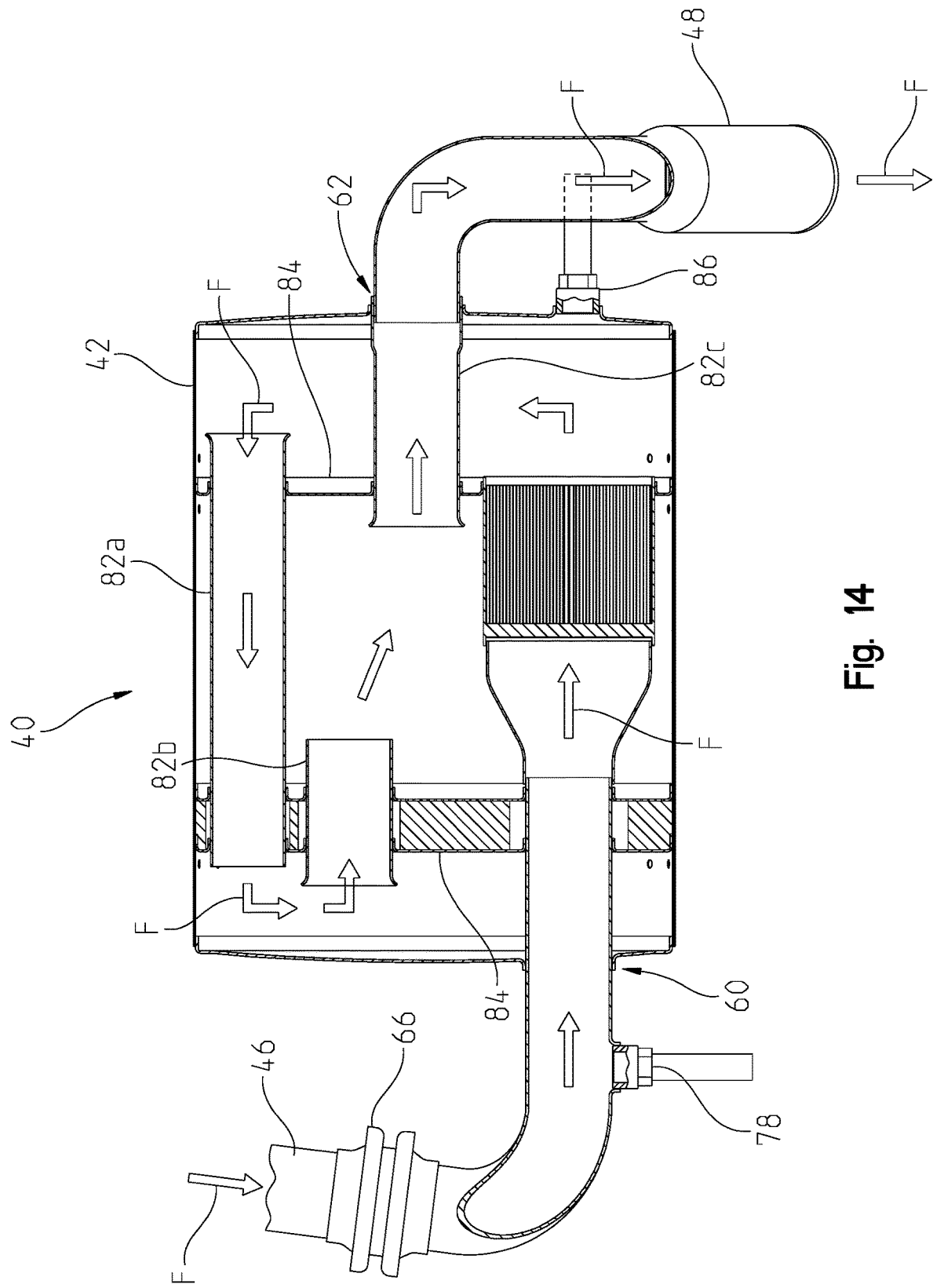
FIG. 14 is a cross-sectional view of a muffler of the exhaust assembly of FIG. 13.

As disclosed herein, and referring to FIGS. 13 and 14, catalyst 80 is positioned between exhaust manifold 44 and outlet 48. In various embodiments, catalyst 80 may be positioned within muffler 42. Muffler 42 also may include a plurality of cross-tubes 82 configured to attenuate sound. Illustratively, cross-tubes 82 include at least a first cross-tube 82a, a second cross-tube 82b, and a third cross-tube 82c, however, any number of cross-tubes 82 may be included. In one embodiment, cross-tube 82c may be integrally formed with outlet 48. Muffler 42 may include walls, such as baffles or support walls, configured to support cross-tubes 82 and further attenuate sound within muffler 42.

The exhaust gases may flow in the direction of arrows F such that exhaust gases flow into muffler 42 through exhaust conduit 46 and into catalyst 80. From catalyst 80, exhaust gases follow arrows F and flow towards first cross-tube 82a. From first cross-tube 82a, the exhaust gases flow into second cross-tube 82b and across a length of muffler 42 before flowing into third cross-tube 82c. Exhaust gases within third cross-tube 82c flow out of muffler 42 through outlet 48 to exit vehicle 2. This flow path and the use of cross-tubes 82 provides sound attenuation with muffler 42. The exhaust gases flowing between cross-tubes 82 may have a partially turbulent flow, however, as the exhaust gases flow from muffler 42 through third cross-tube 82c and through outlet 48, the exhaust gases have a generally laminar or smooth flow.

Referring still to FIGS. 13 and 14, exhaust assembly 40 may include a second exhaust gas composition sensor 86 positioned downstream of catalyst 80 such that second exhaust gas composition sensor 86 is a post-catalyst sensor. Second exhaust gas composition sensor 86 is supported on muffler 42 and may be positioned internally or externally to muffler 42. Illustratively, second exhaust gas composition sensor 86 is positioned externally of muffler 42 and is in fluid communication with outlet 48 to measure the exhaust gas composition levels within the exhaust gases exiting catalyst 80. As noted herein, the exhaust gases flowing through outlet 48 and, therefore, flowing over second exhaust gas composition sensor 86, may have a more laminar flow relative to exhaust gases upstream of catalyst 80. If the exhaust gases were to have a turbulent flow at second exhaust gas composition sensor 86, the measurements of exhaust gas composition sensor 86 may not be accurate. It may be appreciated that sensor 86 may be used in addition to or in lieu of sensor 78 and that any exhaust gas composition sensor, either alone or in combination with other sensors, may be positioned anywhere along the length of exhaust assembly 40 (e.g., upstream of catalyst 80, upstream of muffler 42, downstream of muffler 42, within outlet 48, etc.).

Figure 15:
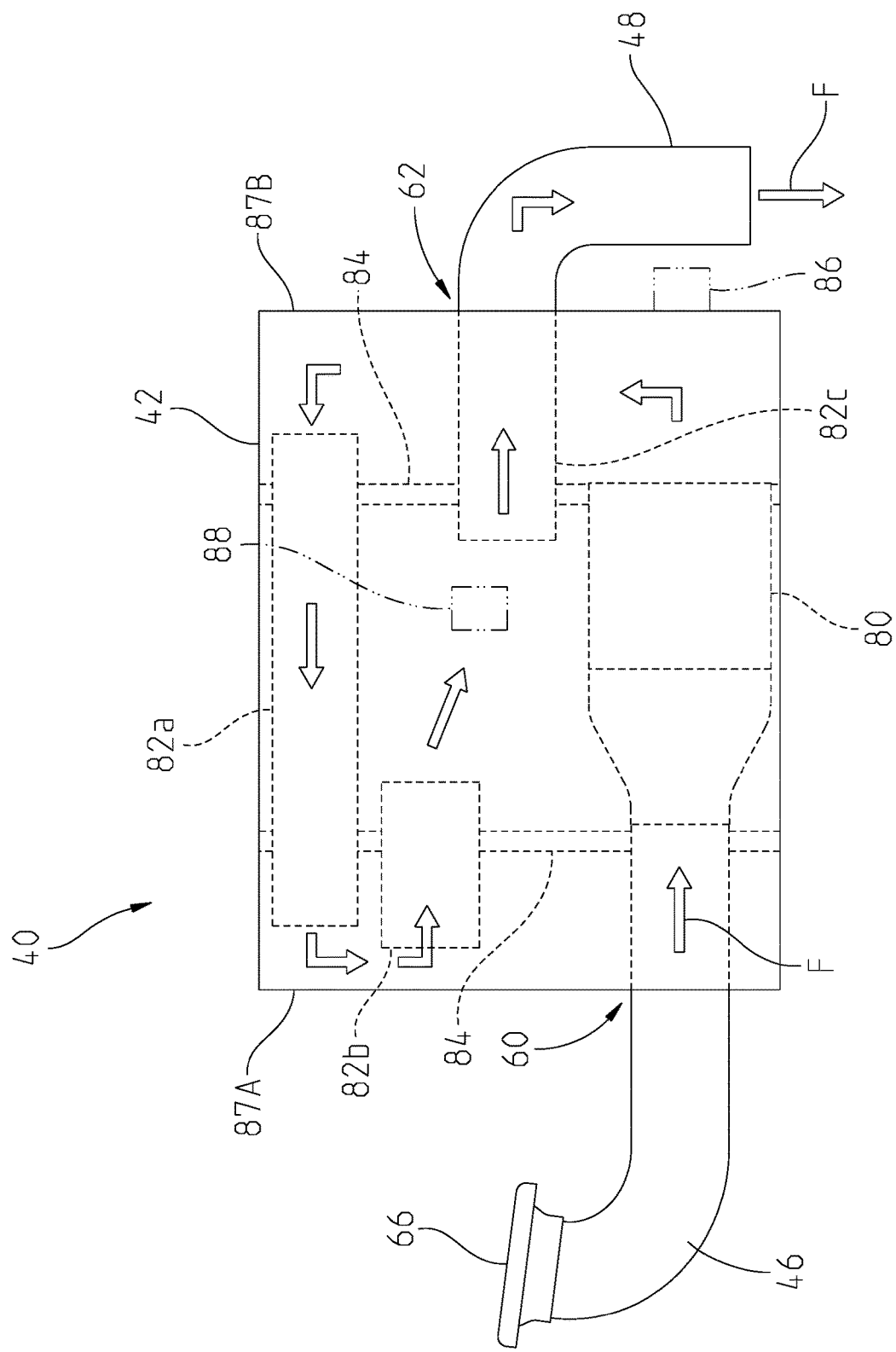
FIG. 15 is a schematic view of the exhaust assembly of FIG. 14 having a third oxygen sensor.

Referring now to FIG. 15, exhaust assembly 40 may include a second post-catalyst exhaust gas composition sensor, shown as sensor 88. Exhaust gas composition sensor 88 is positioned within muffler 42 and may be positioned generally along the flow path (arrows F) between second and third cross-tubes 82b and 82c. Exhaust gas composition sensor 88 may be used instead of or in addition to pre-catalyst exhaust gas composition sensor 78 and/or second/post-catalyst exhaust gas composition sensor 86. Exhaust gas composition sensor 88 provides further measurements of the exhaust gases to enhance control of engine performance and other factors in an effort to reduce emissions from outlet 48. In other embodiments, sensor 88 may be positioned adjacent wall 84 and upstream of the flow through crosstube 82*a*.

Figure 16:
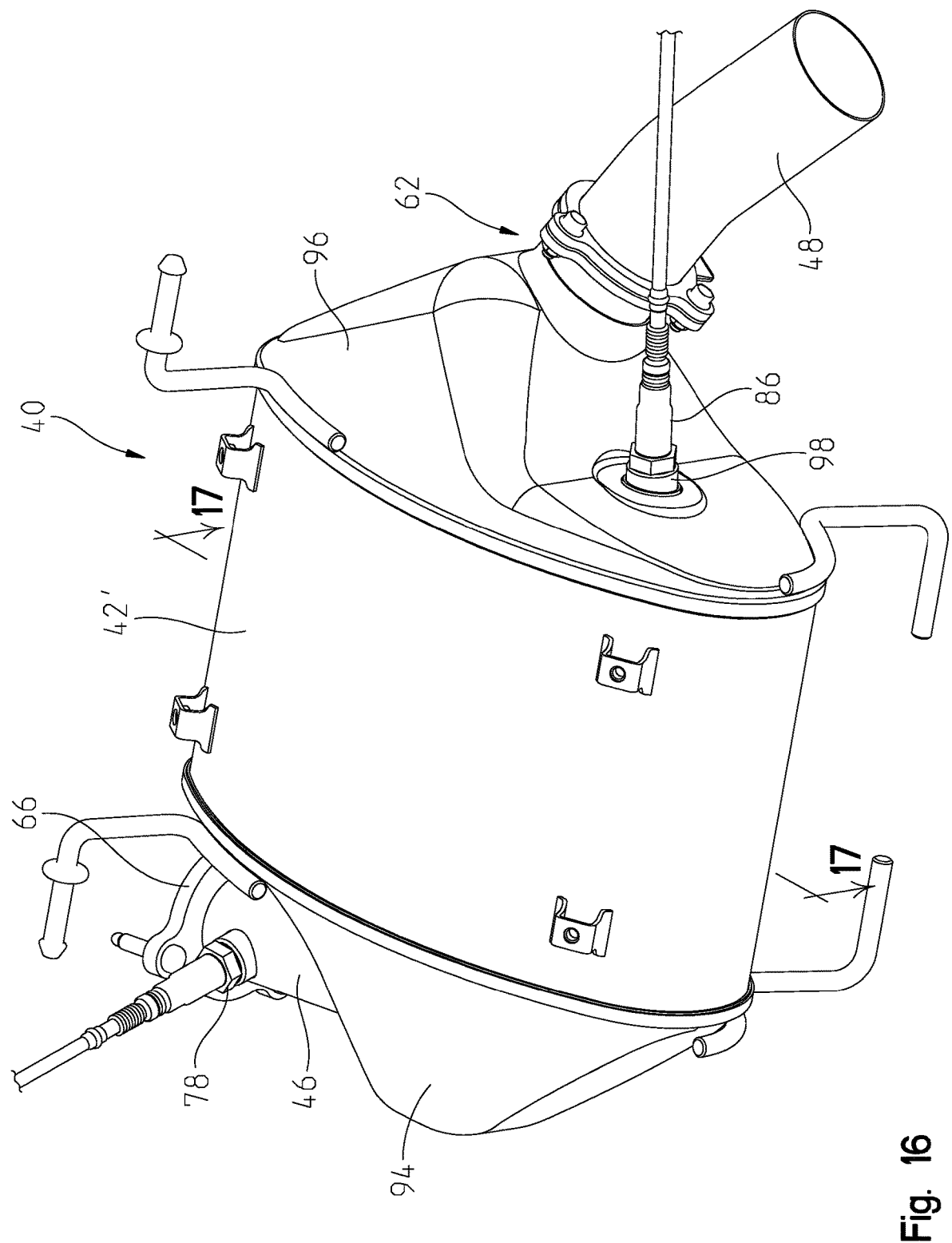
FIG. 16 is a rear right perspective view of an alternative embodiment muffler of the exhaust assembly disclosed herein.
Figure 17:
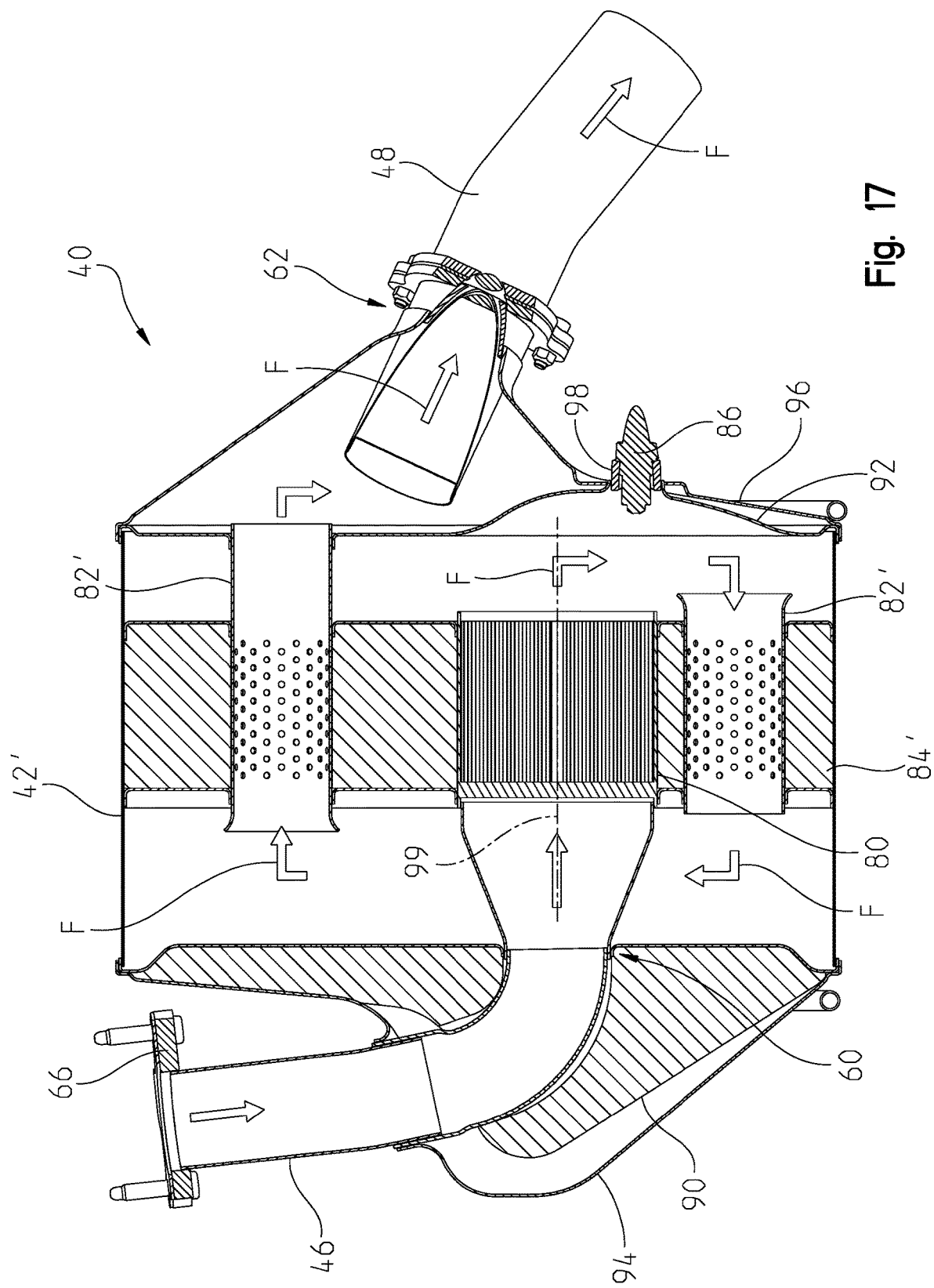
FIG. 17 is a cross-sectional view of the muffler of FIG. 16.

Referring to FIGS. 16 and 17, an alternative embodiment muffler 42' is disclosed. Muffler 42' is fluidly coupled to exhaust conduit 46 and outlet 48. Exhaust gas composition sensors 78, 86 are fluidly coupled to muffler 42'. Muffler 42' includes catalyst 80, alternative embodiment cross-tubes 82', and alternative embodiment wall(s) 84'. Exhaust gases are configured to flow into, through, and out of muffler 42' in the direction of arrows F.

Illustrative muffler 42' includes a first pass-through baffle 90 and a second pass-through baffle 92 positioned adjacent respective outer shell walls 94 and 96. At least second exhaust gas composition sensor 86 may be supported on muffler 42' through a welded boss 98 (e.g., bung welds). Welded boss 98 may be positioned generally parallel an axis 99 of catalyst 80 (e.g., within a range of approximately 0 degrees to approximately 15 degrees relative to axis 99). Exhaust gas composition sensor 86 may extend through a portion of pass-through baffle 92 and shell wall 96. Illustratively, baffle 92 and wall 96 may be coupled together and form chambers of muffler 42' such that sensor 86 extends through the chambers defined by baffle 92 and wall 96. Additionally, the curved or arced shaped of baffle 92 and wall 96 direct the flow of exhaust gas across sensor 86 to provide increased flow distribution across sensor 86. In this way, exhaust gas composition sensor 86 utilizes wall 96 and can gather measurements from within an inner chamber of muffler 42'. Pass-through baffle 92 is formed to protrude within and outside of wall 96. Exhaust gas composition sensor 86 is able to monitor the post-catalyst exhaust gases from within muffler 42' and/or within a portion of wall 96 and, more particularly, exhaust gases can be monitored from within an inner chamber of muffler 42'.

Referring now to FIGS. 18-31, to improve emissions from outlet 48, the temperature of exhaust assembly 40 is reduced. By reducing the temperature of exhaust assembly 40, expanded stoichiometric engine operation is available, which allows for proper catalyst operation. Increased cooling of exhaust assembly 40 also reduces the severity of exhaust assembly 40 as a radiant heat source during heat soak conditions, such as shutdown of engine 32 immediately following a heavy vehicle load operation. Various embodiments disclosed herein may be configured to limit the temperature of at least portions of exhaust assembly 40 and/or the exhaust gas to a temperature limit (e.g., 800-1000° C.) to reduce or prevent damage to catalyst 80. The temperature limit may be based on exhaust gas temperature values or limits with respect to other portions of exhaust assembly 40, such as, for example, thermal degradation temperature ranges of respective components of exhaust assembly 40.

Conventional methods to reduce the temperature of exhaust assembly 40 and prevent thermal damage to engine 32 and exhaust components may include fuel enrichment. More particularly, fuel enrichment may be utilized to reduce exhaust gas temperatures through evaporative cooling. However, catalyst emissions may be increased when engine 32 is operated with fuel enrichment and, therefore, catalyst performance may be reduced and emissions at outlet 48 may increase. As disclosed herein with respect to FIGS. 18-31, fuel enrichment is avoided if exhaust gas cooling may be provided through alternative methods.

Figure 18:
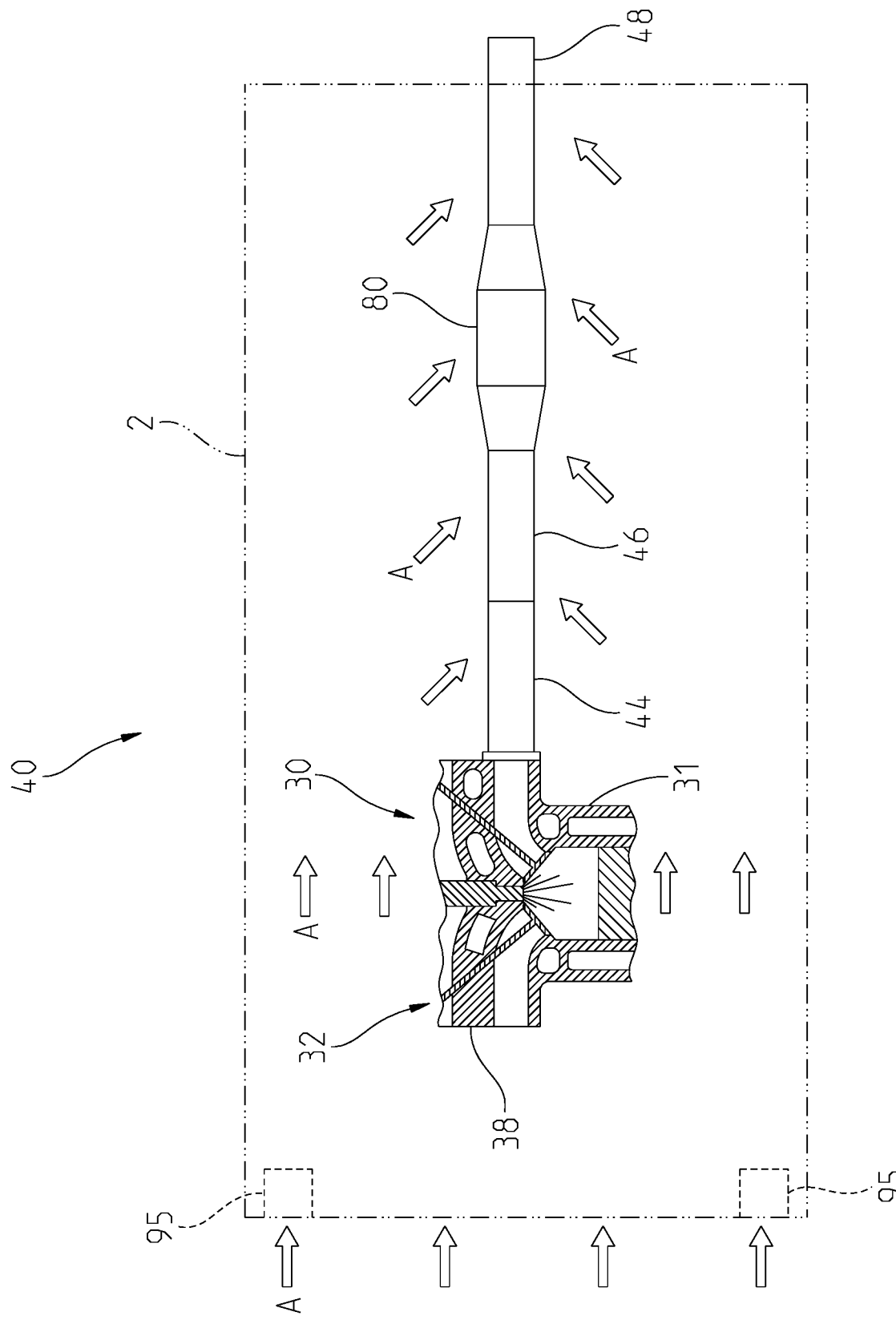
FIG. 18 is a schematic view of a first cooling embodiment for the exhaust assembly disclosed herein.

In the embodiment of FIG. 18, vehicle pass-by air (i.e., air flowing over and around vehicle 2), shown as arrows A, may be used to cool exhaust assembly 40. By redirecting vehicle pass-by air A across exhaust assembly 40, convective heat rejection from exhaust assembly 40 increases, thereby reducing exhaust gas temperatures. Pass-by air may be redirected through a portion of vehicle 2 by portions of body 20, such as body panels configured as deflectors and/or ducts (schematically shown at 95), and/or portions of frame assembly 10 which also may be configured as deflectors 95. Ducts or deflectors 95 may be positioned at any location along the longitudinal length of vehicle 2. As disclosed herein, by reducing exhaust gas temperatures, stoichiometric engine operation may occur at higher engine speeds and loads while emissions from vehicle 2 are reduced, which allows for proper catalyst operation, thereby reducing emissions at outlet 48. The rate of vehicle pass-by air A increases with engine speed and load and, therefore, increased cooling of exhaust assembly 40 occurs when cooling is most needed.

In the embodiment of FIG. 19, convective cooling is provided to exhaust assembly 40 through airflow (arrows 104) which has passed through a radiator 100 of vehicle 2. In one embodiment, radiator 100 is the primary radiator for engine 32, however, in other embodiments, radiator 100 may be a secondary radiator provided within the primary cooling assembly for engine 32. Radiator 100 may include conduits 102 fluidly coupled to engine 32 for flowing and receiving coolant to/from engine 32. Using airflow through radiator 100 which is redirected towards exhaust assembly 40 provides cooling to exhaust assembly 40 because of the vehicle ram effect or through the use of an electric fan for radiator 100 (positioned adjacent radiator 100). In this way, convective heat rejection from exhaust assembly 40 reduces exhaust gas temperatures. In the case of radiator airflow caused by the vehicle speed ram effect, the airflow naturally increases with engine speed/load due to increased vehicle speed and, therefore, increased exhaust cooling occurs when cooling is most needed.

In the embodiment of FIG. 20, convective cooling is provided to exhaust assembly 40 through airflow (arrows 106) from a fan 108. Fan 108 may be an electronically-controlled fan. Using fan 108 to provide airflow across exhaust assembly 40 provides increased convective heat rejection from exhaust assembly 40 to reduce exhaust gas temperatures. Fan 108 may be controlled by an engine control unit or module (not shown) and may be operated only at elevated engine speed/load conditions when increased cooling for exhaust assembly 40 is desired and also where extra electrical load capacity may be available from the charging system (not shown). Fan 108 also may be used during low vehicle speed conditions, when vehicle 2 is stationary, and/or when engine 32 is off to extract heat from exhaust assembly 40. In one embodiment, fan 108 may be positioned adjacent the hottest sections of exhaust assembly 40.

In the embodiment of FIG. 21, convective cooling is provided to exhaust assembly 40 through airflow (arrows 110) from exhaust/outlet port 58 of CVT 34. For example, the opening of outlet port 58 may be oriented to directly flow outlet air from CVT 34 onto portions of exhaust assembly 40. Additionally, or alternatively, ducts, deflectors, or other similar mechanism may be used to further direct the CVT exhaust air onto exhaust assembly 40. By redirecting airflow exiting CVT 34 across portions of exhaust assembly 40, increased convective heat rejection from exhaust assembly 40 occurs to reduce exhaust gas temperatures of exhaust assembly. The airflow from CVT 34 may naturally increase with engine speed/load due to increased clutch rotational speed (e.g., rotational speed of a first and/or second pulley of CVT 34), thereby providing increased exhaust system cooling when increased cooling is desired.

In the embodiment of FIG. 22, convective cooling is provided to exhaust assembly 40 through airflow (arrows 112) from a cooler 114. In one embodiment, cooler 114 may be a transmission cooler of shiftable transmission 36 By redirecting airflow which has passed through cooler 114 across exhaust assembly 40, whether the airflow is due to the vehicle speed ram effect or caused by a fan (not shown) (e.g., an electric fan), increased convective heat rejection from exhaust assembly 40 occurs to reduce the exhaust gas temperature. Cooler 114 may be supported on a rear portion 118 of lower frame assembly 12 (FIG. 23) and positioned to directly flow air exiting cooler 114 across a portion of exhaust assembly 40. When the airflow of cooler 114 is caused by the vehicle speed ram effect, the airflow may naturally increase with engine speed/load due to increased vehicle speed and, therefore, increased cooling of exhaust assembly 40 is provided when increased cooling is desired. Cooler 114 may be an air/liquid cooler or a liquid/liquid cooler.

Figure 23:
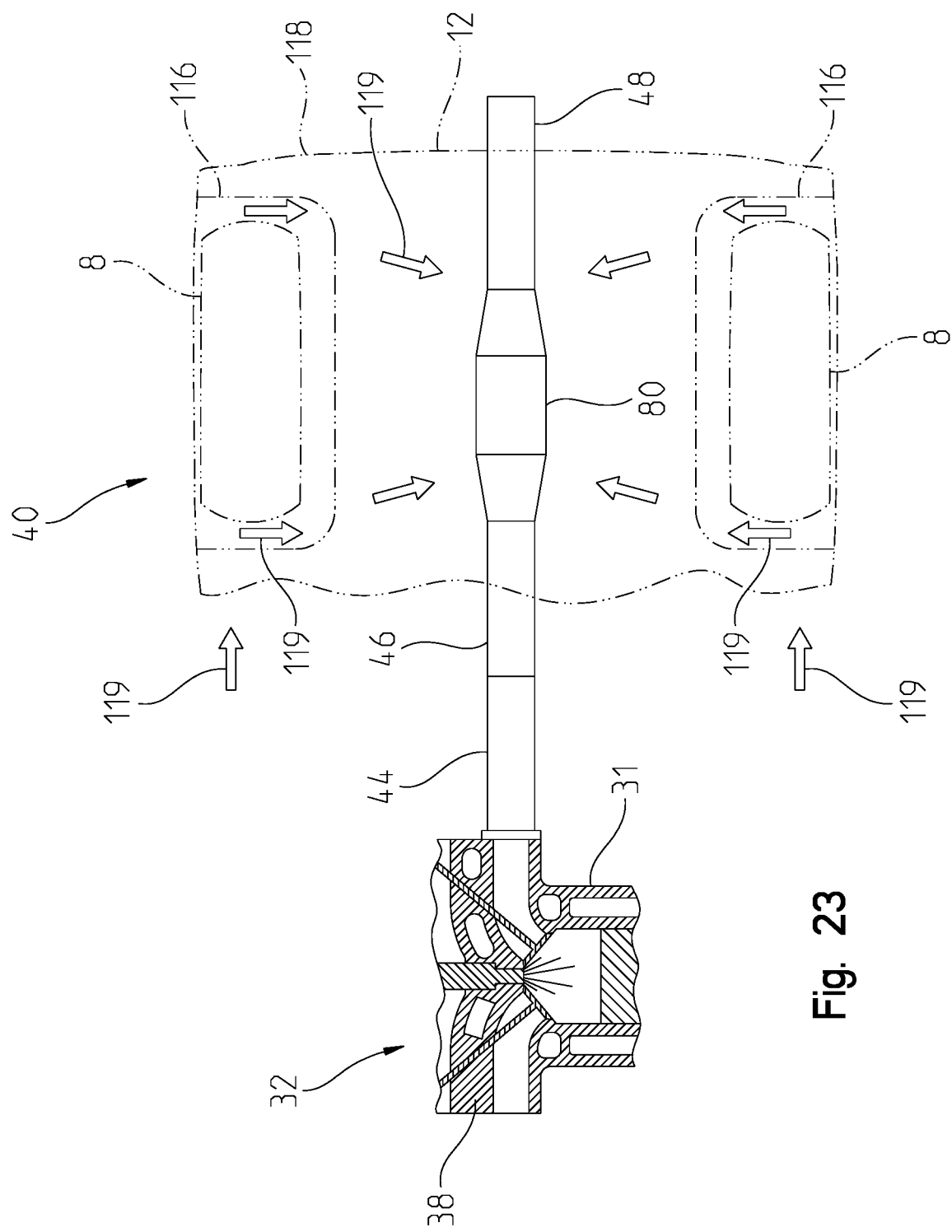
FIG. 23 is a schematic view of a sixth cooling embodiment for the exhaust assembly disclosed herein.

In the embodiment of FIG. 23, convective cooling is provided to exhaust assembly 40 by airflow (arrows 119) through wheel wells 116 of rear ground-engaging members 8 at rear portion 118 of lower frame assembly 12. More particularly, the turbulent air present in wheel wells 116 is redirected to flow over a portion of exhaust assembly 40. By redirecting this turbulent airflow in wheel wells 116 across exhaust assembly 40, increased convective heat rejection from exhaust assembly 40 is provided to reduce exhaust gas temperatures. The turbulent airflow through wheel wells 116 will naturally increase with the engine speed/load due to the increased rotation of rear ground-engaging members 8, thereby providing cooling to exhaust assembly 40 when cooling is most needed. The air at wheel wells 116 may be directed toward exhaust assembly 40 by a portion of body 20 and/or a portion of frame assembly 10 configured as a deflector, duct, or other mechanism to direct air inwardly towards exhaust assembly 40.

Figure 24:
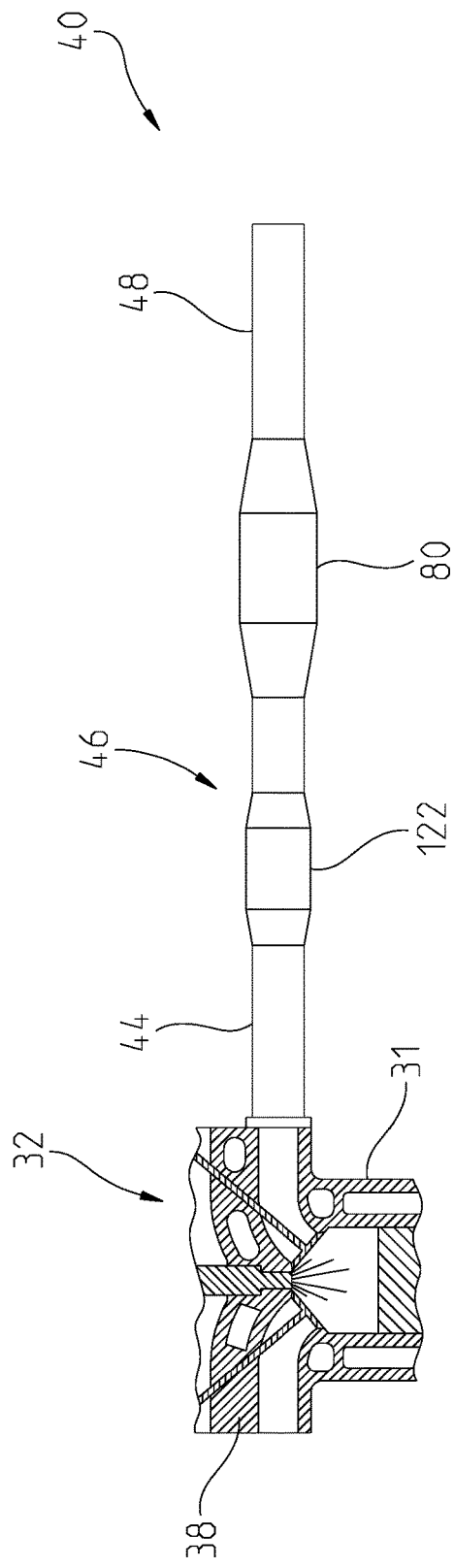
FIG. 24 is a schematic view of a seventh cooling embodiment for the exhaust assembly disclosed herein.

In the embodiment of FIG. 24, convective cooling is provided to exhaust assembly 40 by utilizing a close-coupled catalyst or pre-catalyst 122 to increase convective heat rejection from exhaust assembly 40 and reduce the exotherm experienced in catalyst 80 downstream of catalyst 122. More particularly, catalyst 122 is positioned upstream of catalyst 80 and may be positionally intermediate exhaust manifold 44 and catalyst 80. As such, catalyst 122 may be supported on exhaust conduit 46 or may be positioned upstream of catalyst 80 within muffler 42.

Catalyst 122 creates an exotherm which increases exhaust gas temperatures early in the flow path 120 through exhaust assembly 40, thereby increasing the delta T component of heat rejection. Delta T defines the difference in temperature between the hot exhaust gas and the cooling fluid or medium (e.g., ambient air). The rate of heat transfer (Q) can be expressed as $Q=m*C_p*dT$, where m=mass flow rate of the cooling fluid (e.g., air flowing across exhaust assembly 40), $C_p$=heat capacity of the cooling fluid (e.g., water has higher heat capacity than air so water is more effective for cooling), and dT=the difference between a temperature difference of the surface being cooled (exhaust system surface) and the temperature of the cooling fluid.

It may be appreciated that catalyst 122 is positioned generally adjacent engine 32 and exhaust manifold 44 such that the exotherm which occurs therein happens as early as possible in exhaust assembly 40. However, as shown in FIG. 24, catalyst 122 also facilitates increased heat transfer from exhaust assembly 40 upstream of catalyst 80 when positioned along any length of exhaust conduit 46. In various embodiments, catalyst 122 may be positioned in muffler 42 with catalyst 80 such that catalysts 122, 80 are positioned in series within muffler 42 or catalyst 80 may be a multi-chamber catalyst within muffler 42 that includes a plurality of catalyst portions in series with each other.

Additionally, catalyst 122 may partially clean the exhaust gas to reduce emissions therefrom as the exhaust gases continue to flow through the downstream portion of exhaust assembly 40. This partial cleaning of the exhaust gas leads to reduced exotherm in catalyst 80 and, therefore, catalyst 80 does not experience as much heat during operation of exhaust assembly 40. Catalyst 122 may be configured to only partially clean the exhaust gas so that catalyst 122 does not experience a full or complete exotherm. Catalyst 122 may have honeycomb configuration with a cell density lower than that of catalyst 80. Further, catalyst 122 may have an equal or decreased size relative to catalyst 80 and a large diameter-to-length ratio to make it less likely to create an exhaust flow restriction. It may be appreciated that not only does catalyst 122 reduce the temperature experienced by exhaust assembly 40 but also reduces emissions more quickly after engine 32 begins to operate (e.g., compared to an exhaust system without catalyst 122) because it reaches proper operating temperature faster given that it is located closer to engine 32.

Figure 25:
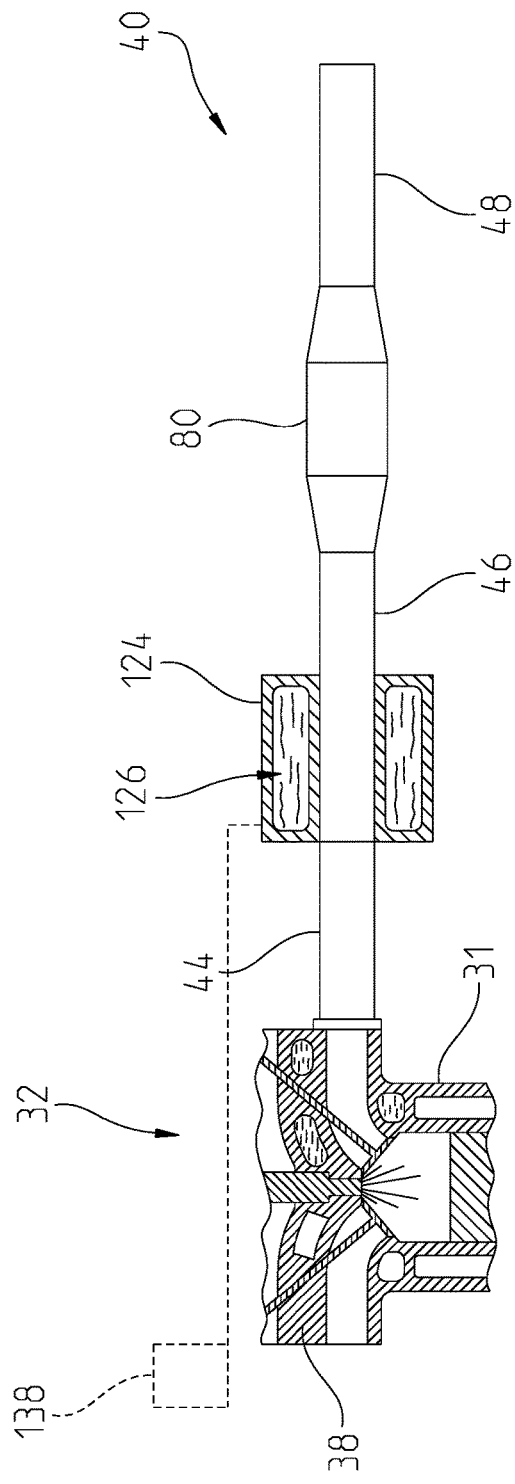
FIG. 25 is a schematic view of an eighth cooling embodiment for the exhaust assembly disclosed herein.

In the embodiment of FIG. 25, cooling is provided to exhaust assembly 40 by utilizing a water or cooling jacket 124 surrounding a portion of exhaust assembly 40 to increase heat rejection from the exhaust gas early in the flow path (e.g., before catalyst 80). Cooling jacket 124 includes at least one channel 126 configured to receive cold water or other coolant/fluid (e.g., glycol) to reduce the temperature of a portion of exhaust assembly 40 (e.g., a portion of exhaust conduit 46 upstream of catalyst 80). Providing cooling jacket 124 about a portion of exhaust conduit 46 increases heat extraction from the exhaust gas. However, cooling jacket 124 may provide too much heat rejection for the cooling assembly of engine 32 to manage and, as such, an additional cooling circuit may be needed to best manage cooling of exhaust assembly 40 and cooling of engine 32. Using a separate circuit may allow for cooling to be optimized for coolant flow rate, temperature thresholds, etc. such that cooling jacket 124 extracts only a target amount of heat and/or is only utilized during elevated engine speed/load conditions when increased cooling is desired.

Figure 26:
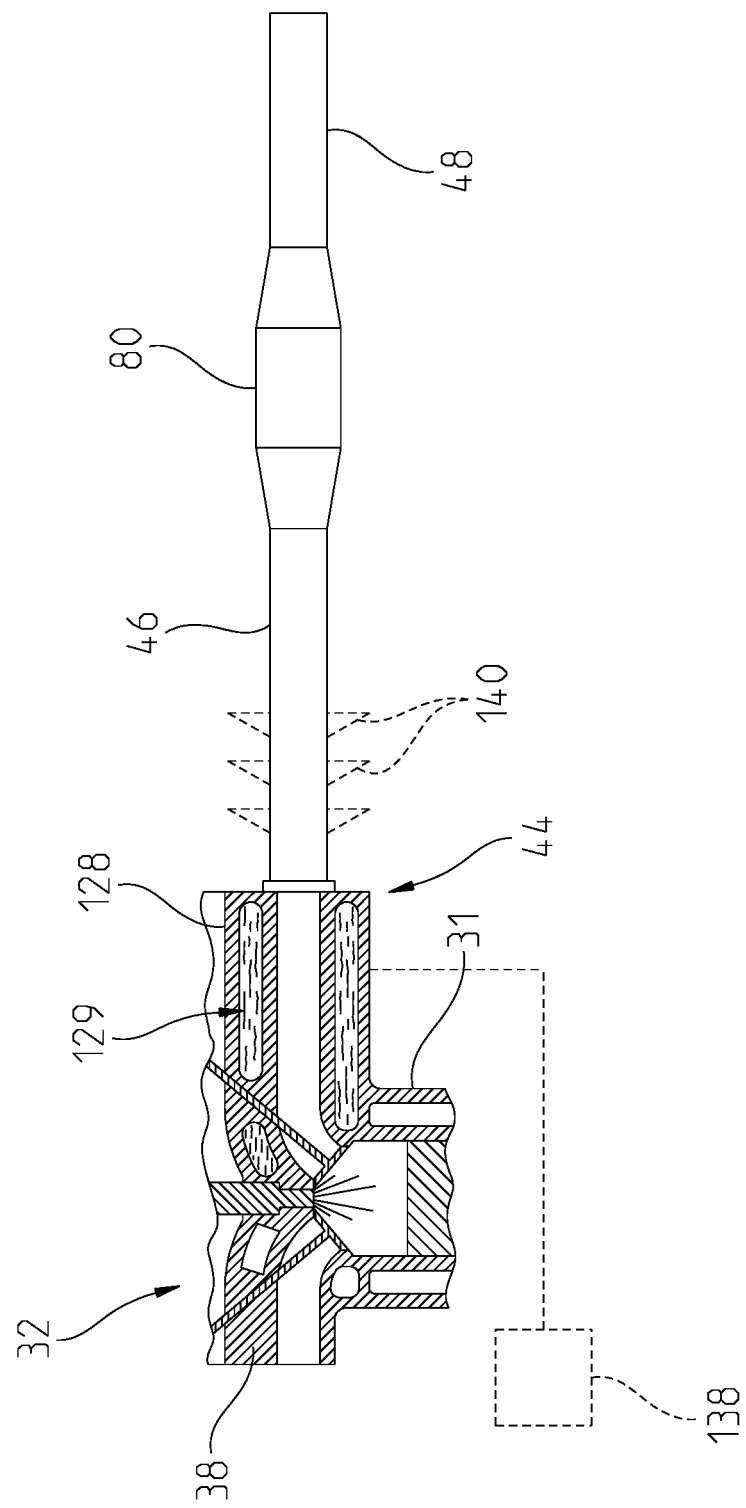
FIG. 26 is a schematic view of a ninth cooling embodiment for the exhaust assembly disclosed herein.

In the embodiment of FIG. 26, cooling is provided to exhaust assembly 40 by a cooling jacket 128 surrounding a portion of exhaust assembly 40 to increase heat rejection from the exhaust gas early in the flow path (e.g., upstream of and/or adjacent to exhaust manifold 44). Cooling jacket 128 includes at least one channel 129 configured to circulate cold water or other coolant/fluid to reduce the temperature of a portion of exhaust assembly 40 (e.g., a portion of exhaust manifold 44 adjacent engine 32). Cooling jacket 128 may be integrated into exhaust manifold 44 or may be separate therefrom and, for example, may define an extended portion of the exhaust port of engine 32. It may be appreciated that exhaust manifold 44 is coupled to the exhaust port(s) of engine 32. The exhaust port of engine 32 is typically flush with the cylinder block of cylinder 31, however, in the embodiment of FIG. 26, the exhaust port of engine 32 may be extended to provide more surface area for cooling jacket 128. Using cooling jacket 128 at the exhaust port of engine 32 and/or at exhaust manifold 44 creates more cooling jacket area along the exhaust flow path to increase heat extraction from the exhaust gas. Additionally, cooling jacket 128 attenuates a post-cylinder oxidation exotherm which further reduces downstream exhaust gas temperatures.

Figure 27:
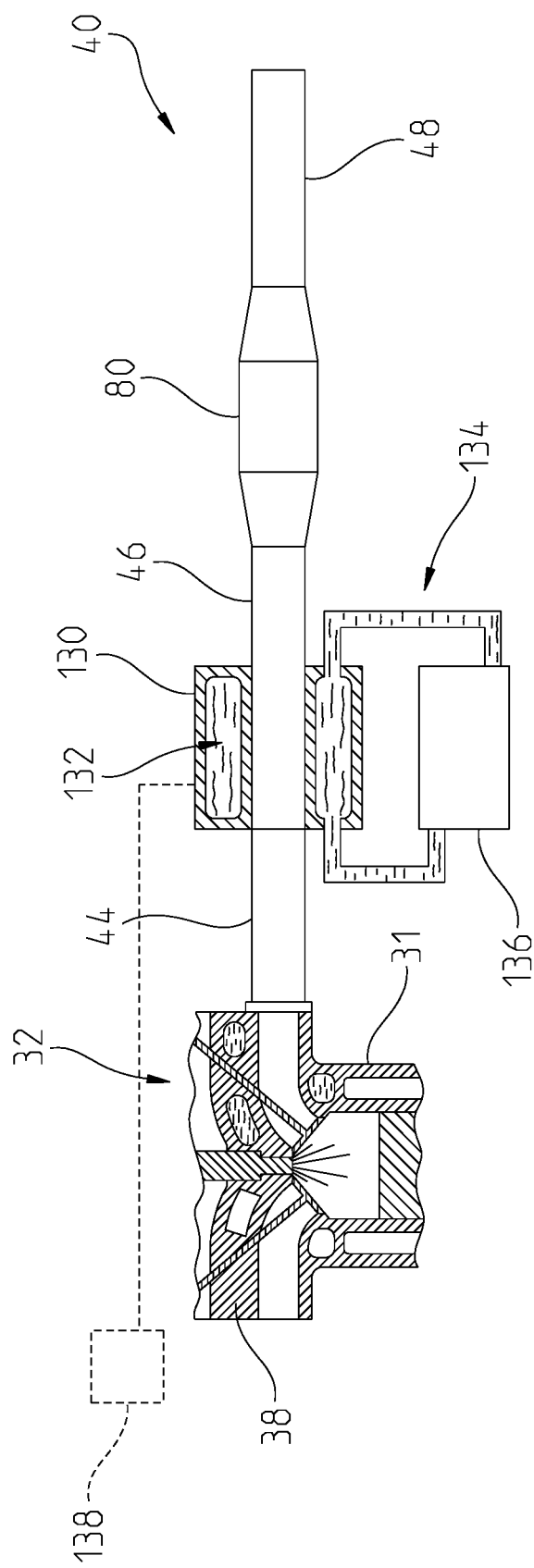
FIG. 27 is a schematic view of a tenth cooling embodiment for the exhaust assembly disclosed herein.

In the embodiment of FIG. 27, cooling is provided to exhaust assembly 40 by a cooling jacket 130 surrounding a portion of exhaust assembly 40 to increase heat rejection from the exhaust gas early in the flow path. Cooling jacket 130 includes at least one channel 132 configured to receive cold water or other coolant/fluid to reduce the temperature of a portion of exhaust assembly 40 (e.g., a portion of exhaust conduit 46). Cooling jacket 130 is fluidly coupled to a cooling circuit 134 which includes a heater 136 for vehicle 2. More particularly, heater 136 may be used to heat the cab of vehicle 2 (e.g., when operator area 16 is enclosed) by receiving the rejected heat from exhaust assembly 40 through the water/fluid which is heated after cooling exhaust conduit 46.

Using cooling jacket 130 may result in too much heat rejection for the cooling assembly of engine 32 (e.g., radiators 100, 138) to manage and, therefore, cooling circuit 134 may be used. Using separate circuit 134 allows for cooling to be optimized for coolant flow rate, temperature thresholds, etc. so that only a target amount of heat is extracted from exhaust assembly 40 and/or is only extracted during elevated engine speeds/loads when cooling is most needed. Cooling circuit 134 may be used as the heat source for heater 136 instead of having heater 136 rely on the cooling assembly of engine 32 to provide heat to the cab. Cooling circuit 134 may provide improved heating of operator area 16 at low engine speeds/loads, reduced heating time after engine 32 begins to operate, or both compared to a cab heating system that uses only a cooling assembly of engine 32.

With respect to the embodiments of FIGS. 25-27, the cooling assembly for the engine may include a secondary radiator or other heat exchanger 138 (in combination with radiator 100 of FIG. 19 or in lieu of radiator 100) fluidly coupled to water jackets 124, 128, 130 may be provided. Secondary radiator 138 may be used because the primary radiator for engine 32 may not provide sufficient cooling for the cooling fluid flowing through water jackets 124, 128, 130. Secondary radiator 138 may be positioned at any location on vehicle 2. For example, secondary radiator 138 may be positioned at a front portion of vehicle 2 to experience undisturbed, cool ambient air. It may be appreciated that water jackets 124, 128, 130 may be used individually or in any combination with each other.

In the embodiment of FIGS. 28-31, the length of exhaust assembly 40 (e.g., exhaust conduit 46) may be extended upstream of catalyst 80 to increase heat rejection from the exhaust gas before the exhaust gas enters catalyst 80. Extending the length of exhaust conduit 46 increases convective heat rejection from exhaust assembly 40 by allowing more heat transfer time and surface area. In some examples, extending the length of exhaust conduit 46 also may enable exhaust tuning which may aid the development of the torque curve.

As shown best in FIGS. 29-31, the length of exhaust conduit 46 may be increased in a plurality of configurations and, illustratively, the length of exhaust conduit 46 is increased by wrapping exhaust conduit 46 around various components of powertrain assembly 30 and/or exhaust assembly 40. More particularly, due to the compact arrangement of vehicle 2 and the many components supported on lower frame assembly 12 adjacent engine 32, it may be necessary to extend the length of exhaust conduit 46 at a position adjacent engine 32 so as to prevent interference with other components.

Illustratively, as shown in FIG. 30, and compared to the length of exhaust conduit 46 shown in FIG. 29, the length of exhaust conduit 46 may be extended by wrapping exhaust conduit 46 around engine 32 and muffler 42 such that exhaust conduit 46 is positioned longitudinally intermediate engine 32 and muffler 42. In this way, exhaust conduit 46 may begin at exhaust manifold 44 on a first side of longitudinal axis L and end at muffler 42 along a second side of longitudinal axis L. Additionally, as shown in FIG. 31, the length of exhaust conduit 46 may be extended by wrapping exhaust conduit 46 around muffler 42 such that catalyst 80 is positioned longitudinally intermediate engine 32 and exhaust conduit 46. In this way, exhaust conduit 46 may begin at exhaust manifold 44 on a first side of longitudinal axis L and end at catalyst 80 along a second side of longitudinal axis L. The embodiments of FIGS. 30 and 31 extend the length of exhaust conduit 46 to improve heat rejection from exhaust assembly 40 upstream of catalyst 80.

Figure 34:
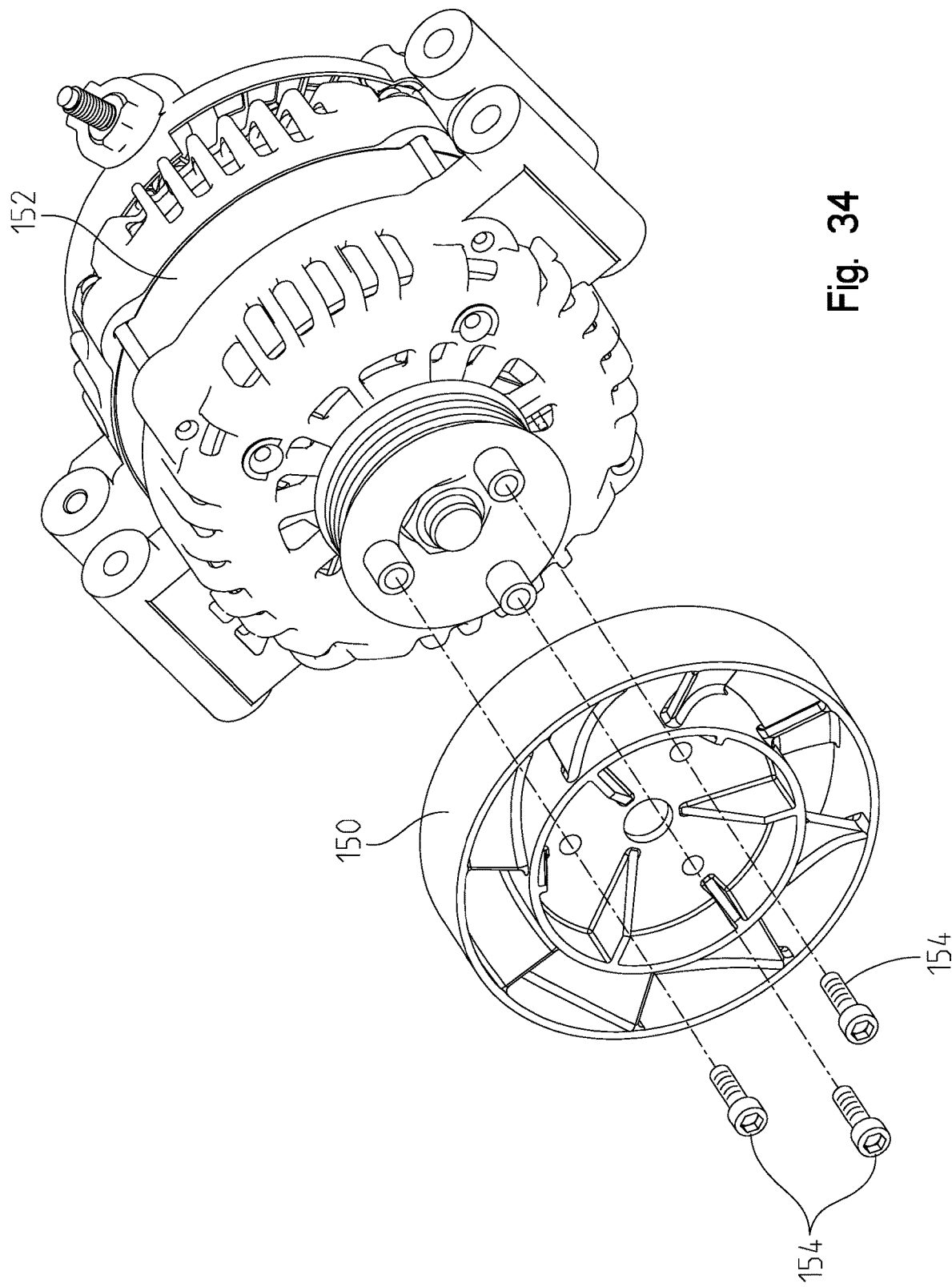
FIG. 34 is an exploded view of the alternator and fan of FIG. 33.
Figure 35:
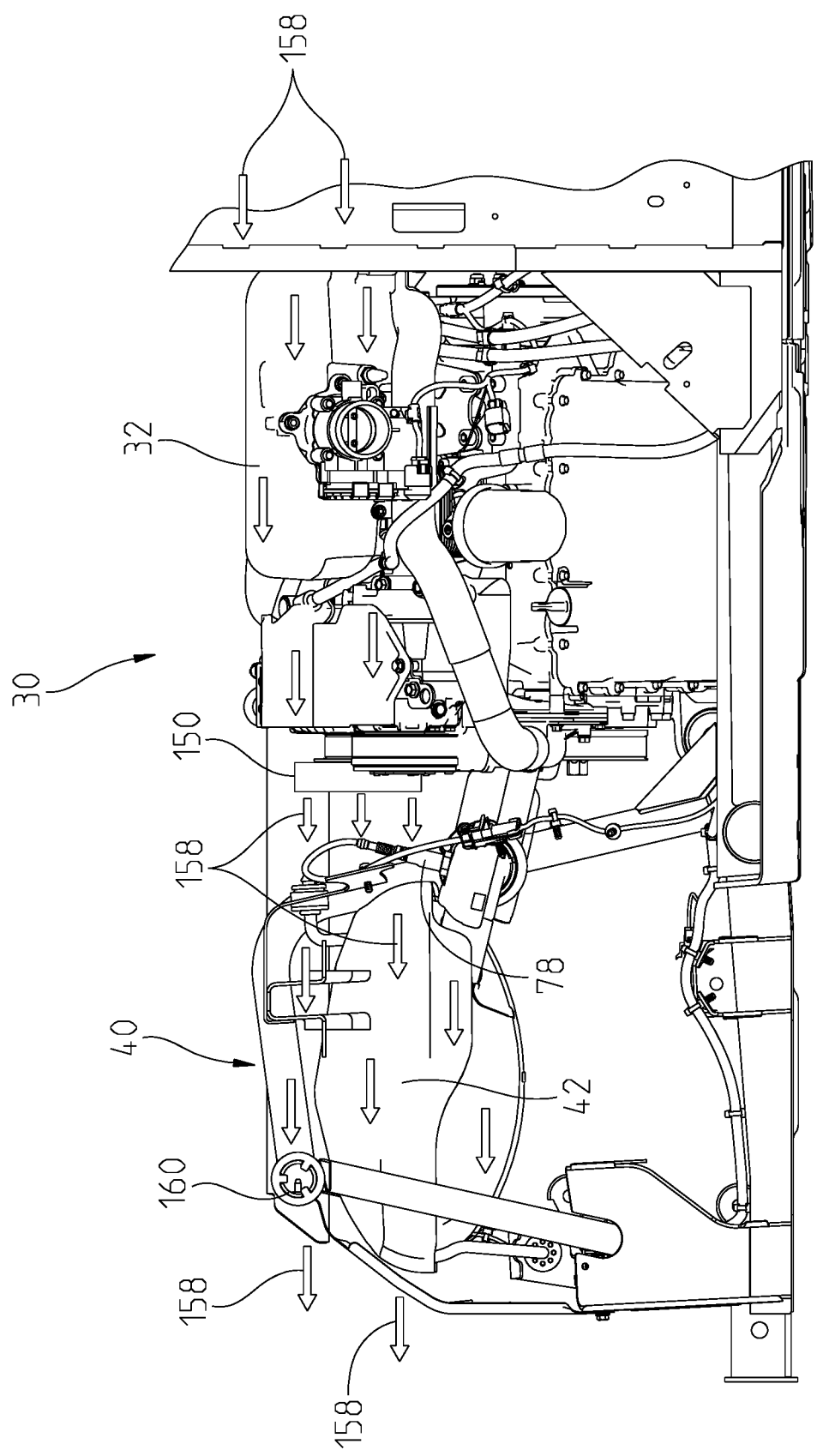
FIG. 35 is a schematic view of a cooling air flow in a direction rearward across a portion of the engine and alternator of FIG. 32 and at least a portion of the exhaust assembly disclosed herein.

In the embodiment of FIGS. 32-35, cooling is provided to exhaust assembly 40 by a fan 150 mounted to an alternator 152 of engine 32. Alternator 152 is operably coupled to engine 32 and fan 150 is removably coupled to alternator 152 with fasteners 154 (FIG. 34). Fan 150 may be protected by a cover 156. In operation, as air flows (shown by arrows 158) through vehicle 2 in a rearward direction, the air flows over engine 32 and through fan 150 which directs the air rearwardly towards exhaust assembly 40. More particularly, the air flowing towards the rear of vehicle 2 is pulled from under an intake manifold of engine 32, across alternator 152, through fan 150 and is directed at portions of exhaust assembly 40 such as vibrational isolators (e.g., isolator 160) and pre-catalyst exhaust gas composition sensor 78. In this way, the air flow at exhaust assembly 40 provides cooling via convection and allows the heated air to exit vehicle 2 at the rear thereof. This air flow is beneficial to alternator 152, as well, because heat is removed from alternator 152 as the air flows rearwardly in vehicle 2. While FIGS. 32-35 include alternator 152, it may be appreciated that the same cooling effect for exhaust assembly 40 can be achieved by other components of vehicle 2, such as any belt-driven component of powertrain assembly 30.

With respect to any of the embodiments of FIGS. 18-35, fins or other features (shown schematically as 140 in FIG. 26) may be provided on exhaust conduit 46 to increase the surface area thereof. By increasing the surface area of exhaust conduit 46, heat transfer from exhaust assembly 40 upstream of catalyst 80 may be improved.

It may be appreciated that any of the cooling embodiments of FIGS. 18-35 may be used individually or in combination with any other cooling embodiment, depending on the configuration and parameters of vehicle 2, powertrain assembly 30, and exhaust assembly 40. Additionally, it may be apparent in the embodiments of FIGS. 18-35 that minimal heat shielding and/or shrouding is illustrated along the length of exhaust conduit 46 to allow for increased heat transfer out of exhaust conduit 46 before reaching catalyst 80. Further, with any of the embodiments disclosed herein, it may be desirable to increase the flow rate of the cooling fluid or medium (e.g., air, water, cooling fluid, etc.) to increase heat transfer from exhaust assembly 40. The cooling medium may be provided at any position along the length of exhaust assembly 40 upstream of catalyst 80. In this way, the disclosures of FIGS. 18-35 herein, in combination with minimal heat shielding/shrouding and methods to increase the flow rate of the cooling medium, improve cooling of exhaust assembly 40 which may enhance catalyst performance at elevated engine speed/loads, thereby reducing emissions at outlet 48 compared to exhaust assemblies without the above described exhaust cooling systems More particularly, and as is apparent from any of the embodiments of FIGS. 18-35, alone or in combination, exhaust temperatures are affected by heat shielding, air flow, length of exhaust conduits, calibration parameters, and other factors. The benefits of any of the cooling embodiments of FIGS. 18-35 may improve cooling at various portions of exhaust assembly 40 by up to 46 degrees C.

Figure 36:
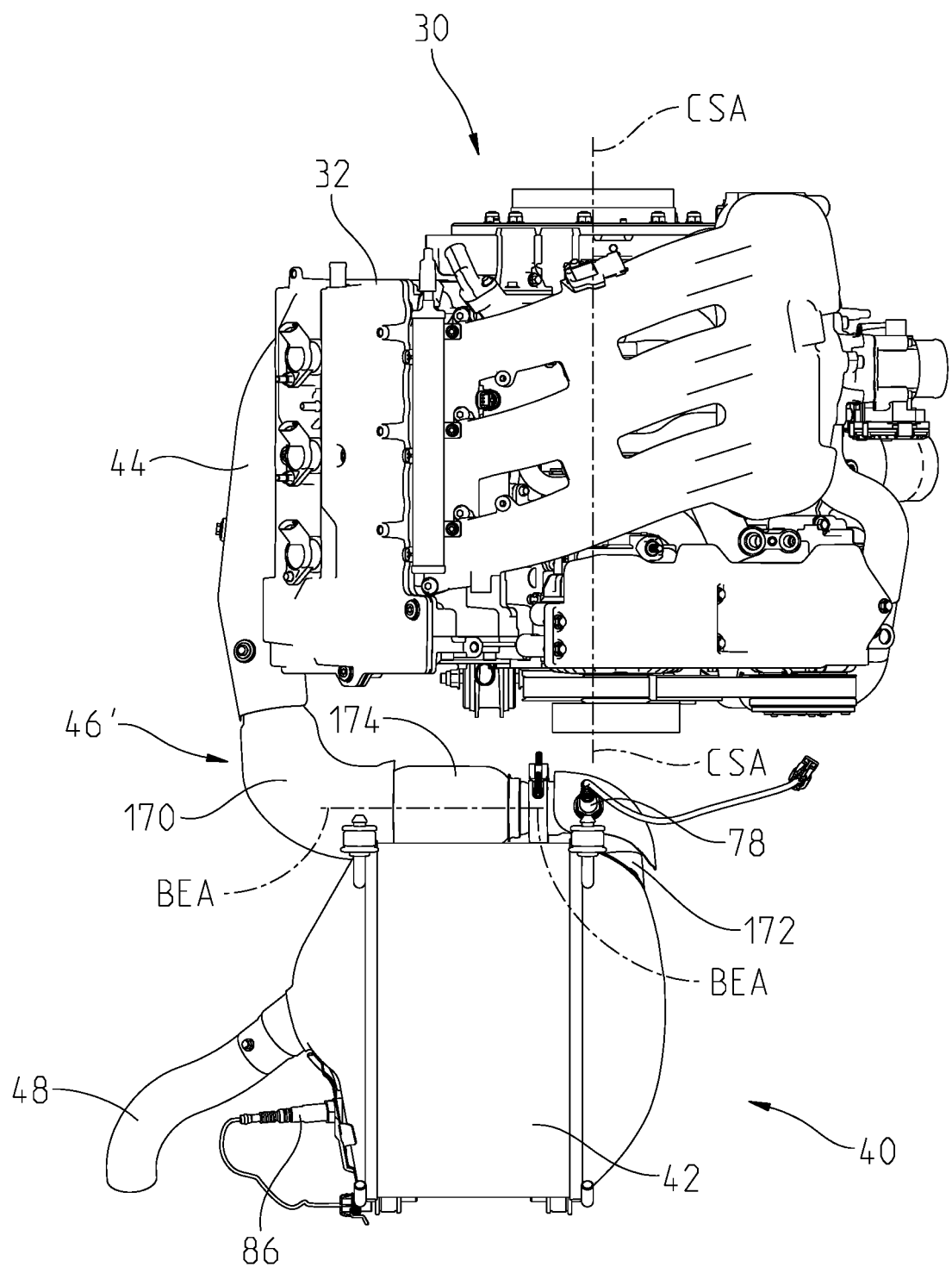
FIG. 36 is a top view of the engine and exhaust assembly disclosed herein.
Figure 37:
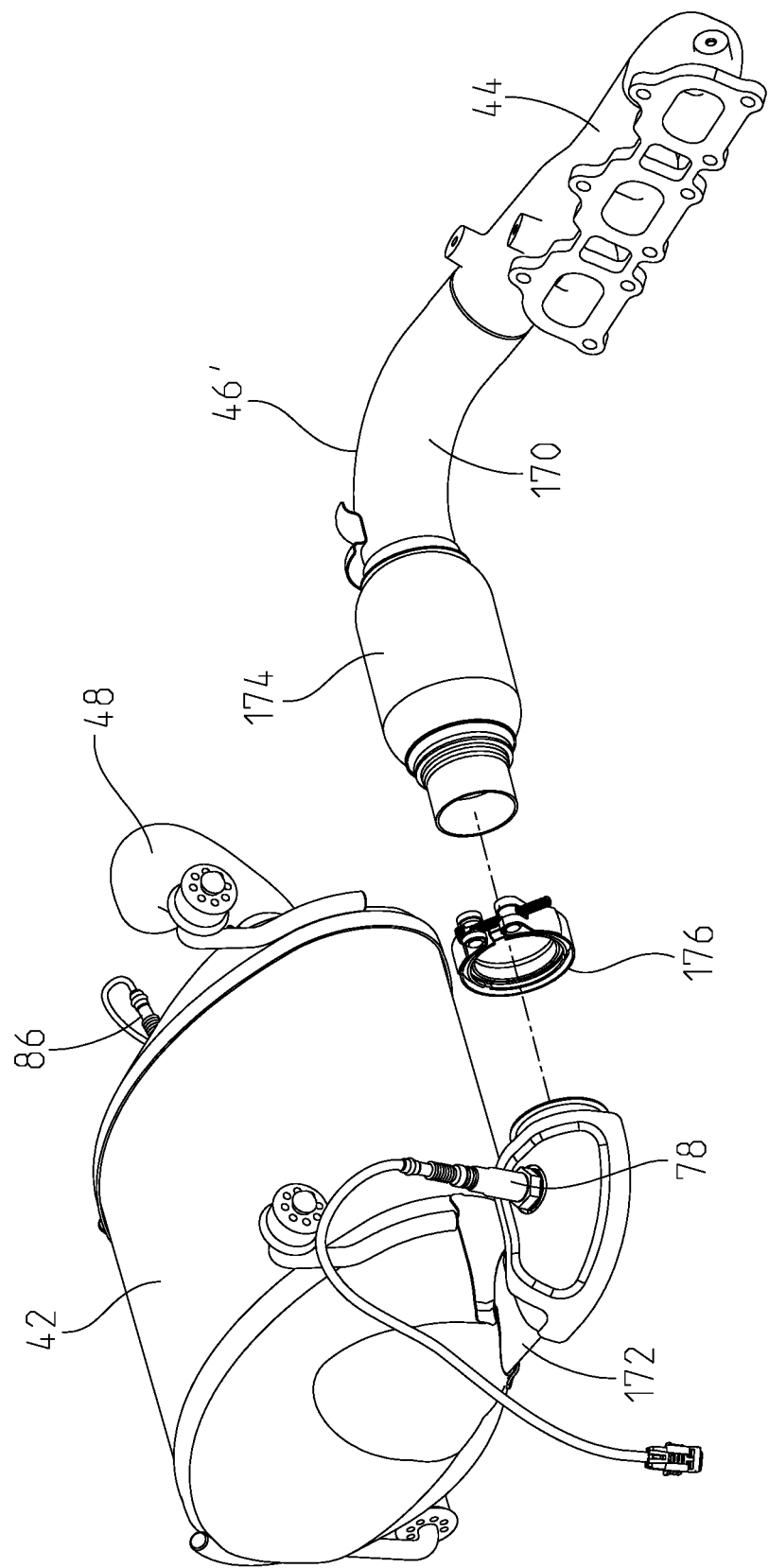
FIG. 37 is a partially exploded view of a portion of the exhaust assembly disclosed herein.

Referring now to FIGS. 36 and 37, an alternative configuration of exhaust conduit 46 is shown as conduit 46'. Exhaust conduit 46' includes a first conduit portion 170 fluidly coupled to exhaust manifold 44 and a second conduit portion 172 fluidly coupled to muffler 42. A flexible bellow element 174 also defines a portion of exhaust conduit 46' and, illustratively, is positioned intermediate first and second conduit portions 170, 172 such that bellow element 174 is downstream of first conduit portion 170 and engine 32 but is upstream of second conduit portion 172, muffler 42, and exhaust gas composition sensors 78, 86. In one embodiment, bellow element 174 may be welded to first and/or second conduit portions 170, 172; however, as shown in FIG. 37, bellow element 174 may be removably coupled to at least second conduit portion 172 with a removably coupler, such as a clamp 176. Bellow element 174 allows for flexibility along the flow path of the exhaust gases while also maintaining the flow of the exhaust gases. More particularly, due to its positioning and configuration, bellow element 174 is configured to flex or move with movement of engine 32 instead of translating fore/aft forces. In one embodiment, bellow element 174 is comprised of a plurality of layers, such as an interlocking metal layer, a thin metal bellow layer, and an outer woven material, which allow bellow element 174 to compress and move with movement of engine 32.

As shown in FIG. 36, bellow element 174 is positioned longitudinally rearward of engine 32 and longitudinally forward of muffler 42. Because engine 32 may be positioned rearward of seating 18 in various embodiments, bellow element 174 also may be positioned rearward of seating 18. Depending on the orientation of engine 32 within vehicle 2, a crankshaft axis CSA may extend in a generally longitudinal direction of vehicle 2 while a flow axis of bellow element 174, shown as BEA, may be generally perpendicular to crankshaft axis CSA. More particularly, bellow element axis BEA may be positioned approximately 87-93 degrees from crankshaft axis CSA. In various embodiments, bellow element 174 is positioned within the lateral width of engine 32 and/or muffler 42 and may be centered along the lateral width of muffler 42 and/or engine 32.

Figure 38:
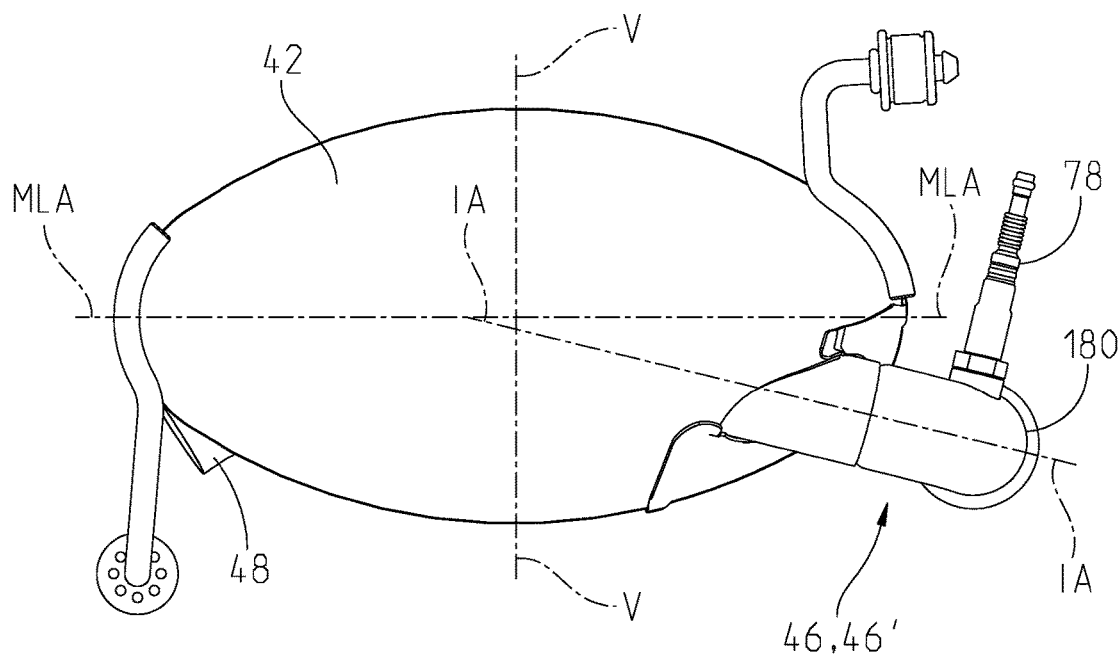
FIG. 38 is a right side view of a muffler of the exhaust assembly disclosed herein.
Figure 39:
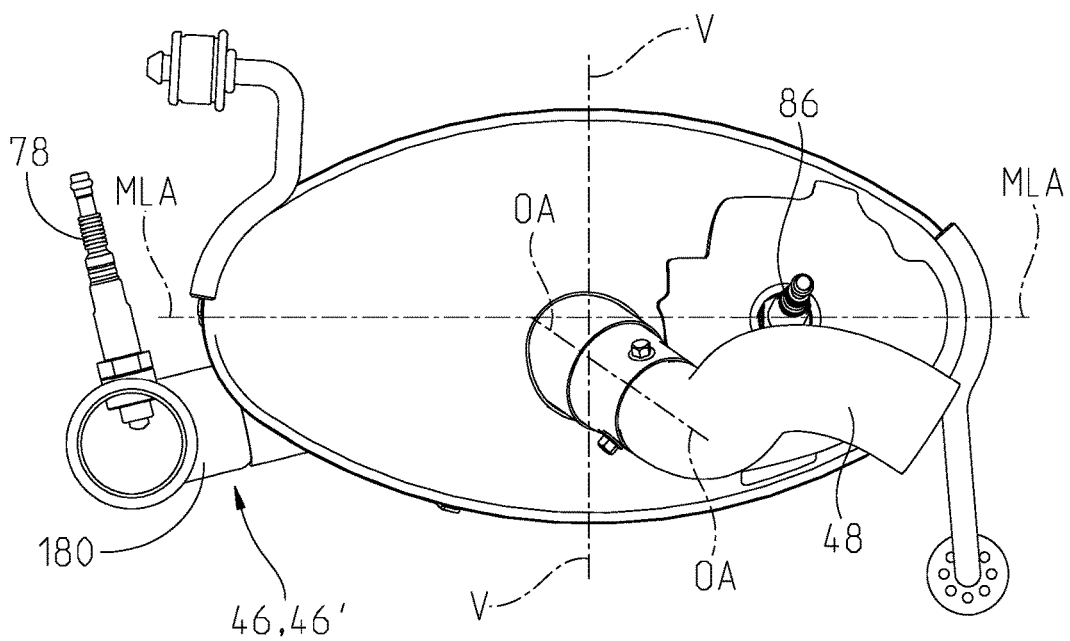
FIG. 39 is a left side view of the muffler of FIG. 38.
Figure 40:
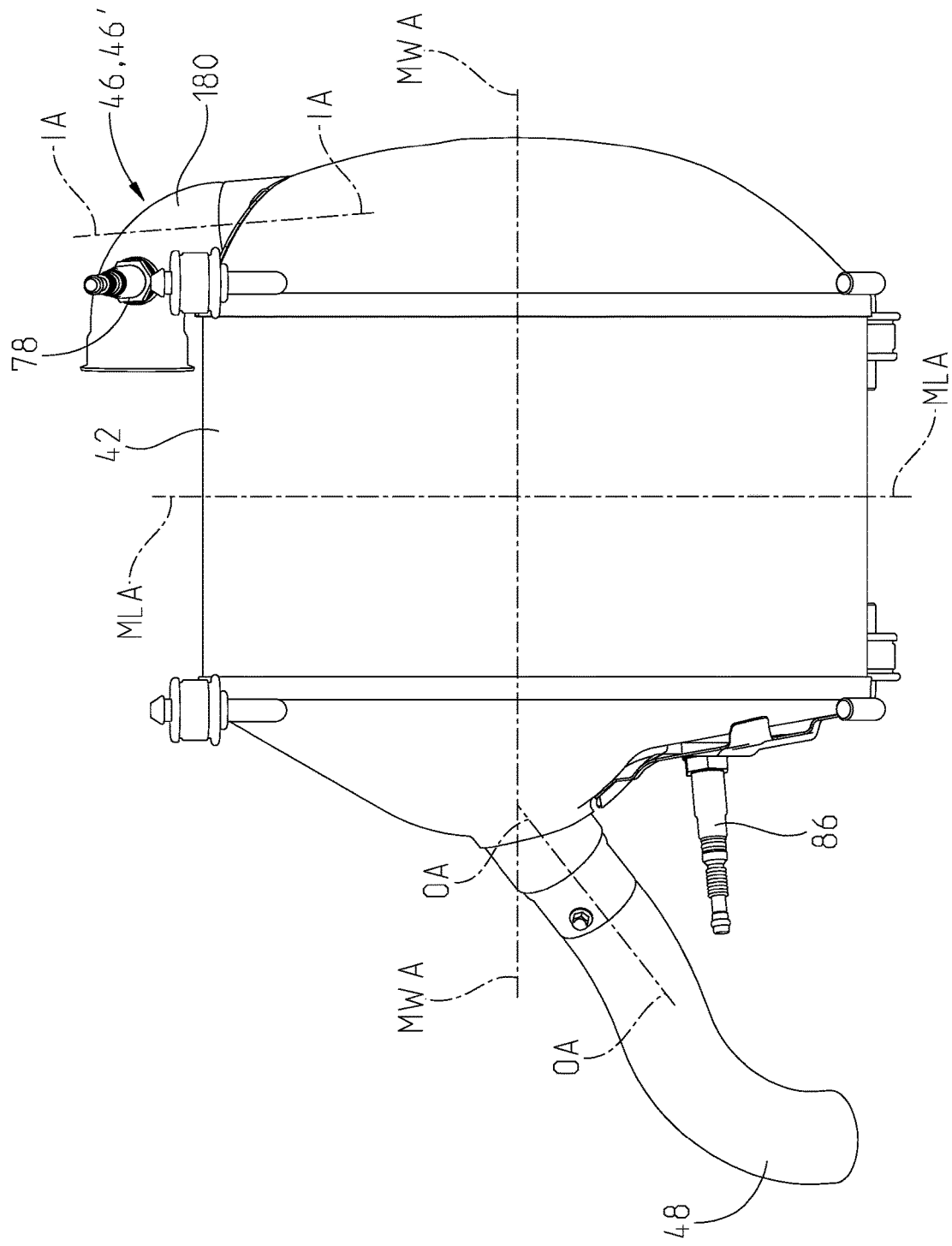
FIG. 40 is a top view of the muffler of FIG. 36.

Referring now to FIGS. 38-40, an inlet pipe 180 (which may be defined generally as part of exhaust conduit 46,46' and may be comprised of first and second conduit portions 170, 172 (FIGS. 36 and 37)) and outlet pipe 48 of muffler 42 may be offset or angled and out of plane from the centerlines of muffler 42. Having inlet pipe 180 and/or outlet pipe 48 offset from muffler 42 allows for tighter packaging of components adjacent muffler 42. In this way, the packaging of exhaust assembly 40 allows for available space for other components of vehicle 2. In one embodiment, an inlet axis IA of inlet pipe 180 may be angled less than 90 degrees from a muffler width or lateral axis MWA which allows for tighter packaging as inlet pipe 180 enters muffler 42. As shown in at least FIGS. 13-15, cross-tubes 82 may be parallel to muffler width axis MWA such that inlet pipe 180 also is angled less than 90 degrees from the axis of cross tubes 82. As shown in FIG. 40, inlet axis IA may be angled relative to a muffler longitudinal axis MLA. Further, inlet axis IA is angled relative to a vertical axis V of muffler 42 and, in one embodiment, is angled 45 degrees or less relative to vertical axis V.

Referring still to FIGS. 38-40, an outlet axis OA of outlet pipe 48 also is angled relative to vertical axis V and, in one embodiment, is angled approximately 25-65 degrees relative to vertical axis V. Additionally, outlet axis OA is angled by less than 90 degrees relative to muffler longitudinal axis MLA and by less than 90 degrees relative to muffler width axis MWA.

Figure 41:
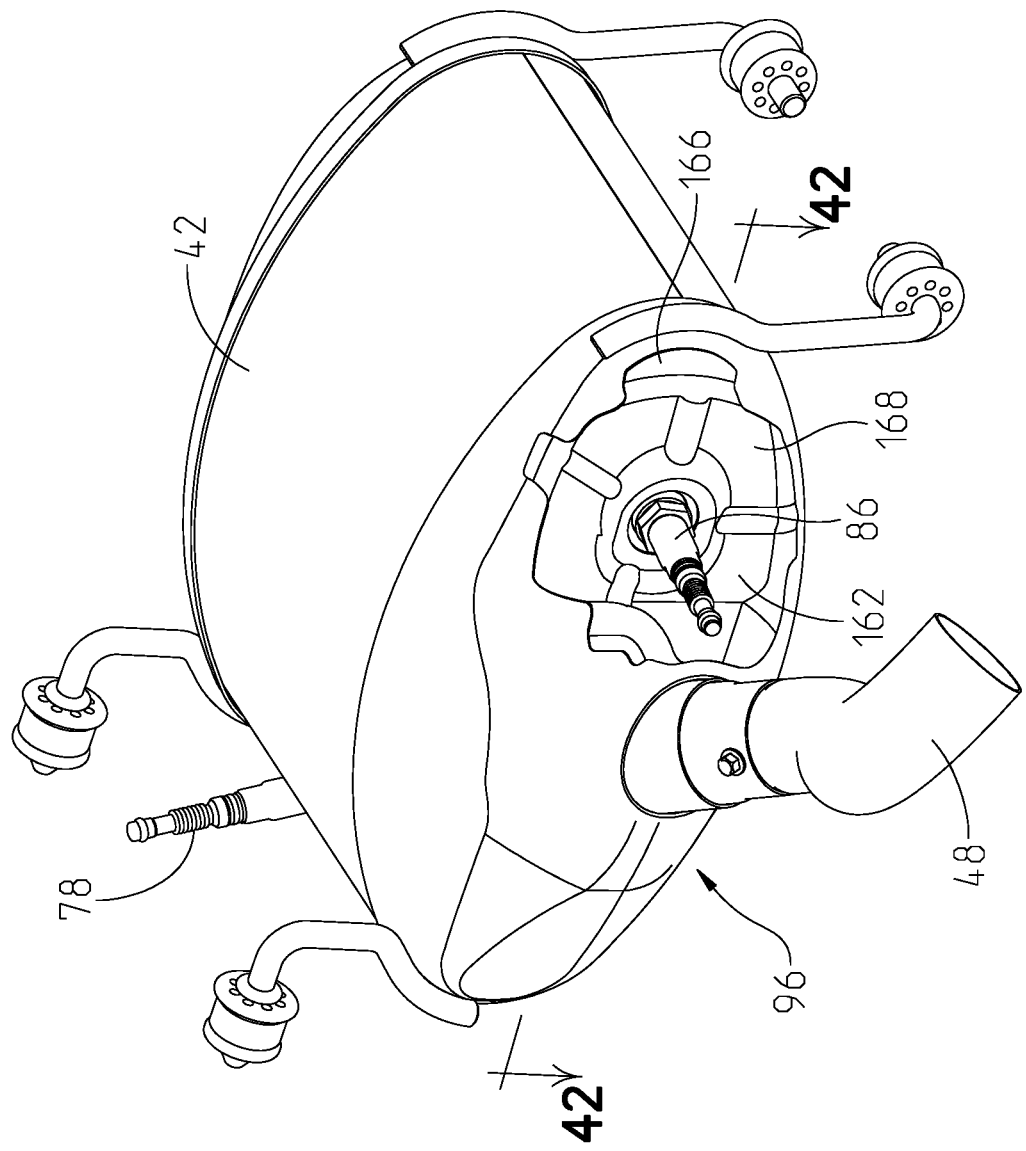
FIG. 41 is a perspective view of the muffler disclosed herein and showing a heat shield for an exhaust gas composition sensor.
Figure 42:
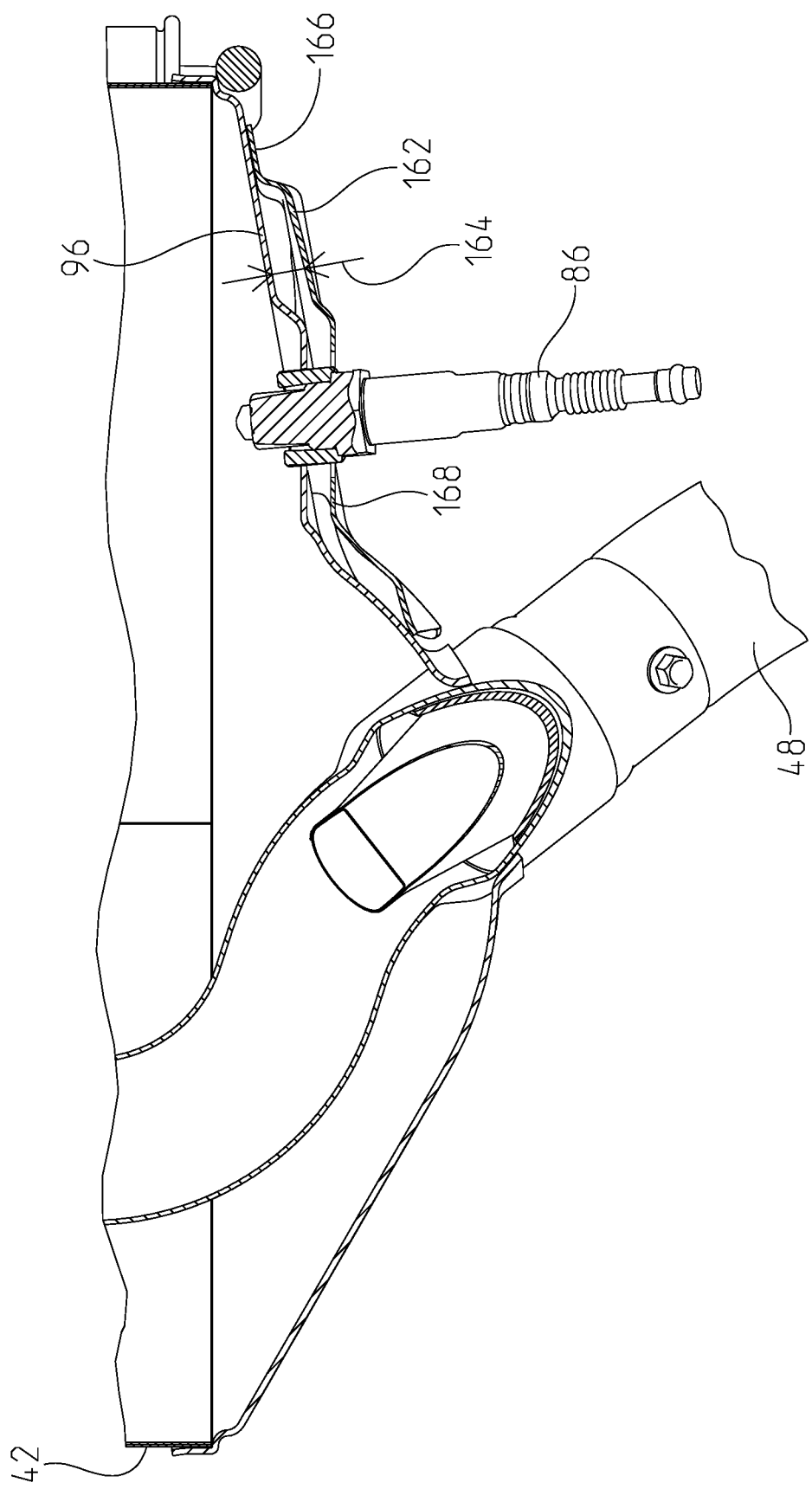
FIG. 42 is a cross-sectional view of the muffler of FIG. 41 taken along line 42-42 of FIG. 41.
Figure 43:
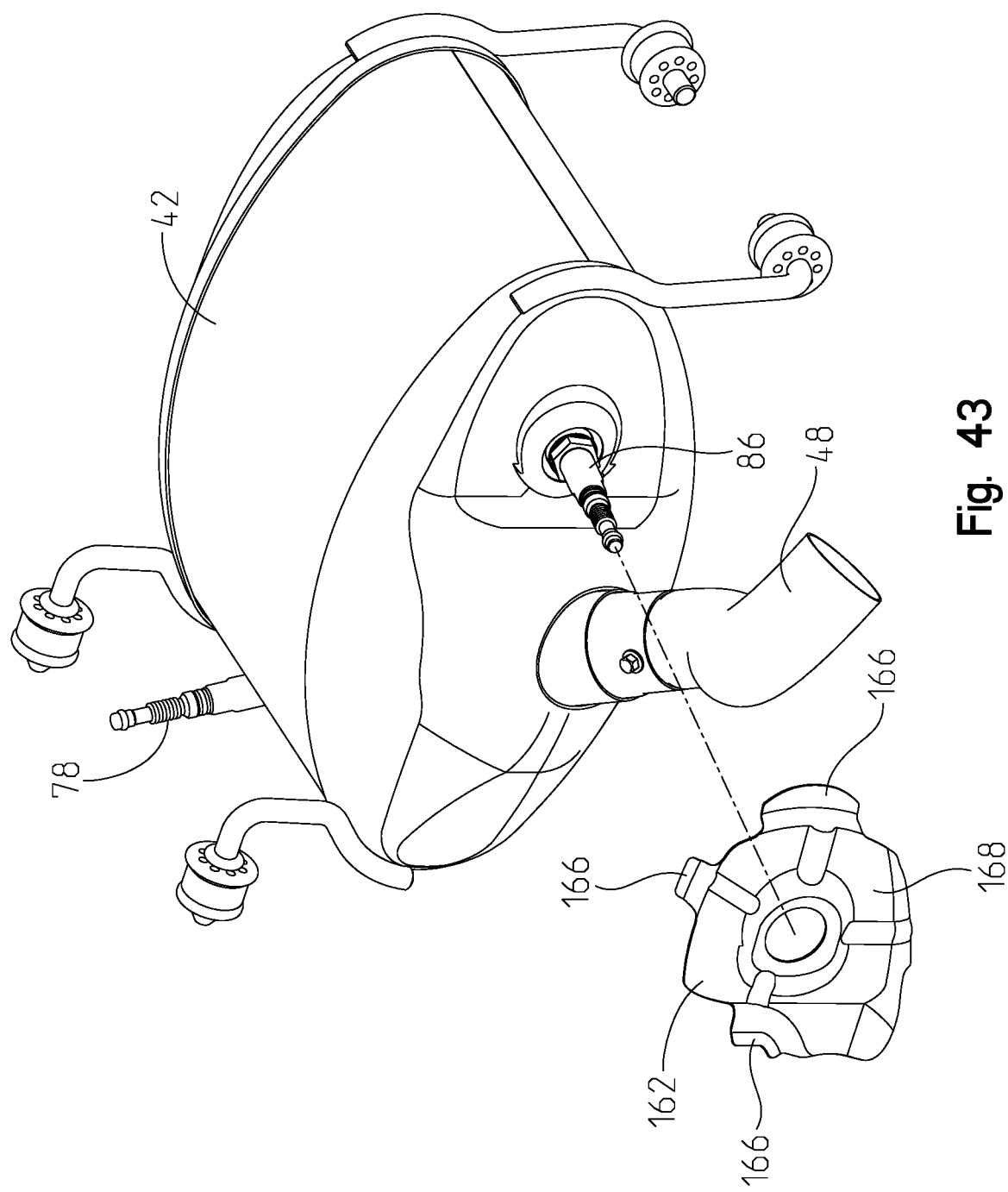
FIG. 43 is a partially exploded view of the muffler and heat shield of FIG. 41.

As shown in FIGS. 41-43, muffler 42 may include a heat shield 162 positioned adjacent exhaust gas composition sensor 86. Exhaust gas composition sensor 86 is a post-catalyst sensor and is positioned generally adjacent outlet pipe 48. As such, in one embodiment, heat shield 162 may be positioned generally adjacent outlet pipe 48. Illustratively, heat shield 162 is coupled to a wall of muffler 42 (e.g., wall 96 (FIG. 16)), however, heat shield 162 may be at least partially coupled to a portion of sensor 86, may be coupled to a portion of the chassis of vehicle 2, or may be coupled to any other component of vehicle 2 at a position that protects sensor 86 from radiant heat. Illustratively, heat shield 162 is mounted to muffler 42 and at least a portion of heat shield 162 is spaced apart from muffler 42 by an offset distance or an air gap 164. Air gap 164 may have a distance of approximately 1-7 mm. Air gap 164 may be defined by tabs 166 of heat shield 162 which extend from a central body 168 of heat shield 162. Tabs 166 are angled relative to central body 168 and contact muffler 42 such that central body 168 is maintained at the offset distance of air gap 164 relative to tabs 166 and muffler 42. During operation of exhaust assembly 40, heat shield 162 and air gap 164 protect sensor 86 from heat radiated off muffler 42 and which would be directed toward sensor 86.

Additional details of vehicle 2 and/or the powertrain assembly may be disclosed in U.S. patent application Ser. No. 15/388,436, filed Dec. 22, 2016; U.S. patent application Ser. No. 15/388,106, filed Dec. 22, 2016; and U.S. patent application Ser. No. 16/238,991, filed Jan. 3, 2019, the complete disclosures of which are expressly incorporated by reference herein.

The following clauses illustrate example subject matter described herein.

Clause 1. A utility vehicle comprising a frame assembly extending along a longitudinal axis and defining an operator area; a plurality of ground-engaging members supporting the frame assembly and including front ground-engaging members and rear ground-engaging members; a powertrain assembly supported by the frame assembly and including at least an engine and a transmission operably coupled to the engine; and an exhaust assembly comprising: an exhaust conduit fluidly coupled to the engine; a catalyst fluidly coupled to exhaust conduit and configured to receive exhaust gas from the exhaust conduit; and a cooling mechanism configured to provide cooling fluid to a portion of the exhaust assembly.

Clause 2. The utility vehicle of clause 1, wherein the cooling mechanism defines a deflection mechanism configured to direct pass-by air through a portion of the utility vehicle and towards the exhaust assembly.

Clause 3. The utility vehicle of clause 1, wherein the cooling mechanism defines a radiator configured to providing cooling fluid to the engine.

Clause 4. The utility vehicle of clause 1, wherein the cooling mechanism defines a fan.

Clause 5. The utility vehicle of clause 1, wherein the cooling mechanism defines an outlet port of the transmission.

Clause 6. The utility vehicle of clause 1, wherein the cooling mechanism defines a cooler configured to provide cooling fluid to the transmission.

Clause 7. The utility vehicle of clause 1, wherein the cooling mechanism defines a deflection mechanism positioned at a wheel well of the rear ground-engaging members.

Clause 8. The utility vehicle of clause 1, wherein the cooling mechanism defines a water jacket.

Clause 9. The utility vehicle of clause 8, wherein the water jacket is positioned along a portion of the exhaust conduit.

Clause 10. The utility vehicle of clause 8, wherein the water jacket is fluidly coupled to a cooling circuit, and the cooling circuit includes a heater for the operator area.

Clause 11. The utility vehicle of clause 10, wherein the cooling circuit define a first cooling circuit and second cooling circuit is operably coupled to the engine and separate from the first cooling circuit.

Clause 12. The utility vehicle of clause 10, wherein the exhaust assembly further comprises an exhaust manifold fluidly coupled to the engine and the exhaust conduit, and the water jacket is positioned along a portion of the exhaust manifold.

Clause 13. A method of cooling a portion of an exhaust assembly for an engine of a utility vehicle, comprising: providing an exhaust conduit; fluidly coupling a catalyst to the exhaust conduit; directing a fluid at a portion of the exhaust assembly; and decreasing a temperature of an exhaust gas flowing through the exhaust assembly after directing a fluid at the portion of the exhaust assembly.

Clause 14. The method of clause 13, wherein directing the fluid includes directing pass-by air through a portion of the utility vehicle and towards the portion of the exhaust assembly.

Clause 15. The method of clause 13, wherein directing the fluid includes directing air through a radiator fluidly coupled to the engine and towards the portion of the exhaust assembly.

Clause 16. The method of clause 13, wherein directing the fluid includes directing air through a fan and towards the portion of the exhaust assembly.

Clause 17. The method of clause 13, further comprising providing a transmission operably coupled to the engine, and wherein directing the fluid includes exhausting air from the transmission and directing the air towards the portion of the exhaust assembly.

Clause 18. The method of clause 13, wherein directing the fluid includes flowing the fluid through a water jacket positioned at the portion of the exhaust assembly.

Clause 19. The method of clause 18, further comprising positioning the water jacket along a portion of the exhaust conduit.

Clause 20. The method of clause 18, further comprising providing an exhaust manifold fluidly coupled to the engine and the exhaust conduit and positioning the water jacket along a portion of the exhaust manifold.

Clause 21. A utility vehicle, comprising a frame assembly extending along a longitudinal axis and defining an operator area; a plurality of ground-engaging members supporting the frame assembly and including front ground-engaging members and rear ground-engaging members; a powertrain assembly supported by the frame assembly and including at least an engine and a transmission operably coupled to the engine; and an exhaust assembly comprising: an exhaust conduit fluidly coupled to the engine; a first catalyst fluidly coupled to exhaust conduit and configured to receive exhaust gas from the exhaust conduit; and a second catalyst positioned downstream of the first catalyst along the exhaust conduit.

Clause 22. The utility vehicle of clause 21, wherein the second catalyst is positioned within a muffler of the exhaust assembly.

Clause 23. The utility vehicle of clause 21, wherein the first catalyst is equal in size to or smaller than the second catalyst.

Clause 24. A utility vehicle, comprising: a frame assembly extending along a longitudinal axis and defining an operator area; a plurality of ground-engaging members supporting the frame assembly and including front ground-engaging members and rear ground-engaging members; a powertrain assembly supported by the frame assembly and including at least an engine and a transmission operably coupled to the engine; and an exhaust assembly comprising: an exhaust conduit fluidly coupled to the engine; and a catalyst fluidly coupled to exhaust conduit and configured to receive exhaust gas from the exhaust conduit, and the exhaust conduit, the engine, and the catalyst are positioned adjacent each other along the longitudinal axis.

Clause 25. The utility vehicle of clause 24, wherein the exhaust conduit is positioned longitudinally intermediate the engine and the catalyst.

Clause 26. The utility vehicle of clause 24, wherein the catalyst is positioned longitudinally intermediate the engine and the exhaust conduit.

Clause 27. The utility vehicle of clause 24, wherein the exhaust assembly further comprises an exhaust gas composition sensor supported by the exhaust conduit, and the exhaust is continuous between the exhaust sensor and the catalyst.

Clause 28. The utility vehicle of clause 27, wherein the sensor is positioned downstream of the catalyst.

Clause 29. The utility vehicle of clause 28, wherein the exhaust assembly further comprises a heat shield positioned adjacent the sensor.

Clause 30. The utility vehicle of clause 29, wherein at least a portion of the heat shield is spaced apart from the muffler by an air gap.

Clause 31. The utility vehicle of clause 27, wherein the exhaust assembly further comprises a muffler, and the exhaust conduit include a bellow, and the bellow is positioned within the utility vehicle at a position longitudinally intermediate the muffler and the engine.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A utility vehicle, comprising:
a frame assembly extending along a longitudinal axis and defining an operator area;
a plurality of ground-engaging members supporting the frame assembly and including front ground-engaging members and rear ground-engaging members;

at least one wheel well supported by the rear ground-engaging members;
a powertrain assembly supported by the frame assembly and including at least an engine and a transmission operably coupled to the engine, wherein the engine is longitudinally rearward of the operator area; and
an exhaust assembly comprising: an exhaust conduit fluidly coupled to the engine;
a catalyst fluidly coupled to exhaust conduit and configured to receive exhaust gas from the exhaust conduit; and
a cooling mechanism configured to provide cooling fluid to a portion of the exhaust assembly, wherein the cooling mechanism comprises a deflection mechanism positioned at the at least one wheel well of the rear ground-engaging members to direct air from the at least one wheel well towards the portion of the exhaust assembly,
wherein a rate of the cooling air directed to the portion of the exhaust assembly increases as a speed of the utility vehicle increases.

2. The utility vehicle of claim 1, wherein the cooling mechanism further comprises a radiator configured to provide the cooling fluid to the engine.

3. The utility vehicle of claim 1, wherein the cooling mechanism further comprises a fan.

4. The utility vehicle of claim 1, wherein the cooling mechanism further comprises an outlet port of the transmission.

5. The utility vehicle of claim 1, wherein the cooling mechanism further comprises a cooler configured to provide cooling fluid to the transmission.

6. The utility vehicle of claim 1, wherein the cooling mechanism further comprises a cooling jacket.

7. The utility vehicle of claim 6, wherein the cooling jacket is positioned along a portion of the exhaust conduit.

8. The utility vehicle of claim 6, wherein the cooling jacket is fluidly coupled to a cooling circuit, and the cooling circuit includes a heater for the operator area.

9. The utility vehicle of claim 8, wherein the cooling circuit comprises a first cooling circuit and second cooling circuit is operably coupled to the engine and different from the first cooling circuit.

10. The utility vehicle of claim 8, wherein the exhaust assembly further comprises an exhaust manifold fluidly coupled to the engine and the exhaust conduit, and the cooling jacket is positioned along a portion of the exhaust manifold.

11. The utility vehicle of claim 1, wherein the catalyst comprises a first catalyst fluidly coupled to the exhaust conduit and configured to receive exhaust gas from the exhaust conduit, and the catalyst further comprises a second catalyst positioned downstream of the first catalyst along the exhaust conduit.

12. The utility vehicle of claim 11, wherein the second catalyst is positioned within a muffler of the exhaust assembly.

13. A utility vehicle, comprising:
a frame assembly extending along a longitudinal axis and defining an operator area;
a plurality of ground-engaging members supporting the frame assembly and including front ground-engaging members and rear ground-engaging members;
at least one wheel well supported by the rear ground-engaging members;
a powertrain assembly supported by the frame assembly and including at least an engine and a transmission operably coupled to the engine, wherein the engine is longitudinally rearward of the operator area; and
an exhaust assembly comprising:
an exhaust conduit fluidly coupled to the engine;
a catalyst fluidly coupled to exhaust conduit and configured to receive exhaust gas from the exhaust conduit, and the exhaust conduit, the engine, and the catalyst are positioned adjacent each other along the longitudinal axis; and
a cooling mechanism configured to cool a portion of the exhaust assembly, the cooling mechanism including a deflection mechanism to direct air from the at least one wheel well toward the portion of the exhaust assembly,
wherein a rate of the cooling air directed to the portion of the exhaust assembly increases as a speed of the utility vehicle increases.

14. The utility vehicle of claim 13, wherein the exhaust conduit is positioned longitudinally intermediate the engine and the catalyst.

15. The utility vehicle of claim 13, wherein the catalyst is positioned longitudinally intermediate the engine and the exhaust conduit.

16. The utility vehicle of claim 13, wherein the exhaust assembly further comprises an exhaust gas composition sensor supported by the exhaust conduit, and the exhaust is continuous between the exhaust sensor and the catalyst.

17. The utility vehicle of claim 16, wherein the sensor is positioned downstream of the catalyst.

18. The utility vehicle of claim 17, wherein the exhaust assembly further comprises a heat shield positioned adjacent the sensor.

19. The utility vehicle of claim 13, wherein the exhaust assembly further comprises a muffler, and the exhaust conduit include a bellow, and the bellow is positioned within the utility vehicle at a position longitudinally intermediate the muffler and the engine.

20. An exhaust assembly for a utility vehicle, the utility vehicle having a front portion, a rear portion, a longitudinal axis extending therebetween, and a powertrain assembly including at least an engine and a transmission operably coupled to the engine, the exhaust assembly comprising:
an exhaust conduit fluidly coupled to the engine;
a catalyst fluidly coupled to exhaust conduit and configured to receive exhaust gas from the exhaust conduit, wherein the exhaust conduit, the engine, and the catalyst are positioned adjacent each other along a longitudinal axis of the utility vehicle; and
a cooling mechanism configured to cool a portion of the exhaust assembly, the cooling mechanism including a deflection mechanism to direct air from a rear portion of the vehicle toward the portion of the exhaust assembly, wherein the air is directed toward the portion of the exhaust assembly from at least two wheel wells of the utility vehicle; and wherein a rate of the cooling air directed to the portion of the exhaust assembly increases as a speed of the utility vehicle increases.

* * * * *